United States Patent [19]

Isemura et al.

[11] Patent Number: 5,557,430
[45] Date of Patent: Sep. 17, 1996

[54] IMAGE PROCESSING APPARATUS GENERATING PATTERNS FOR COLORS BASED ON A SET RELATION BETWEEN COLORS AND PATTERNS AND SYNTHESIZING PATTERNS WITH EXTRACTED MONOCHROMATIC INFORMATION

[75] Inventors: Keizo Isemura, Kokubunji; Kunio Yoshihara, Sagamihara; Hiroyuki Ichikawa, Kawasaki; Masanori Sakai, Yokohama; Masatoshi Tanabe, Chigasaki; Mitsuo Nimura, Kawasaki; Yoshihiro Funamizu, Soka; Hirohiko Kishimoto, Yokohama, all of Japan

[73] Assignee: Canon Kabushiki Kaisha, Tokyo, Japan

[21] Appl. No.: 528,595

[22] Filed: Sep. 15, 1995

Related U.S. Application Data

[63] Continuation of Ser. No. 265,635, Jun. 24, 1994, abandoned, which is a continuation of Ser. No. 838,311, Feb. 20, 1992, abandoned.

[30]  Foreign Application Priority Data

| Feb. 20, 1991 | [JP] | Japan | 3-047667 |
| May 29, 1991 | [JP] | Japan | 3-153938 |
| May 29, 1991 | [JP] | Japan | 3-153939 |

[51] Int. Cl.⁶ ............................................. H04N 1/46
[52] U.S. Cl. .................. 358/501; 358/515; 358/529; 358/530; 358/537; 382/165
[58] Field of Search .......................... 358/500, 501, 358/515, 529, 530, 537, 538, 448, 452, 453, 467; 382/162, 165; 345/149

[56]  References Cited

U.S. PATENT DOCUMENTS

| 4,369,461 | 1/1983 | Tamura | 358/501 |
| 4,642,681 | 2/1987 | Ikeda | 358/529 |
| 5,153,576 | 10/1992 | Harrington | 345/149 |

FOREIGN PATENT DOCUMENTS

| 199272 | 10/1986 | European Pat. Off. | G09G 1/16 |
| 3802736 | 8/1988 | Germany | H04N 1/46 |
| 187770 | 8/1988 | Japan. | |
| 267691 | 10/1989 | Japan. | |
| 88-01778 | 3/1988 | WIPO | G09G 1/28 |
| 89-03108 | 4/1989 | WIPO | G09G 1/00 |

OTHER PUBLICATIONS

Patent Abstracts of Japan, vol. 14, No. 27 (Kokai 1–267691) (Oct. 1989).

IBM Technical Disclosure Bulletin, vol. 31, No. 3, Aug. 1988, pp. 216–229.

Guide for Patent Draftman, Revised Jan. 1989, p. 19.

*Primary Examiner*—Scott A. Rogers
*Attorney, Agent, or Firm*—Fitzpatrick, Cella, Harper & Scinto

[57] ABSTRACT

An image processing apparatus reads color images, identifies the colors of an read color image, converts the color image into a monochrome image, synthesizes color recognition information on the monochrome image, and prints the resulting synthesized image as a monochrome image. As a result, even if a low-priced printer is employed, it is possible to provide a monochrome image permitting recognition of the colors of the color original, or quick identification of differences among the colors thereof. Moreover, this allows a user to specify a desired graphic pattern to be associated with a given color, and to obtain collation tables independently of the monochrome image, or to print the specified graphic pattern with any variable magnification power.

30 Claims, 47 Drawing Sheets

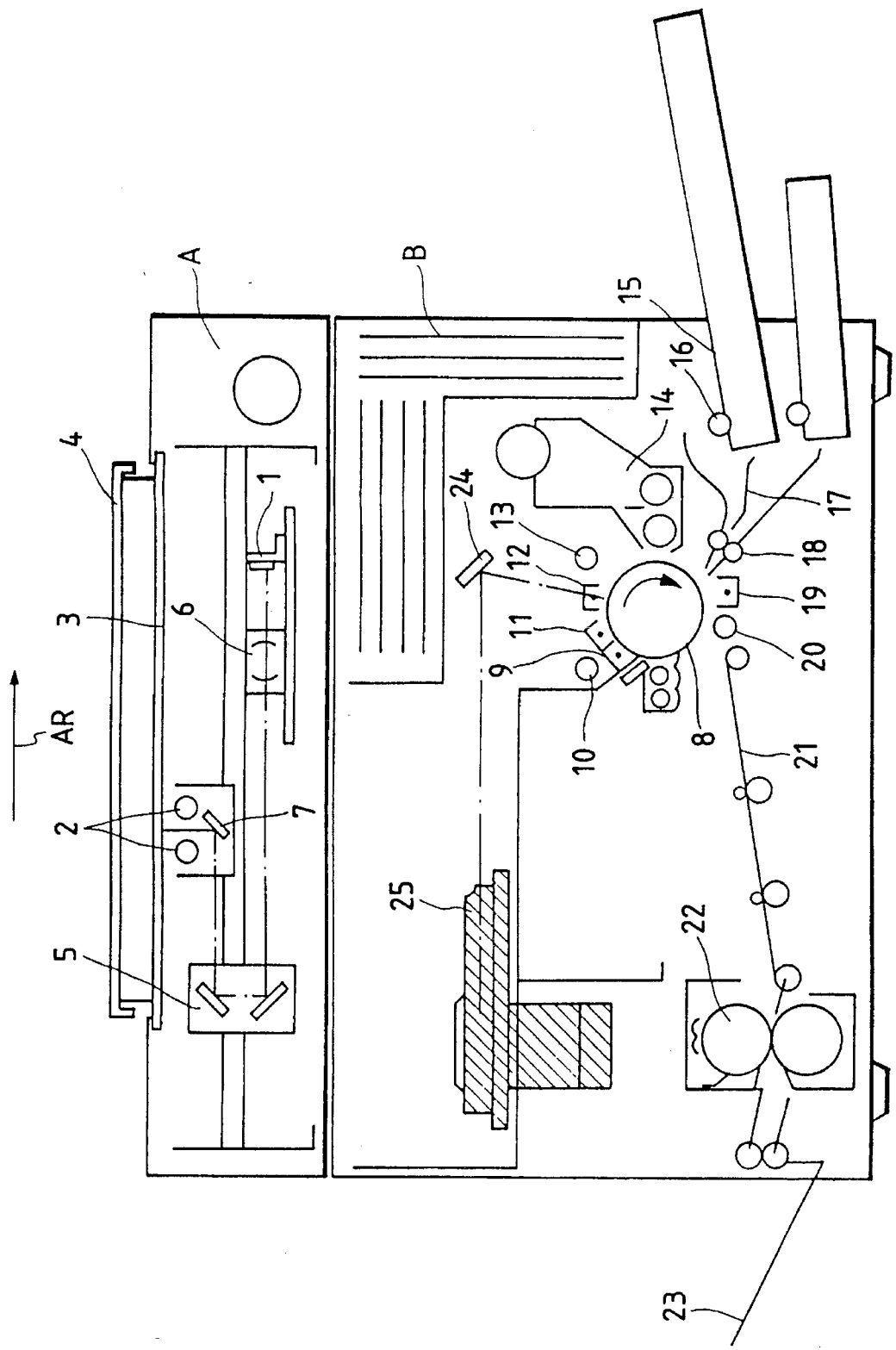

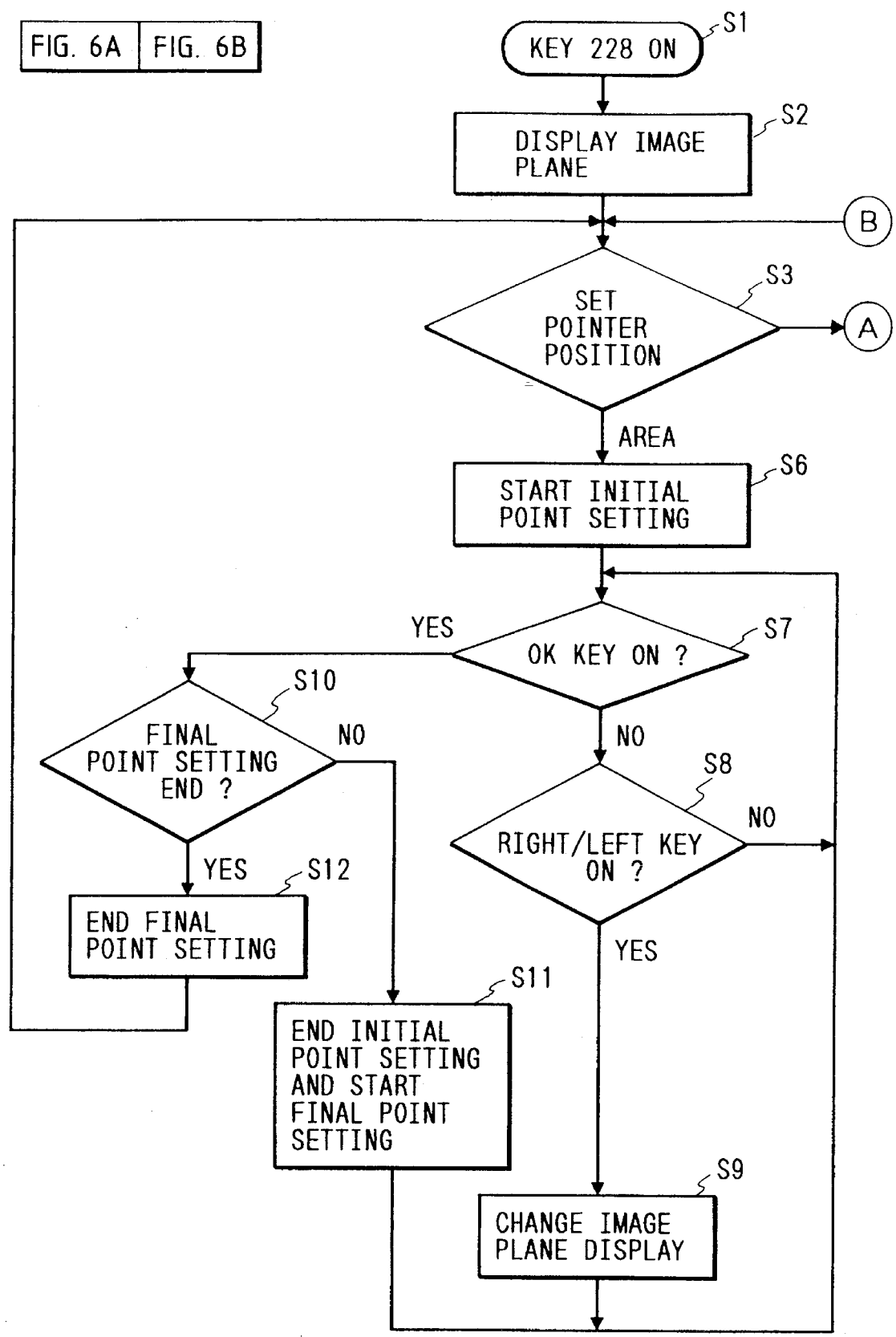

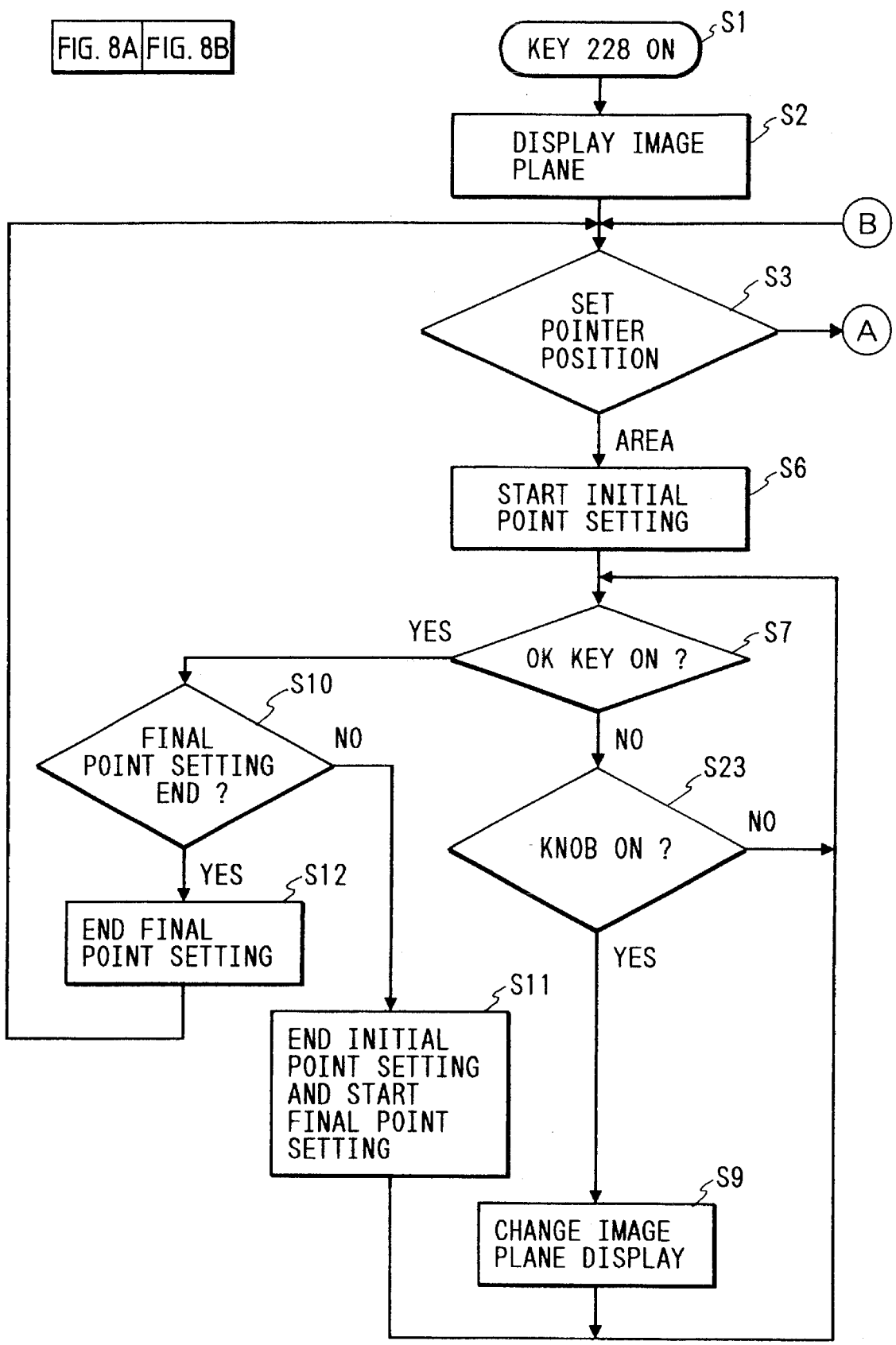

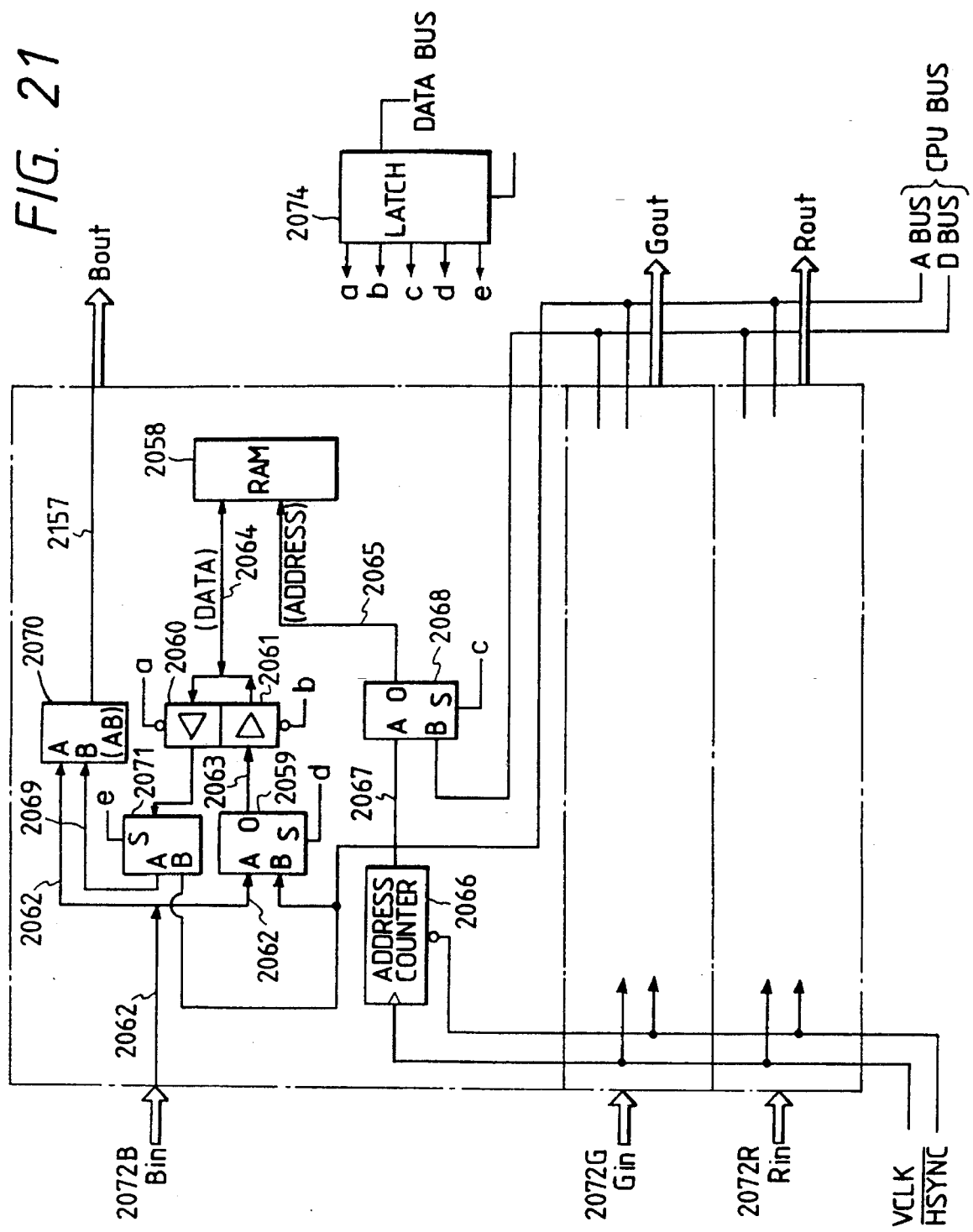

|  | | SUBORDINATE ADDRESS | | | | | | | |
|---|---|---|---|---|---|---|---|---|---|
|  |  | 0 | 1 | 2 | 3 | 4 | 5 | 6 | 7 |
| SUPERORDINATE ADDRESS | 0 | 0 | 0 | 0 | 0 | 0 | 0 | 0 | 0 |
|  | 1 | 0 | 1 | 1 | 1 | 1 | 0 | 0 | 0 |
|  | 2 | 0 | 1 | 0 | 0 | 0 | 1 | 0 | 0 |
|  | 3 | 0 | 1 | 1 | 1 | 1 | 0 | 0 | 0 |
|  | 4 | 0 | 1 | 0 | 1 | 0 | 0 | 0 | 0 |
|  | 5 | 0 | 1 | 0 | 0 | 1 | 0 | 0 | 0 |
|  | 6 | 0 | 1 | 0 | 0 | 0 | 1 | 0 | 0 |

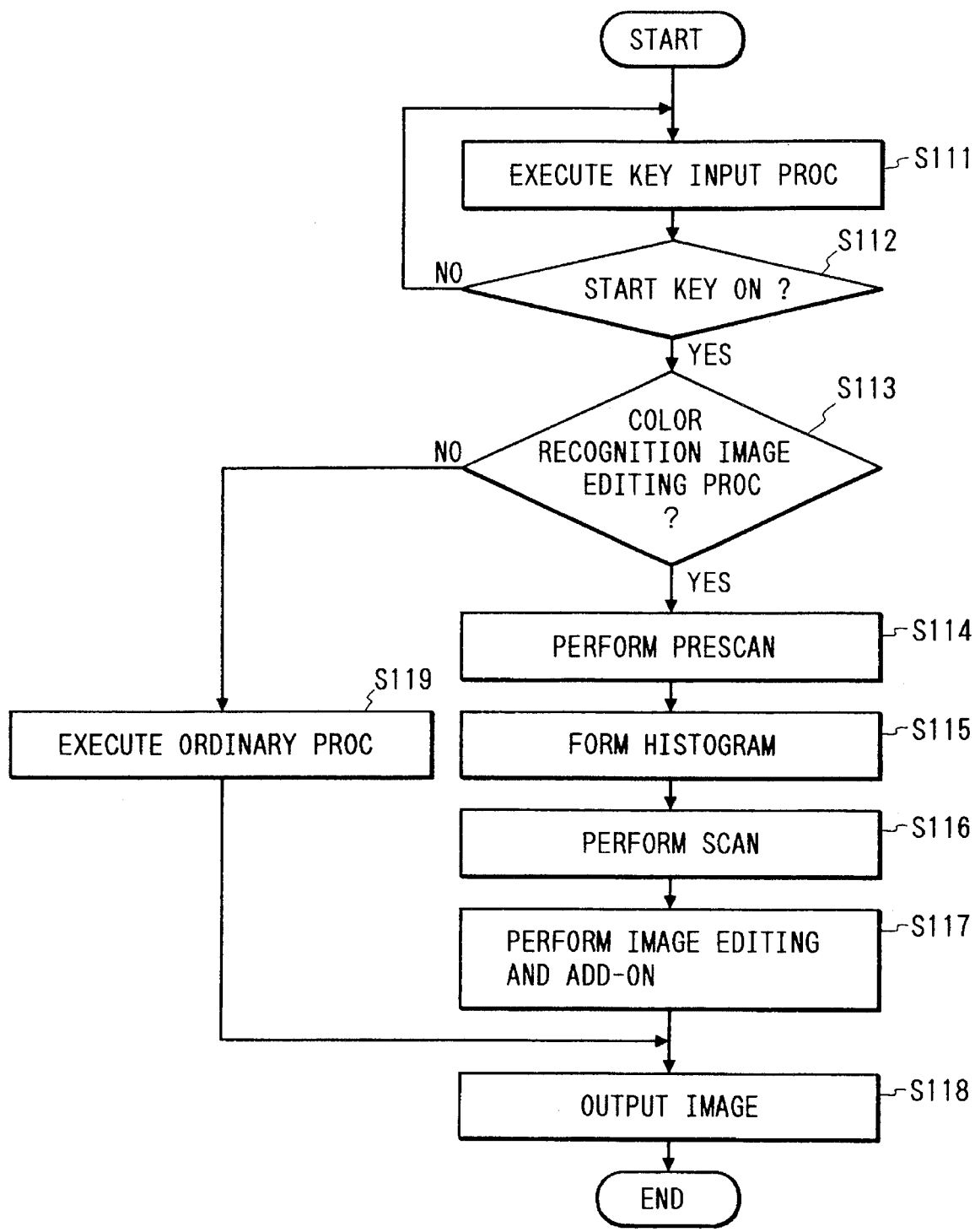

IMAGE PROCESSING APPARATUS GENERATING PATTERNS FOR COLORS BASED ON A SET RELATION BETWEEN COLORS AND PATTERNS AND SYNTHESIZING PATTERNS WITH EXTRACTED MONOCHROMATIC INFORMATION

This application is a continuation of application Ser. No. 08/265,635 filed Jun. 24, 1994, which was a continuation of application Ser. No. 07/838,311 filed Feb. 20, 1992, both now abandoned.

BACKGROUND OF THE INVENTION

1. Field of the Invention

The present invention relates to an image processing apparatus for processing data of images containing colors.

2. Related Background Art

For example, in digital copying machines of the prior art, an original is illuminated by a halogen lamp or other light source. Then, light reflected from the original is photoelectrically transferred by a charge coupled device (hereafter, CCD) or any other solid-state imaging device, then converted into a digital signal. After that, a given corrective operation is applied to the digital signal. Finally, the corrected signal is fed to a laser beam printer, liquid crystal printer, thermal printer, ink-jet printer, or other recording apparatus to produce a recording image.

With an increase in the number of colored originals, used digital copying machines of this kind are expected to provide output containing more abundant information. Copying machines, in which a multi-color laser beam printer equipped with multiple color developing units copies an original by changing colors from area to area, have been developed in recent years.

However, the aforesaid copying apparatuses for forming an image by changing colors from area to area are equipped with many developing machines. Therefore, the mechanisms are complex. Besides, since high precision is required for image positioning, each product is very expensive.

Copying apparatuses using a multi-color ink-jet printer pose the same problem.

The specification of U.S. Pat. No. 4,369,461 has disclosed a copying apparatus in which color information an original read means has read from color images of an original is assessed to detect colors contained in the color images, then graphic patterns such as, an oblique line pattern, a longitudinal line pattern, a lateral line pattern, a waveform line pattern, a small circle pattern, and a dot pattern, which are predetermined in association with colors, are synthesized on a monochrome image. Thus, the copying apparatus has achieved to express the differences of colors among the pixels in the color images of an original using a low-priced printer. However, this kind of copying apparatus cannot visualize color information about the colors of pixels in the color images of an original.

In the foregoing copying apparatuses of the prior art, graphic patterns associated with color information of original images are preprogrammed in an apparatus and only a limited number of graphic patterns are available. Therefore, users cannot specify desired graphic patterns depending on color information.

SUMMARY OF THE INVENTION

The principal object of the present invention is to provide an innovative image processing apparatus.

Another object of the invention is to provide an image processing apparatus which employs a low-priced monochrome system and produce images permitting effortless and accurate recognition of the colors of pixels in the images of originals.

Another object of the invention is to provide an image processing apparatus for clearly displaying characters representing the names of colors in areas of white background.

Still another object of the invention is to provide an image processing apparatus for permitting quick recognition of the differences of colors among pixels in the images of an original.

Still another object of the invention is to provide an image processing apparatus for eliminating a feeling of incompatibility occurring when character patterns, which are not included in an original image, are appended to an output monochrome image, and outputting a collation table for the character patterns and graphic patterns independently of the monochrome image.

Still another object of the invention is to provide an image processing apparatus for allowing users to freely specify desired graphic patterns in association with color information.

Still another object of the invention is to provide an image processing apparatus for permitting accurate recognition of the appearances of graphic patterns to be specified.

Still another object of the invention is to provide an image processing apparatus for displaying specified graphic patterns at any variable power.

Still another object of the invention is to provide a color patterning image processing apparatus for permitting color patterning with ease of operation and simple adjustment of delicate colors, or ensuring effective color patterning without pre-scanning.

Other objects and advantages of the invention will be apparent in conjunction with the description below and drawings.

BRIEF DESCRIPTION OF THE DRAWINGS

FIG. 3 is a configuration diagram showing the cross section of the digital copying apparatus of that embodiment;

FIGS. 9A-1 through 9A-5 show a screen for color patterning setting;

FIG. 9B-1 through 9B-5 show a screen for color patterning setting;

FIGS. 10A-1 through 10B-5 show a screen for color patterning setting;

FIGS. 10B-1 through 10B-5 show a screen for color patterning setting;

FIG. 21 is a block diagram of a black correction circuit in a black correction/white correction circuit 2057 shown in FIG. 16;

FIG. 34 is a flowchart showing an operation of an image processing apparatus of other embodiment of the present invention;

DESCRIPTION OF THE PREFERRED EMBODIMENTS

The preferred embodiments of the present invention will be described in conjunction with the drawings.

Figure 2:
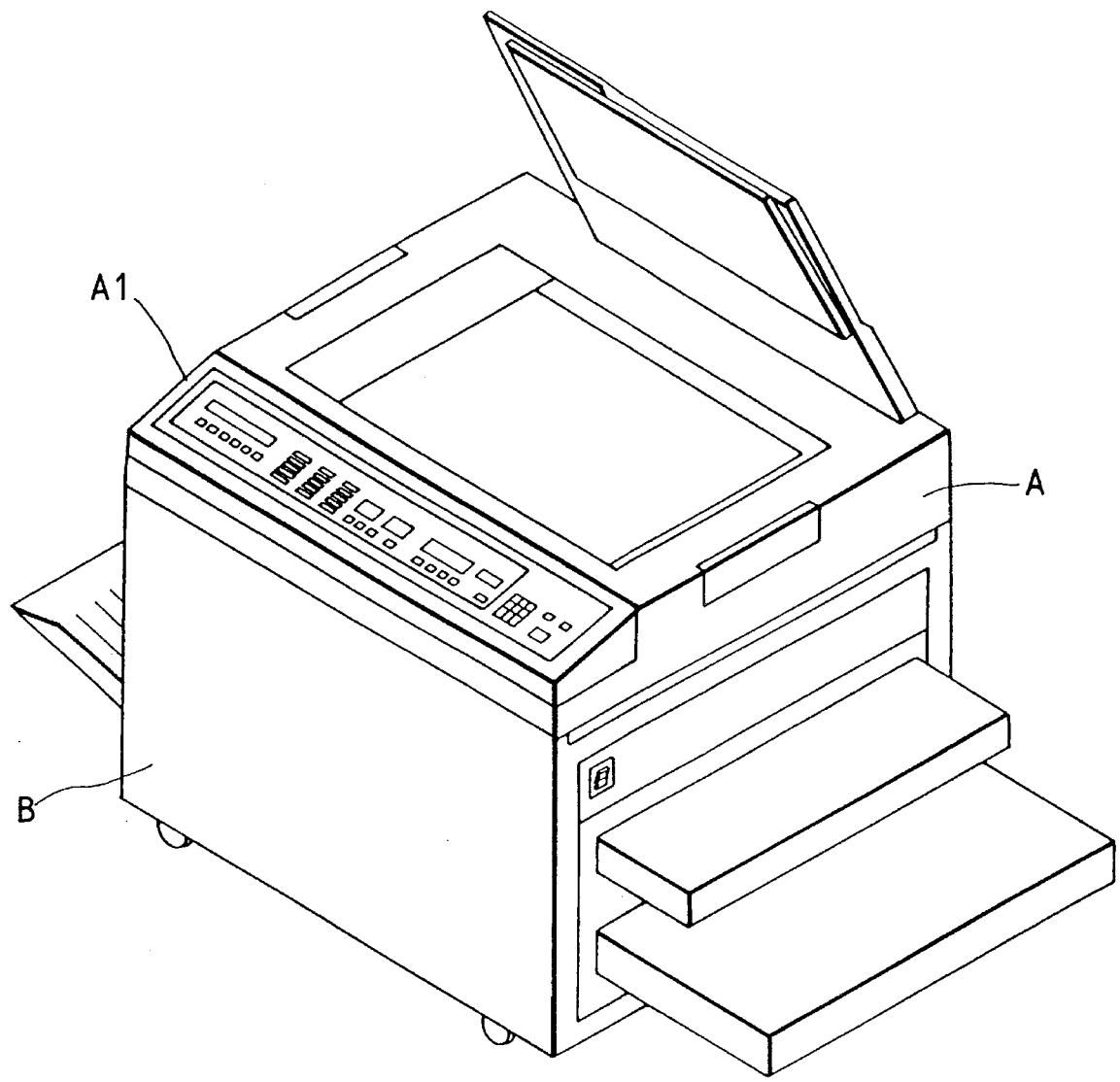
FIG. 2 shows the appearance of the digital copying apparatus of that embodiment.

FIG. 2 is a oblique view of a digital copying apparatus of an embodiment of the present invention. The copying apparatus shown in FIG. 2 comprises a reader A for reading original images and a printer B for producing the images read by the reader A on paper or other recording medium. The reader A is equipped with an operation unit A1 to be described later.

Figures 1, 9A:
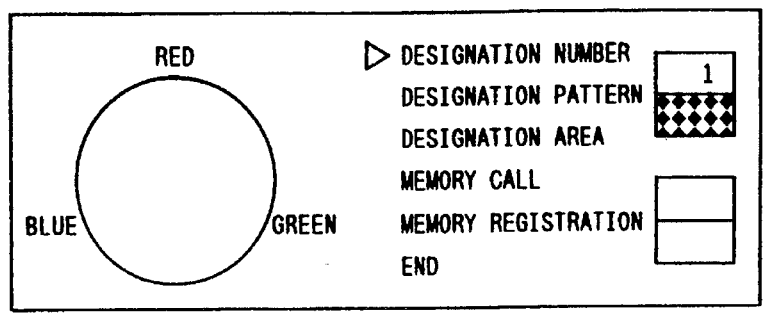
Figures 2, 9A:
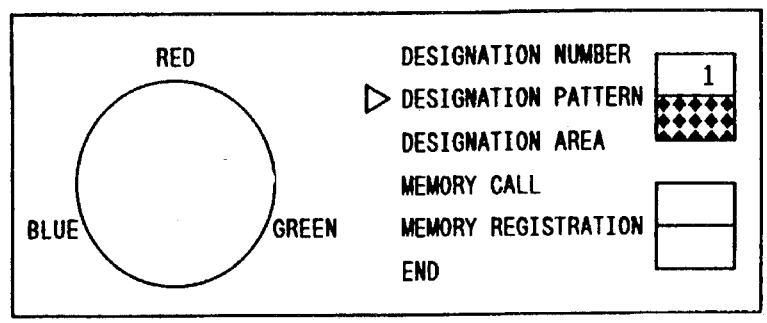
Figures 3, 9A:
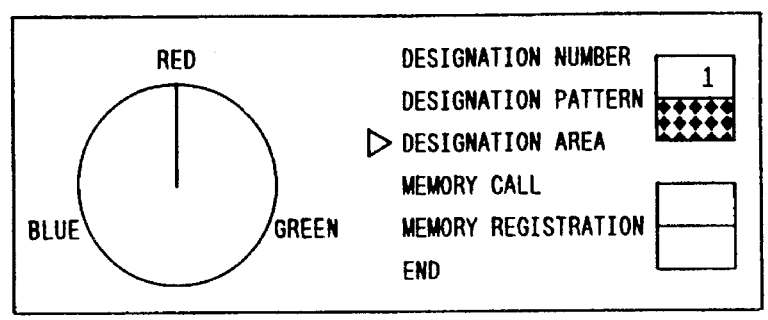

FIG. 3 shows a cross section of the digital copying apparatus shown in FIG. 2. In conjunction with FIG. 2, the copying apparatus will be described briefly.

An original is placed on an original glass base 3 with the surface (original side), on which images to be read are formed, facing down, then pressed to the glass base 3 by an original cover 4. The original side is illuminated by a fluorescent lamp 2. The reflected light is converged on the face of a CCD sensor 1 or a reading sensor via mirrors 5 and 7 and a lens 6. The mirrors 7 and 5 are moved in subscanning direction at relative speeds of 2: 1 so that the optical path from the fluorescent lamp 2 to the CCD 1 will remain invariant. Ar denotes an arrow indicating the subscanning direction.

The reader A processes image signals in series for each bit of the CCD sensor 1, then inputs it to a laser scan optical unit 25 in the printer B. The unit 25 consists of a semiconducting laser unit, a collimator lens, a rotary polygonal mirror, an F-θ lens, and a corrective optical system. Specifically, the image signal sent from the reader A is fed to the semiconducting laser unit. There, electricity is transferred into light. Then, the light is emitted to the quickly rotating polygonal mirror via the collimator lens. The reflected light travels to a photosensitive drum 8 and scans it.

Arranged in the process succeeding to the photosensitive drum 8 are components for image formation; such as, a predischarger 9, a pre-discharge lamp 10, a primary charger 11, a secondary charger 12, a pre-exposure lamp 13, a developing unit 14, a paper feed cassette 15, a feed roller 16, a feed guide 17, resist rollers 18, a transfer charger 19, a separation roller 20, a transport guide 21, fusing rollers 22, and a tray 23. A so-called laser beam printer is employed as the printer B. An ink-jet printer will also do.

Figure 4A:
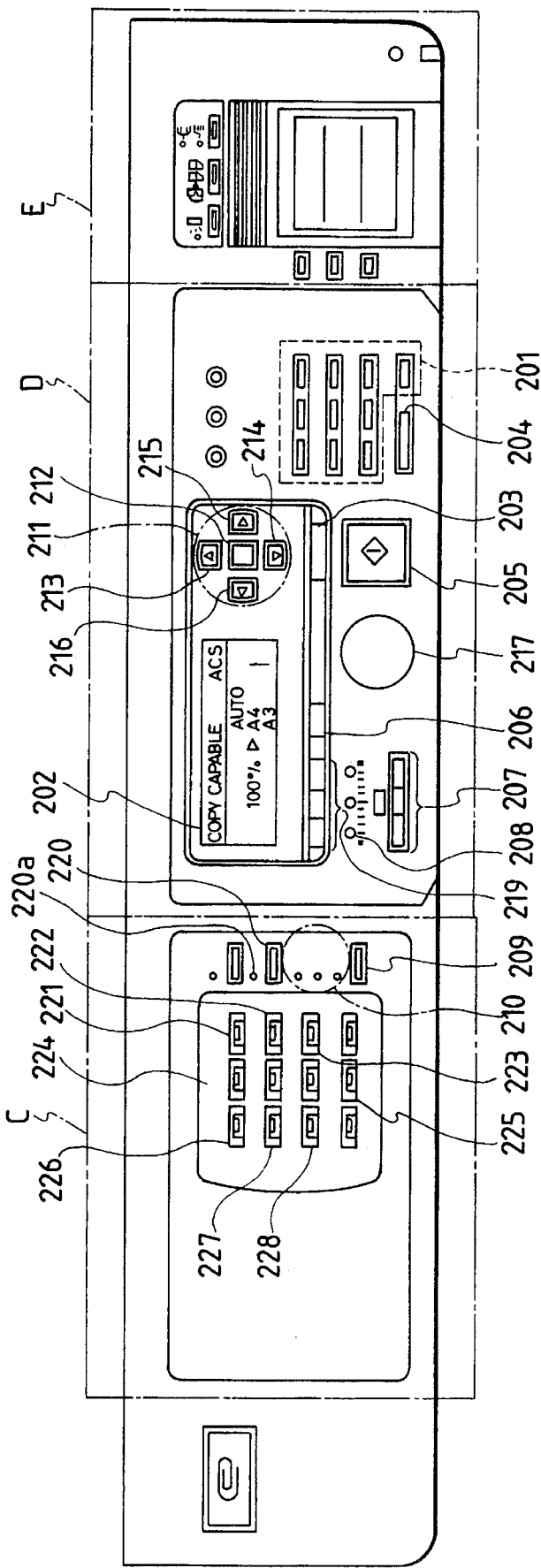
FIG. 4A shows the panel of an operation unit A1 of the digital copying apparatus shown in FIG. 2.
Figure 4B:
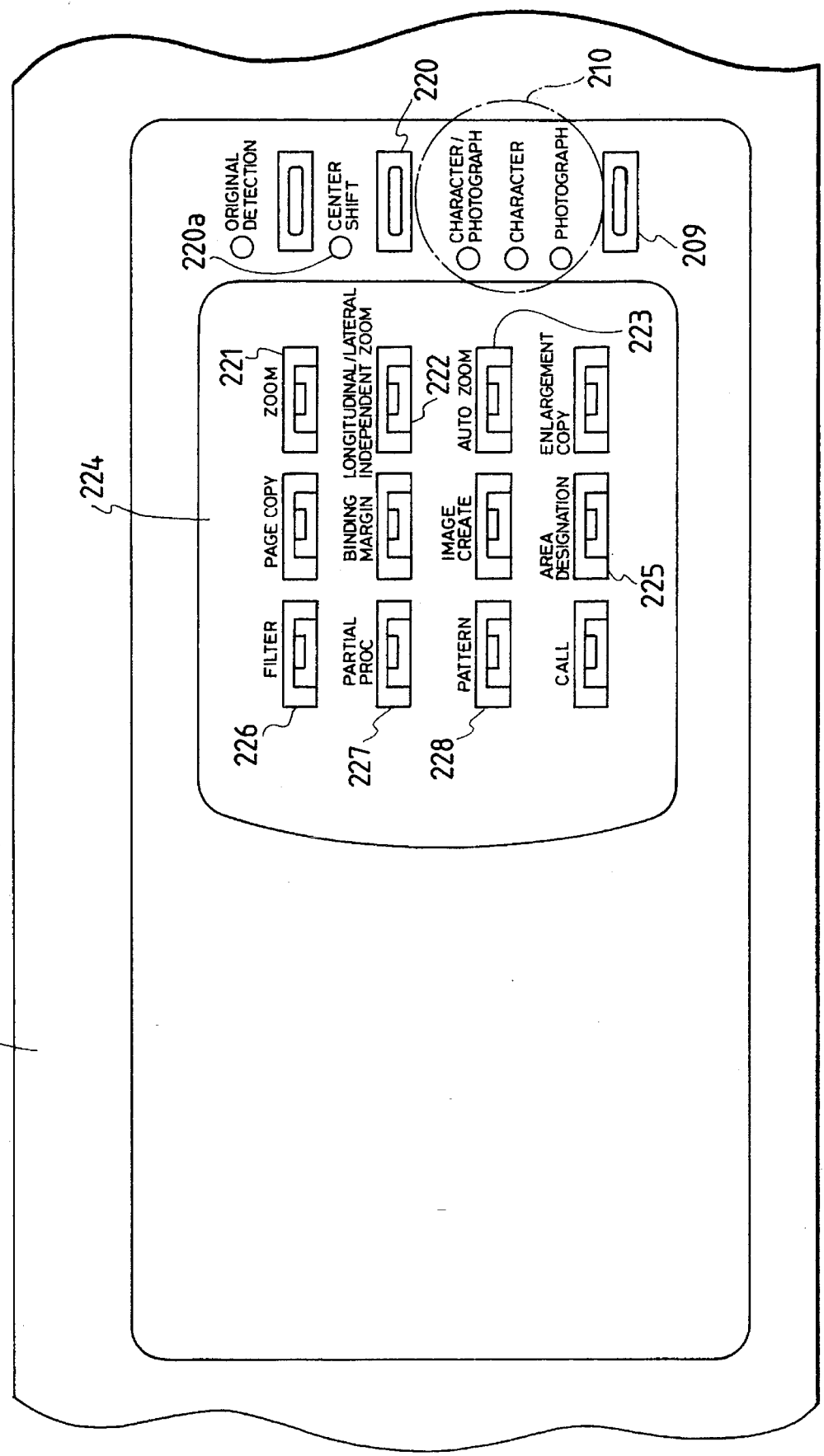
FIG. 4B is an enlarged view of part of FIG. 4A.
Figure 4C:
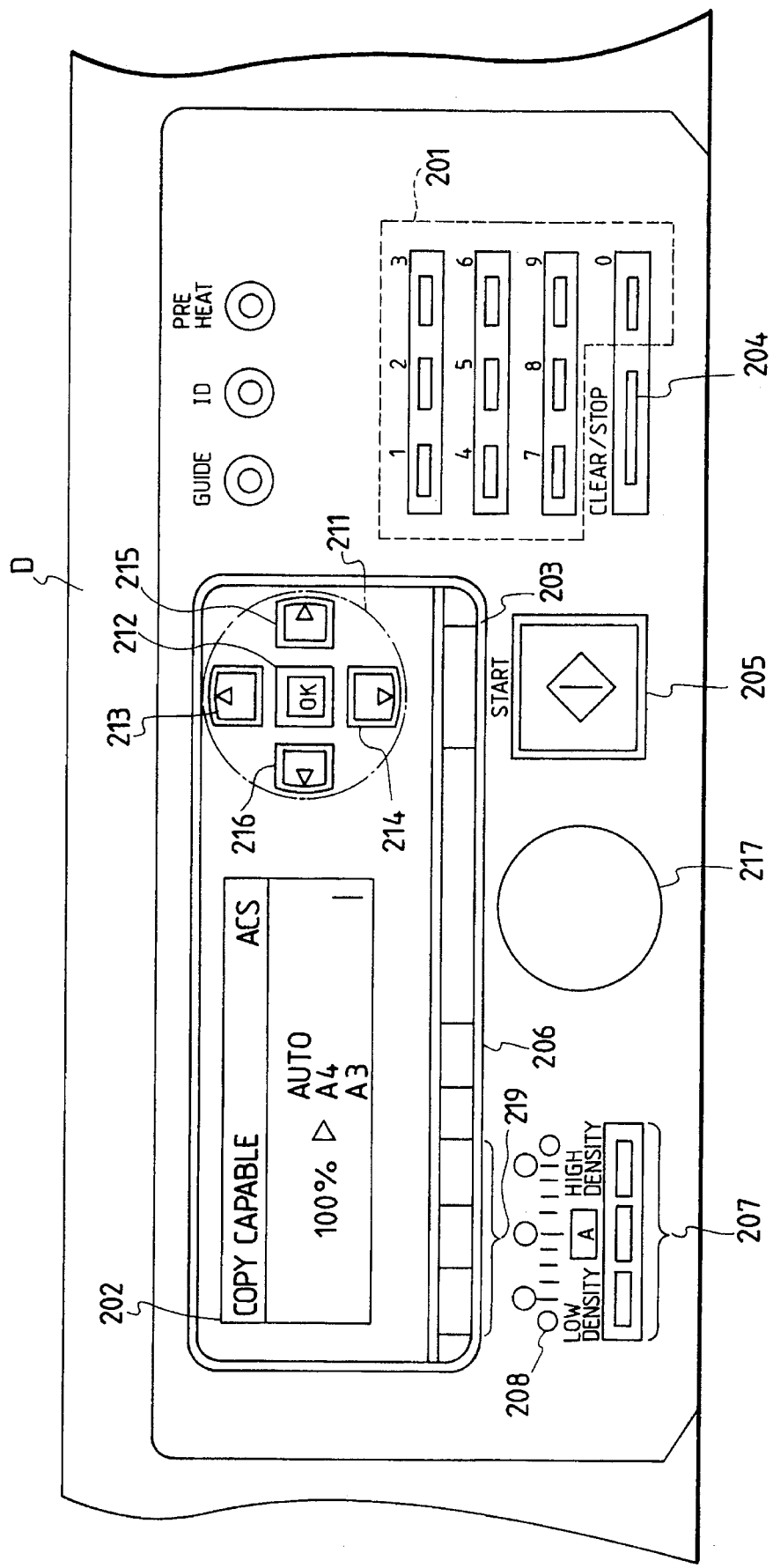
FIG. 4C is an enlarged view of part of FIG. 4A.
Figure 4D:
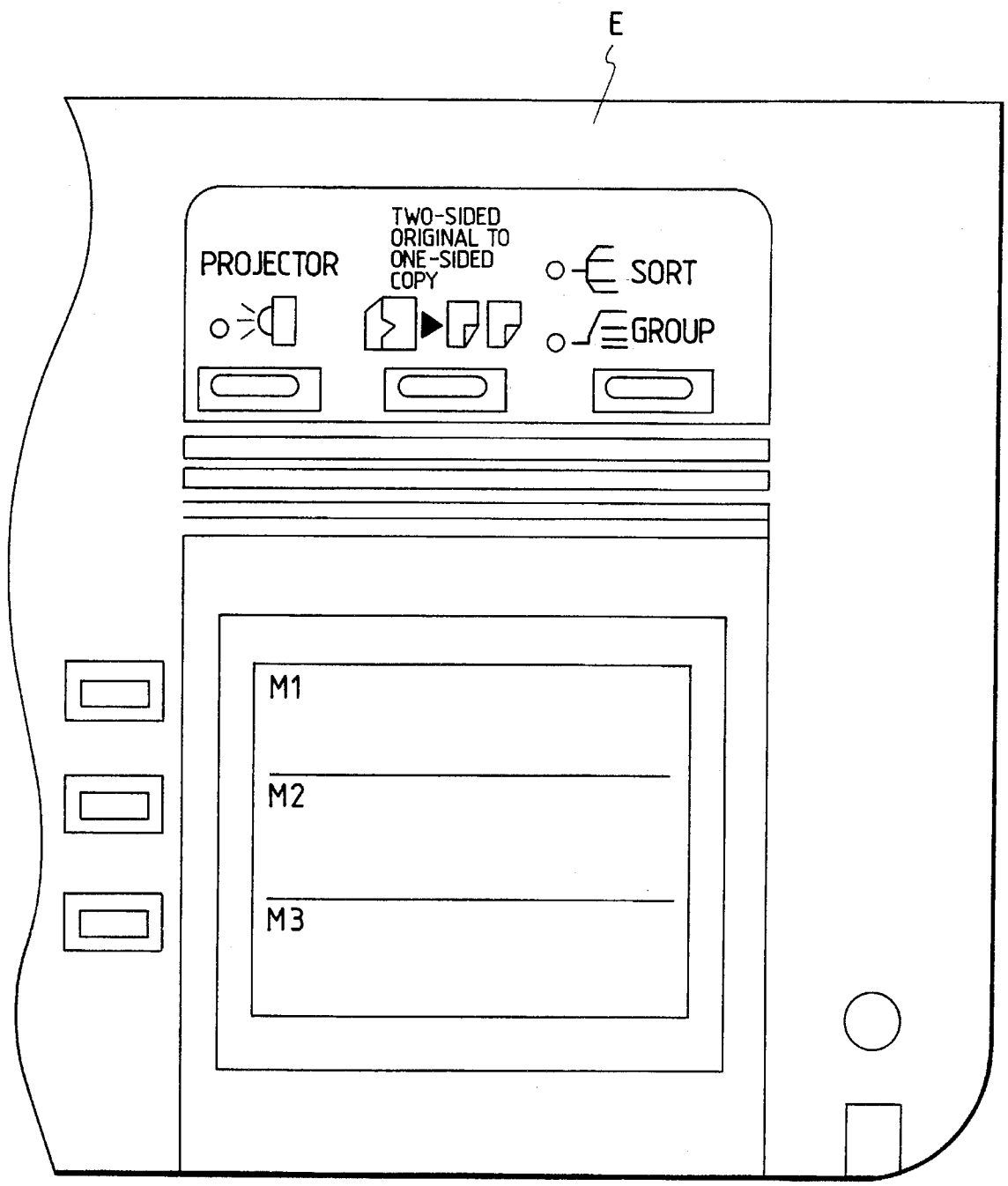
FIG. 4D is an enlarged view of part of FIG. 4A.

FIGS. 4A to 4D show the operation unit of the copying apparatus shown in FIG. 2. The components will be described below. FIGS. 4B, 4C, and 4D are enlarged views of portions C, D, and E in FIG. 4A.

201 denotes a ten-key pad, which is used to enter numeric values ranging from 0 to 9 in order to specify the number of copies or a magnifying power for zooming. 202 is a liquid crystal color display panel or a touch panel, representing a color screen display (designation means) for setting copy modes or informing operators of operation procedures, machine states, form sizes, and magnifying powers for enlargement copy. 203 denotes a Reset key or a key for initializing a currently specified mode. 204 is a Clear/Stop key, which stops an operation when the machine is actuated, and clears the number of copies or other numeric value specified with a ten-key pad when the machine is not actuated. 205 denotes a Copy Start key for starting a copy operation. 206 is a key for selecting a form size. A selected form size, for example A4 appears on a display panel 202. 207 denotes density adjustment keys for adjusting copy density from the lightest to darkest or vice versa. 208 represents nine light emitting diodes (hereafter, LED) for indicating a current density level. 209 is an original type mode select key for selecting a character mode, photography mode, or character/photography mode according to the original type. 210 represents LEDS which light to indicate, respectively, that the character mode, photography mode, or character/ photography mode has been selected.

211 represents control keys including an OK key 212, an Up arrow key 213, a Down arrow key 214, a Right arrow key 215, and a Left arrow key 216. The control keys are used to move a cursor on the display panel 202 specify modes. 217 denotes a rotary knob, which will be described in detail. 219 represents enlargement, reduction, and full-scale keys for enlarging or reducing a regular form size to another regular form size, or copying original in full-scale. 220 is a Centering key for centering an original in a copy form. When centering is specified, an LED 220a lights. 221 is a Zoom key for specifying a magnifying power in 1% steps in the range of 25% to 400%. 222 denotes a Longitudinal/ Lateral Independent Zoom key, which is used to produce copies by changing the magnifying powers for the longitudinal and lateral directions of original in 1% steps in the range of 25% to 400%. 223 is an Auto Zoom key, which is used to produce copies automatically according to the size of an original. 224 denotes a Binding Margin key for moving an image of an original laterally to create binding margins. 225 denotes an Area Designation key for designating an area under an editor or other area designation means. 226 or a Filter key is used to adjust balance finely. 227 denotes a Partial Processing key for specifying an operation for a specific area or marker. 228 is a Pattern key, which will be described in detail.

Figure 1:
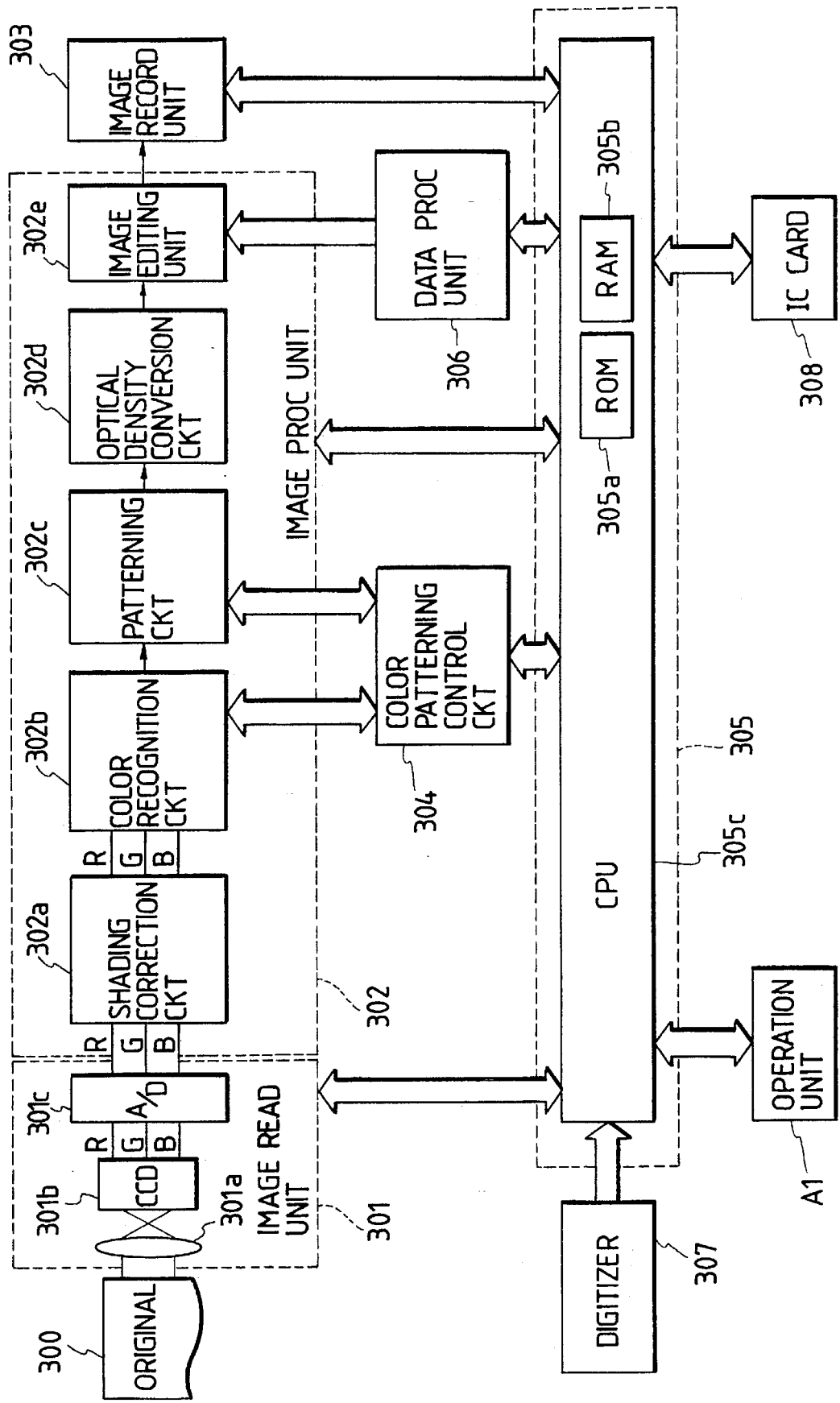
FIG. 1 is a block diagram showing the configuration of a digital copying apparatus of an embodiment of the present invention.

FIG. 1 is a block diagram showing an embodiment of the present invention, schematizing a color patterning system for a copying apparatus shown in FIGS. 2 and 3.

In FIG. 1, color information of an original 300 passes through a lens 301a and a CCD sensor 301b in an image read unit 301, then enters an A/D converter 301c to undergo A/D conversion. The digitized signal goes to an image processing unit 302. In the image processing unit 302, a shading correction circuit 302a performs shading correction on the signal. Then, the signal advances to a color recognition circuit 302b (color identification means). In this stage, a color designated by a color patterning control circuit 304 and a pattern designated according to the color are recognized. Then, the signal advances to a patterning circuit (conversion means) 302c. The circuit 302c converts an area containing the identified color into a corresponding pattern. Then, the signal goes to an optical density conversion circuit 302d and an image editing unit 302e. After undergoing all operations in the image processing unit 302, the signal advances to an image record unit 303. The image record unit 303 includes a control circuit for controlling a motor for transporting transferred paper, a laser recording circuit for writing video signals sent from the image processing unit 302 on a photosensitive drum, and a developing control circuit for developing. A CPU circuit 305 consists of a ROM 305a, a RAM 305b, and a CPU 305c, which controls the image read unit 301, the image processing unit 302, the image record unit 303, a data processing circuit 306, an operation unit A1, a digitizer 307, and an IC card 308, and thereby globally handles sequence control of the copying apparatus.

Figure 5:
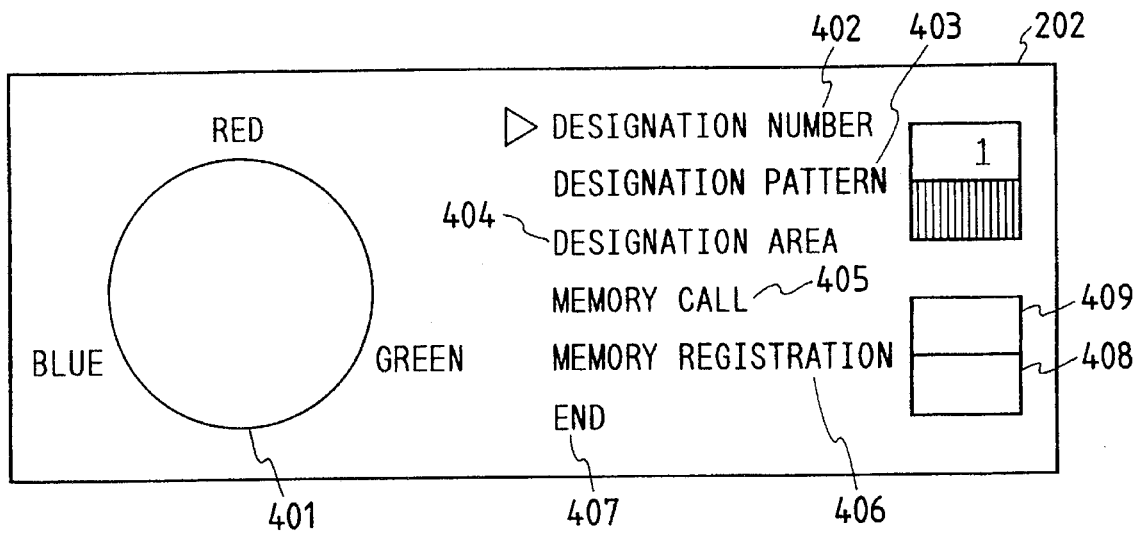
FIG. 5 shows an example of a screen of a color screen display 202 of the operation unit A1.

FIG. 5 shows a screen for designating color patterns displayed on a color screen display 202. When a Pattern key 228 is pressed, the liquid crystal screen of the display 202 becomes as shown in FIG. 5 (steps S1 and S2 in FIG. 6).

In FIG. 5, 401 denotes a color plane in which reference colors of red, blue, and green appear. The reference colors are interposed with intermediate colors. 402 indicates a field for entering a patterning designation number (number used for memory read to be described later). A triangular cursor is moved to the Designation Number field 402 using Up and Down keys 213 and 214 (step S3). A designation number is entered using a ten-key pad 201 or Left and Right keys 215 and 216 (see FIG. 9A-1 ) (step S4). 403 indicates a Designation Pattern field. The cursor is set at the Designation Pattern using the Up and Down keys 213 and 214 (step S3). The Left and Right keys 215 and 216 are used to select a pattern (see FIG. 9A-2) (step S5).

404 indicates a Designation Area field. When the cursor is placed at the Designation Area 404 (step S3), a designated pattern (initially, a line) appears in the color plane 401 (see FIG. 9A-3) (step S6). First of all, the Left and Right keys 215 and 216 are used to move a line (indicating a radius) to the position of a color to be converted (See FIG. 9A-4) (steps S7 to S9). An OK key 212 is used to determine an initial point (see FIG. 9A-5) (steps S7 to S10). Then, the Left and Right keys 215 and 216 are used to move the designated pattern to other position (terminal point) (see FIG. 9B-1) (steps S11, and S7 to S9). When the OK key 212 is pressed, an area between the initial and terminal points (for example, an area between purple and orange) is specified to be converted into the designated pattern (see FIG. 9B-2) (steps S7, S10, and S12).

Figures 4, 9A:
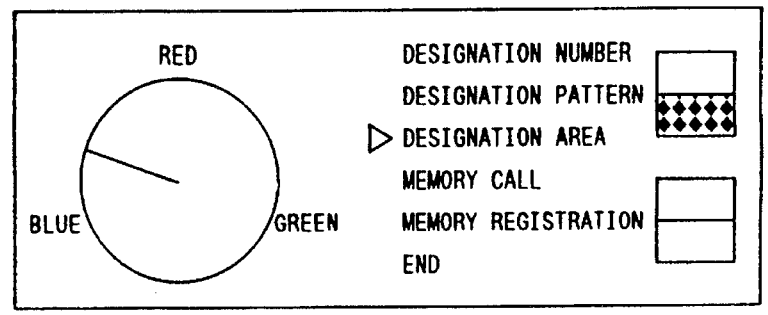
Figures 5, 9A:
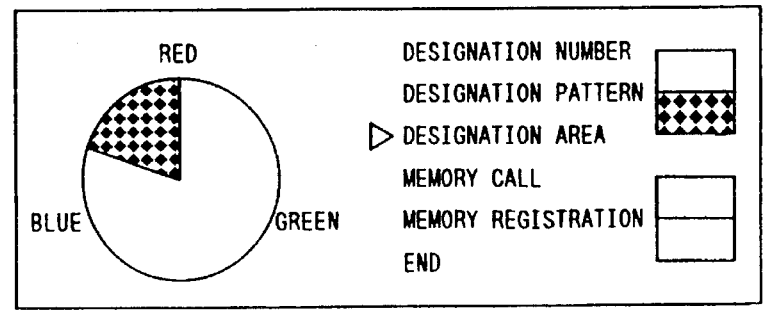
Figures 1, 9B:
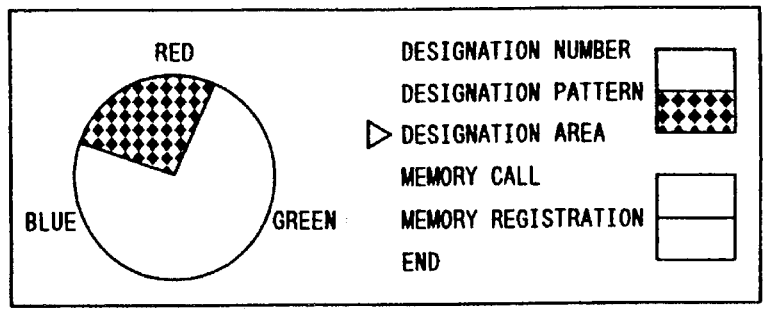
Figures 2, 9B:
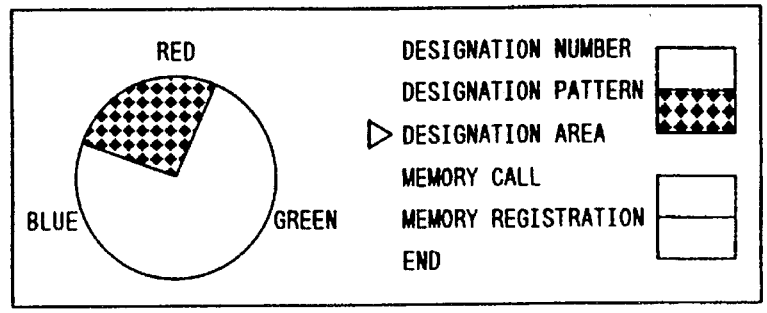
Figures 3, 9B:
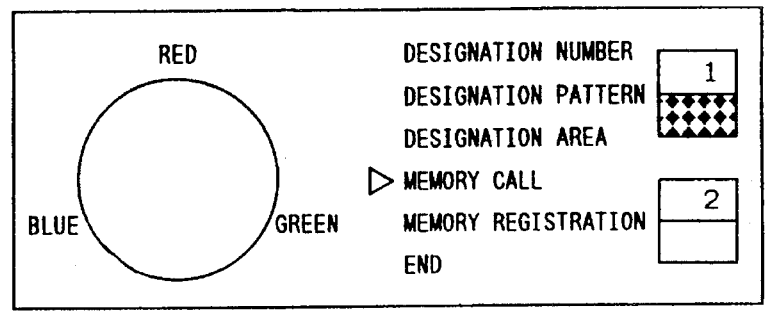
Figures 4, 9B:
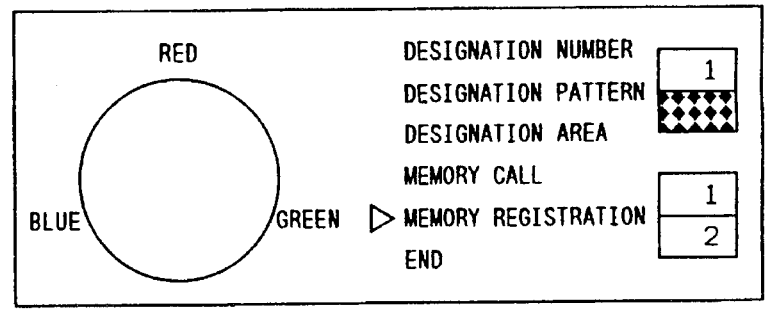
Figures 5, 9B:
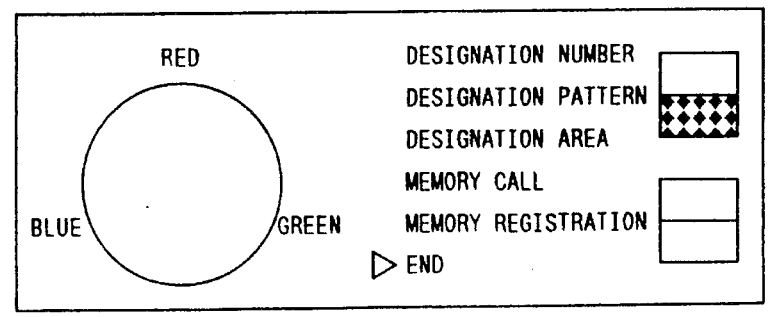

405 indicates a field of Memory Call for reading the contents of a registration number registered in a memory (RAM) 305b (see FIG. 9B-3). Memory read is performed according to steps S13 to S16 in FIG. 6. The Up and Down keys 213 and 214 are used to set the triangular cursor at the Memory Call (step S3). A registration number to be called is entered, then the OK key is pressed (steps S13 and S14).

If the number has already been registered, the contents of the registration number are read (steps S15 and S16). After that, control is returned to the step S3.

406 indicates a field of Memory Registration for placing a designated area and pattern in the memory 305b together with a registration number (see FIG. 9B-4). Memory registration is performed according to steps S17 to S19 in FIG. 6. The Up and Down keys 213 and 214 are used to set the triangular cursor at the Memory Registration (step S3). A registration number is entered and the OK key 212 is pressed (steps S17 and S18). Thus, the designated area and pattern are registered (step S19).

407 indicates an End field for termination, which is used to return the display 202 to the reference screen. Termination is performed according to steps S20 to S22 in FIG. 6. The Up and Down keys 213 and 214 are used to set the triangular cursor at the End (step S3). When the OK key 212 is pressed (step S20), color patterning setting terminates (step S21). Then, the display 202 returns to the reference screen (see of FIG. 9B-5) (step S22).

An indicator 408 indicates a memory number (registration number) to be registered. When the OK key 212 is turned on (step S18), the memory number is registered. If a memory number to be registered has already been registered, the indicator 498 blinks the number. When the indicator 498 is blinking, if the OK key 212 is turned on, new contents are overwritten on the contents already registered.

An indicator 409 indicates a registration number to be called. When the OK key 212 is turned on (step S14), the registration number is called. If a called registration number has not been registered, the indicator 409 blinks the number. At this time, calling is not done.

Next, another embodiment of the present invention will be described in conjunction with FIGS. 4 and 6 described above as well as FIGS. 7, 10A-1 through 10A-5 and 10B-1 through 10B-5.

In the foregoing embodiment, an area is converted into a color pattern using a color plane on a color screen 202 of an operation unit, or specifically, Left and Right keys 215 and 216 are used to move the color pattern to designate the area. In this embodiment, the color plane is moved to specify a color pattern.

Figure 7:
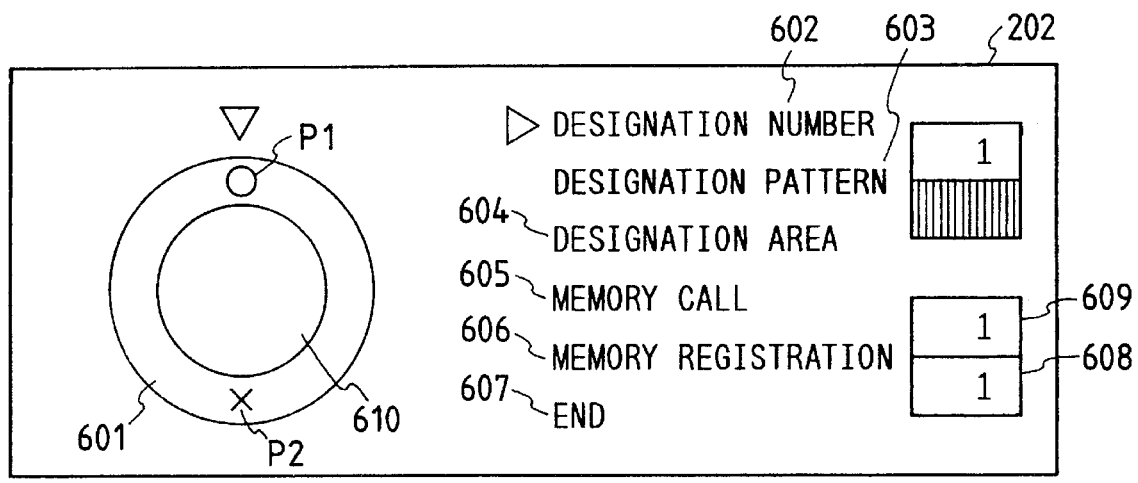
FIG. 7 shows other example of a screen of the color screen display 202 of the operation unit A1.

FIG. 7 shows an image for designating a color pattern displayed on the color screen display 202. When a Pattern key 228 is pressed, the screen 202 or a liquid crystal screen becomes as shown in FIG. 7. 601 and 610 represent color planes. 602 denotes a patterning Designation Number field. A triangular cursor is set at the Designation Number using Up and Down keys 213 and 124 (step S3 in FIG. 6). A ten-key pad 201 or the Left and Right keys 215 and 216 are used to enter a designation number (see FIG. 10A-1) (step S4). 603 denotes a Designation Pattern field. The cursor is set at the Designation Pattern 603 using the Up and Down keys 213 and 214. The Left and Right keys 215 and 216 are used to select a pattern (see FIG. 10A-2) (step S5).

Figures 1, 10A:
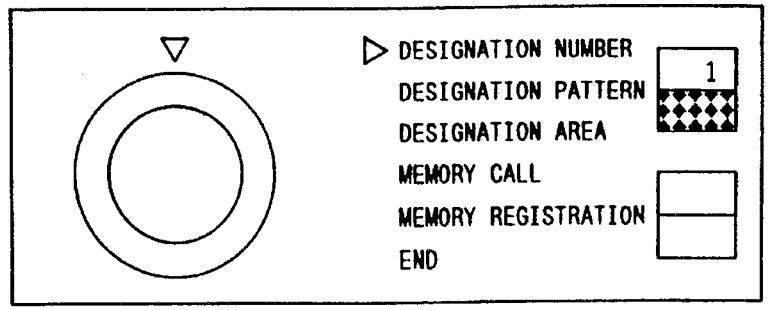
Figures 2, 10A:
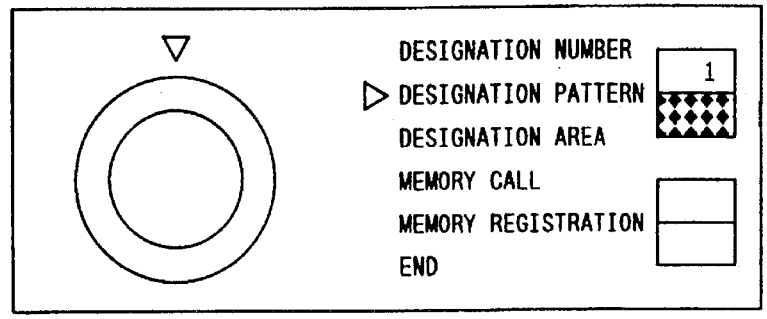
Figures 3, 10A:
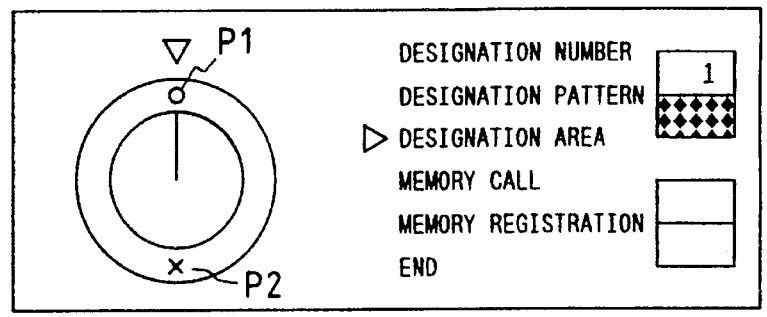
Figures 4, 10A:
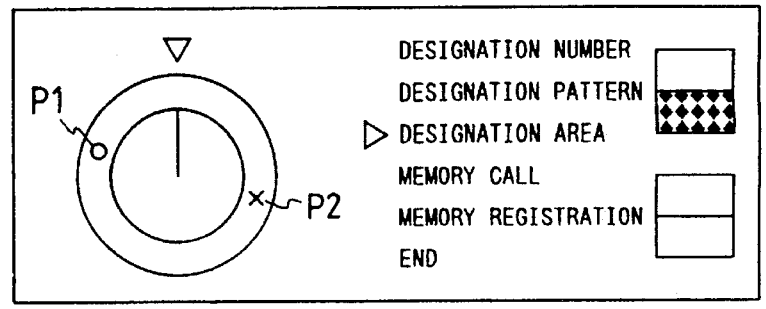
Figures 5, 10A:
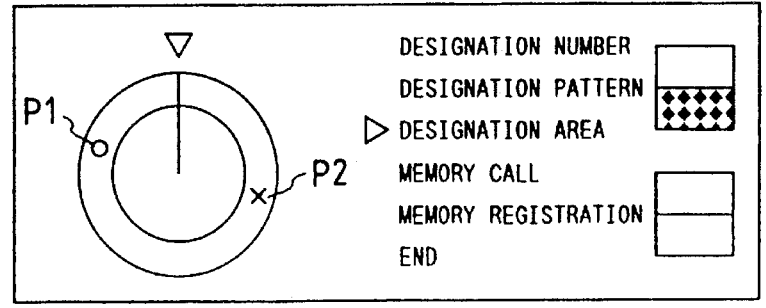
Figures 1, 10B:
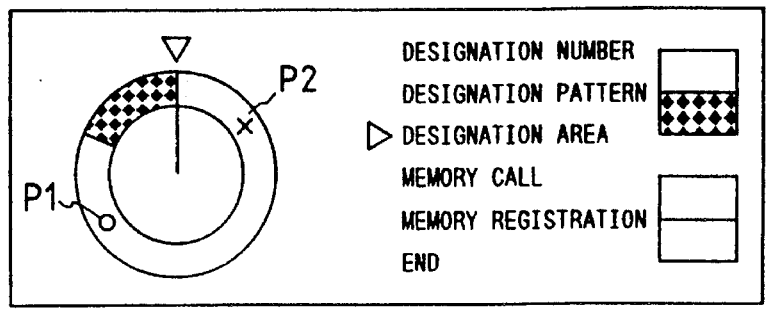
Figures 2, 10B:
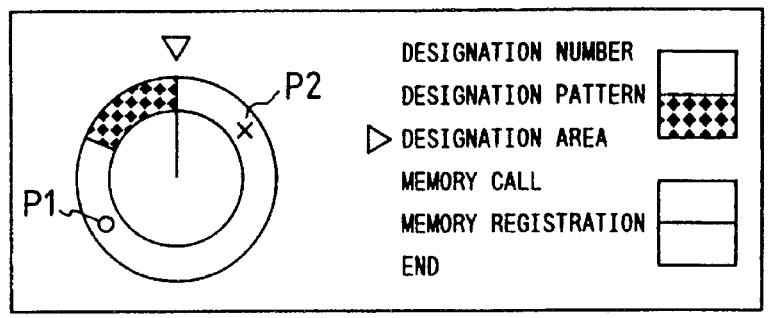
Figures 3, 10B:
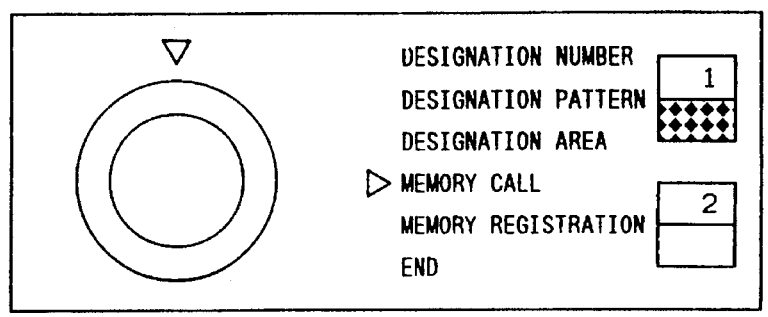
Figures 4, 10B:
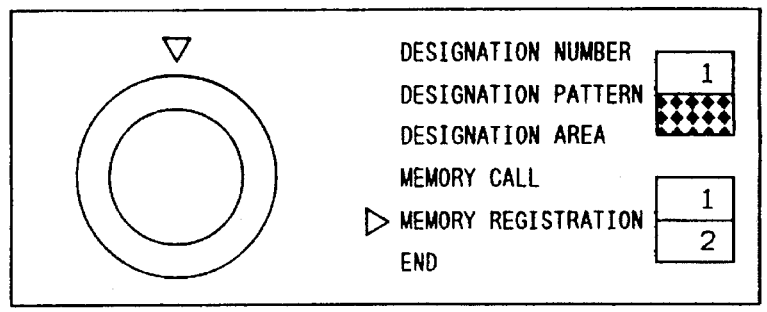
Figures 5, 10B:
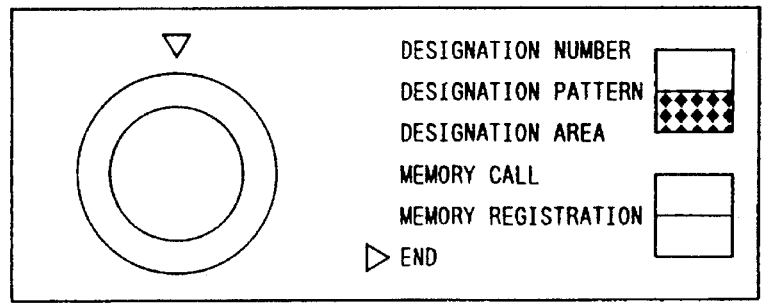

604 denotes a Designation Area filed. When the cursor is set at the Designation Area 604, a designated pattern (initially, a line) appears in the color plane 610. This line extends from the center point of the color plane 610 to the circumference of a smaller circle or toward the mark or a position P1 (a position P2 is on the opposite side of P1) (see FIG. 10A-3) (step S6). The Left and Right keys 215 and 216 are used to rotate the color plane 610, and thus move the line to the position of an intended color (see FIG. 10A-4 ) (steps S7 to S9). In this embodiment, the color plane 610 is rotated counterclockwise when viewed from above the drawing, as shown in FIG. 10A-4 . Then, an OK key 212 is used to determine an initial point (see FIG. 10A-5) (steps S7 and S10). The Left and Right keys 215 and 216 are used to rotate the color planes 601 and 610 together with the designated pattern to other position (terminal point) (see FIG. 10B-1) (steps S11, and S7 to S9). When the OK key 212 is pressed, the area between the initial and terminal points is specified to be converted into the designated pattern (see FIG. 10B-2) (steps S7, S10, and S12).

Symbols 605 to 609 in FIG. 7 correspond to 405 to 409 in FIG. 5. The operations are the same. Further description will, therefore, be omitted.

Next, other embodiment of the present invention will be described in conjunction with FIG. 8.

In the aforesaid embodiment, an area is converted into a color pattern using a color plane on a color screen of an operation unit, or specifically, Left and Right keys 215 and 216 are used to move the color plane or a pattern to designate the area and pattern. In this embodiment, a rotary knob 217 (FIG. 4) having a color plane is used to specify a color pattern. On the screen shown in FIG. 5 or 7, a color range for a pattern is specified using the Left and Right keys 215 and 216. In this embodiment, the rotary knob 217 having the color plane is employed. The knob 217 operates in synchronization with the color plane on the color screen. When the knob 217 is rotated, the color plane on the screen rotates.

Figure 8B:
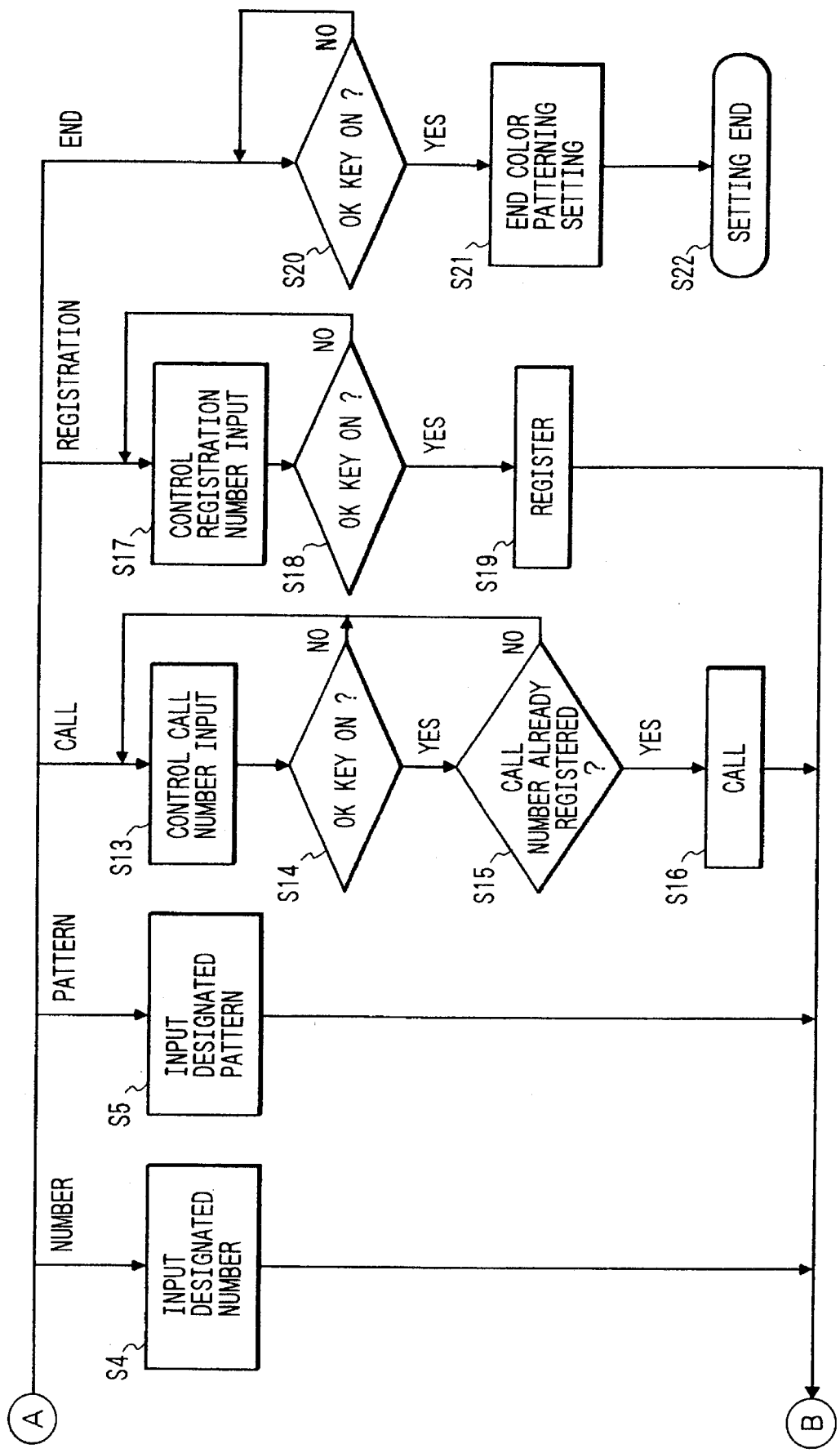
FIG. 8 consisting of FIGS. 8A and 8B, is a flowchart of a pre-setting sequence for color patterning in the embodiment.

FIG. 8 is a flowchart showing the setting operation. FIG. 8 differs from FIG. 6 in that a step S23 comes instead of a step S8, or that the knob 217 is used instead of the Left and Right keys 215 and 216. As described previously, the functions of the knob 217 are identical to those of the Left and Right keys 215 and 216. Further description will, therefore, be omitted.

Thus, the aforesaid embodiments of the present invention do not require area designation and point designation using a digitizer which are indispensable to copying apparatuses of prior art. Color patterning can be executed merely by designating a color plane with a pattern. This results in ease of operation and speedy processing.

Color patterning can be finely adjusted effortlessly.

Other embodiment of the present invention will be described in conjunction with FIGS. 11 to 14.

Figure 11:
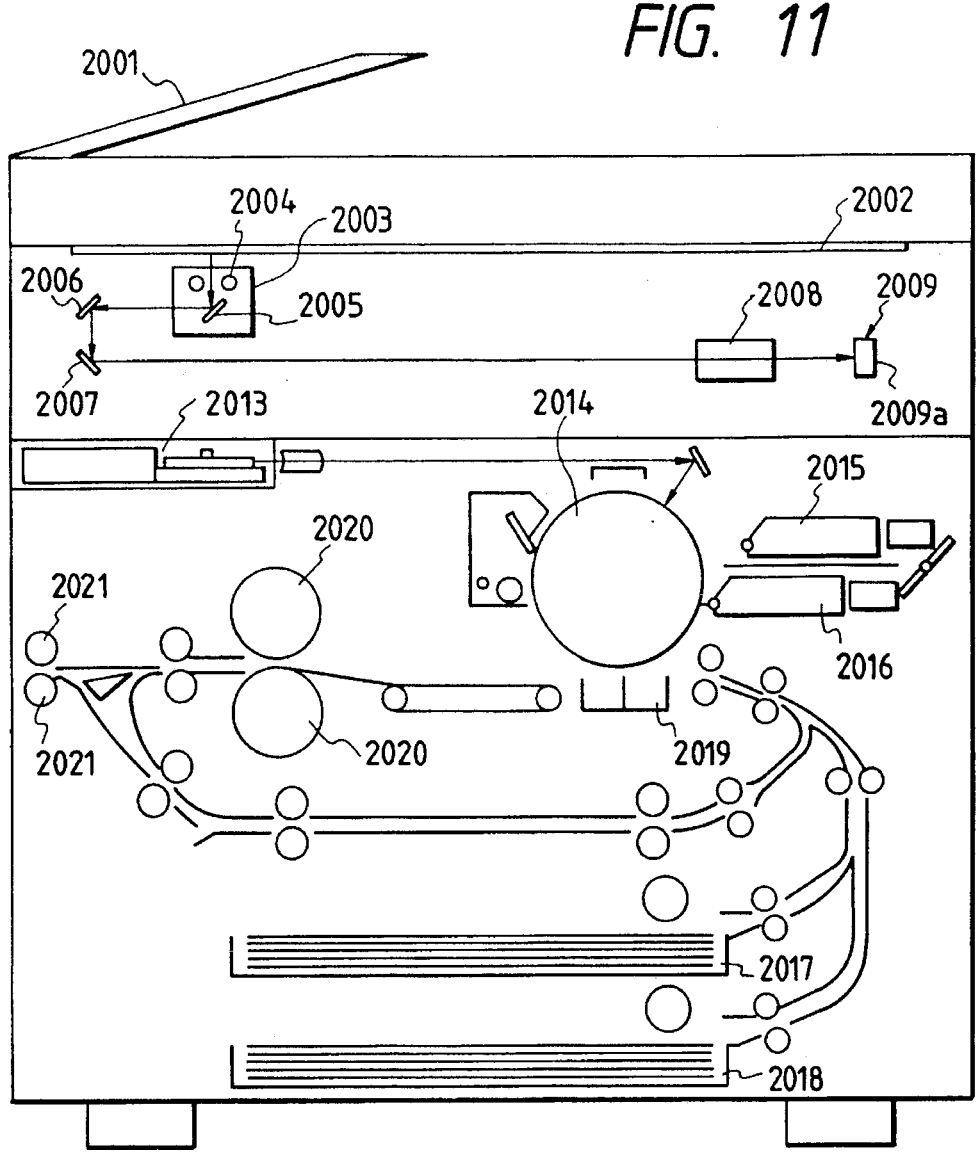
FIG. 11 is a cross-sectional diagram showing the internal configuration of an image processing apparatus of another embodiment of the present invention.

FIG. 11 is a side view showing the internal configuration of an image processing apparatus of an embodiment of the present invention. 2001 denotes an original feeder. Originals stacked on the original feeder are sequentially carried onto an original glass base one by one. When an original is carried, a lamp on a scanner 2004 of a scanner unit 2003 lights. Then, the scanner unit 2003 moves to emit light all over the original.

Figure 12:
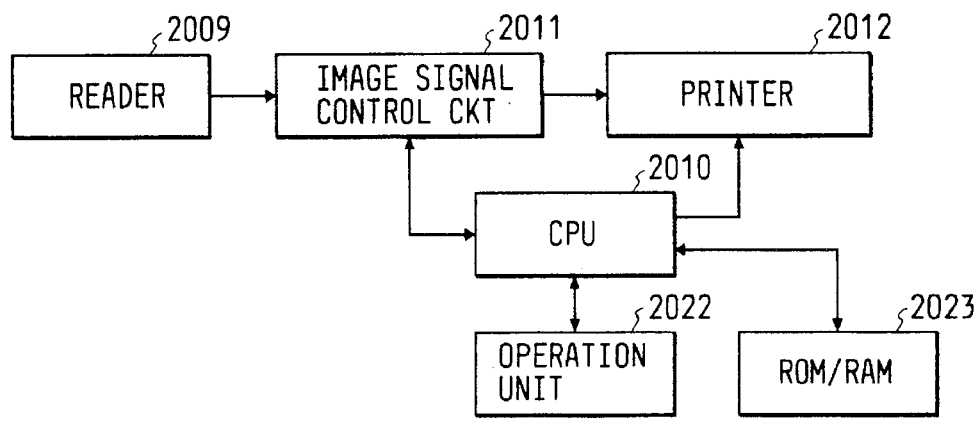
FIG. 12 is a general block diagram of the image processing apparatus shown in FIG. 11.

Light reflected from the original passes through a lens 2008 via mirrors 2005, 2006, and 2007, then enters a color CCD image sensor 2009 in a reader 2009. An image signal fed to the color CCD image sensor 2009 or an input signal sent from the reader 2009 shown in FIG. 12 is processed by an image signal control circuit 2011 under the control of a CPU 2010, then fed to a printer 2012.

The signal fed to the printer 2012 is converted into an optical signal by an exposure control 2013 shown in FIG. 11. Thus, light is emitted over a photosensitive drum 2014 according to the image signal. The light emitted creates a latent image on the photosensitive drum 2014. Then, the latent image is developed by a primary developing unit 2015 or a secondary developing unit 2016.

When the latent image is created, a transferred form is fed from a primary transferred form stacker 2017 or a secondary transferred form stacker 2018 at the same time. Then, the developed image is transferred onto the transferred form.

Then, the transferred image is fused on the transferred form by fusing rollers 2020. After that, the transferred form is ejected from the apparatus by ejecting rollers 2021. 2022 in FIG. 12 denotes an operation unit, and 2023, ROM, RAM, or any other storage element.

(Normal copy mode)

Figure 13:
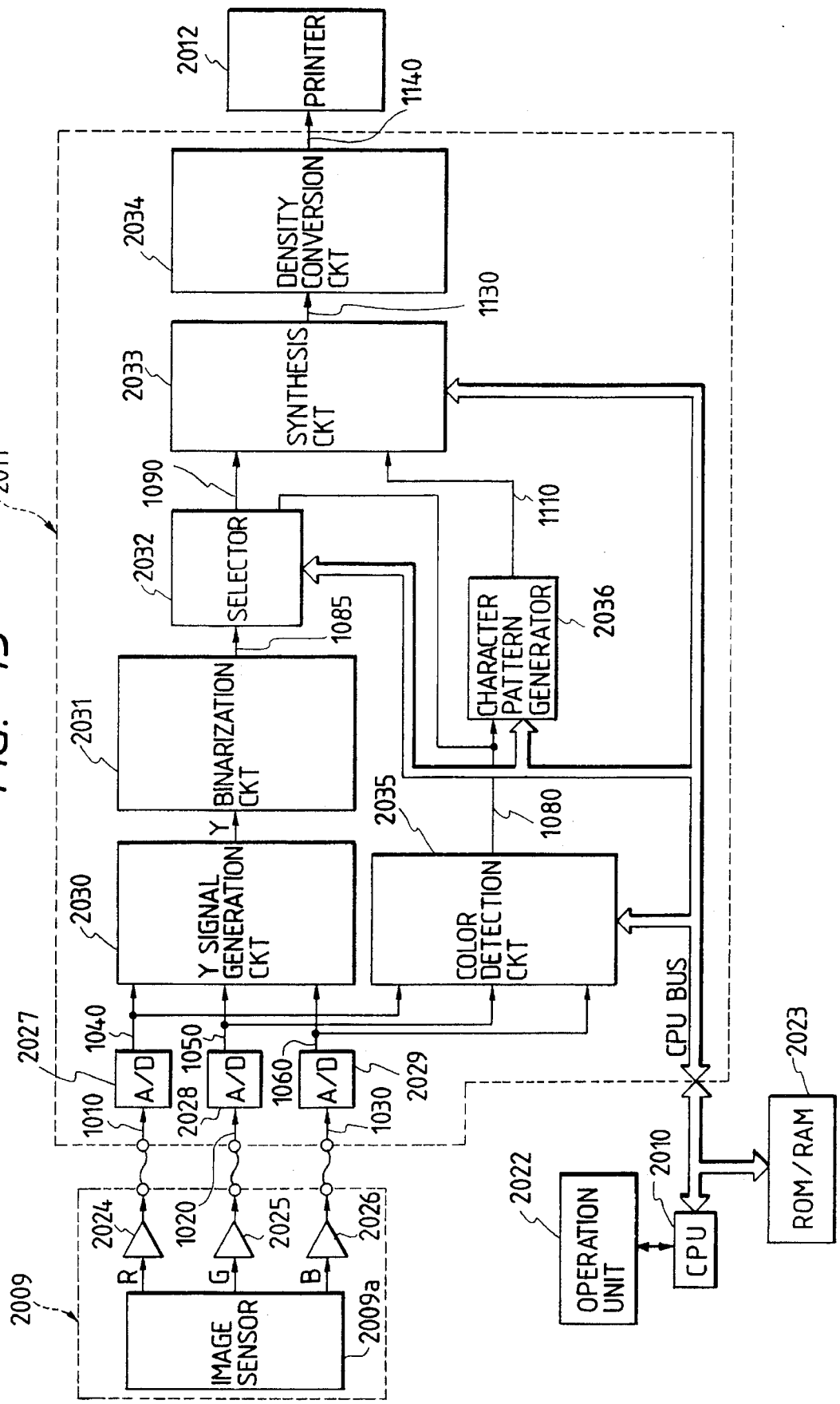
FIG. 13 is a particular block diagram of the image processing apparatus shown in FIG. 11.

Next, the operation of an image processing apparatus according to the present invention in normal copy mode will be described in conjunction with FIG. 13.

Image information of R (red), G (green), and B (blue) signals, which have been photoelectrically transferred from an original by a color CCD image sensor 2009a in a reader 2009, go to amplifiers 2024, 2025, and 2026 corresponding to the three colors. These amplifiers 2024, 2025, and 2026 amplify the R, G, and B signals to the input levels of A/D converters 2027, 2028, and 2029 in an image signal control circuit 2011. Then, the amplified R, G, and B signals 1010, 1020, and 1030 enter the A/D converters 2027, 2028, and 2029. These A/D converters 2027, 2028, and 2029 convert the R, G, and B signals 1010, 1020, and 1030 of analog image information into digital signals 1040, 1050, and 1060. The output (digital) signals 1040, 1050, and 1060 of the A/D converters 2027, 2028, and 2029 enter a Y signal generation circuit 2030 in the next stage to produce a luminance signal Y according to the following expression:

$$Y=0.30R+0.59G+0.11B$$

where R represents a signal 1040, G, a signal 1050, and B, a signal 1060.

The multivalued luminance signal Y is fed to a binarization circuit 2031 in the next stage and converted into a binary luminance signal 1085. The binary luminance signal 1035 enters a selector 2032 to become a binary-coded signal 1090. The binary-coded signal 1090 goes to a synthesis circuit 2033 in the next stage. The selector 2032 selects the binary luminance signal 1085 under the control of a CPU 2010. The synthesis circuit 2033 changes its functions under the control of the CPU 2010, and selects only the signal 1090 in normal copy mode.

An output signal 1130 of the synthesis circuit 2033 goes to a density conversion circuit 2034 in the next stage. The density conversion circuit 2034 has a function for providing a printer 2012 with a signal 1140 generated by reversing the polarity of a composite signal 1130 sent from the synthesis circuit 2033. The output signal 1140 of the density conversion circuit 2034 enters a printer 2012 in the next stage to form a monochrome image.

(Color detection composite mode)

Next, the operation of an image processing apparatus in color detection composite (synthesis) mode will be described in conjunction with FIGS. 12 to 14.

In the color detection composite mode, characters representing the names of colors are printed on a monochrome output image according to the color information in an original. This helps discern color areas of an image.

Before executing a copy operation, the color detection composite mode is specified at an operation unit 2022 shown in FIG. 12. When a Start key on the operation unit 2022 is pressed, a copy operation starts. Image information containing color information of R, G, and B signals 1010, 1020, and 1030 are read from an original by a color CCD image sensor 2009a in a reader 2009, then, as described concerning the normal copy mode, converted into digital signals 1040, 1050, and 1060 by A/D converters 2027 to 2029. Then, the digital signals are recomposed by a Y signal generation circuit to produce a luminance signal Y. The luminance signal Y is changed to a binary luminance signal 1085 by a binary coding circuit 2031 in the next stage. Then, the binary luminance signal 1085 becomes a binary-coded signal 1090 after passing through a selector 3032 in the next stage.

On the other hand, the R, G, and B signals 1040, 1050, and 1060 sent from the A/D converters 2027, 2028, and 2029 enter a color detection circuit 2035 as well as the Y signal generation circuit 2030. The combinations of level ratios of the R, G, and B signals 1040, 1050, and 1060 are compared with a preprogrammed color detection table to detect the colors contained in an input signal. At the same time, the color detection circuit 2035 identifies areas having the same colors and sends an identification signal (color detection signal) 1080 to a character pattern generator 2036. The character pattern generator 2036 generates character patterns indicating the color names informed with the detection signal 1080 sent from the color detection circuit 2035. The character pattern generator 2036 provides the synthesis circuit 2033 with a character pattern signal.

The synthesis circuit 2033 synthesizes the binary-coded signal 1090 sent from the aforesaid binarization circuit 2031 and the character pattern signal 1110 sent from the character pattern generator 2036, then inputs the resultant signal to the density conversion circuit 2034 in the next stage. With the identification signal 1080 sent from the color detection circuit 2035, the binary-coded signal 1090 in which color information contained in the binary luminance signal 1085 from the binarization circuit 2031 is converted into white information by the selector 2032 is sent to the synthesis circuit 2033. The density conversion circuit 2034 outputs a signal 1140 generated by reversing the polarity of a composite signal 1130 of the binary-coded signal 1090 and character pattern signal 1110. The output signal of the density conversion circuit 2034 goes to a printer 2012 in the next stage to produce a monotone or monochrome image with character patterns representing color names appended.

The effects of the aforesaid image processing apparatus in color detection composite mode will be described in conjunction with FIGS. 14 and 15.

Figure 14:
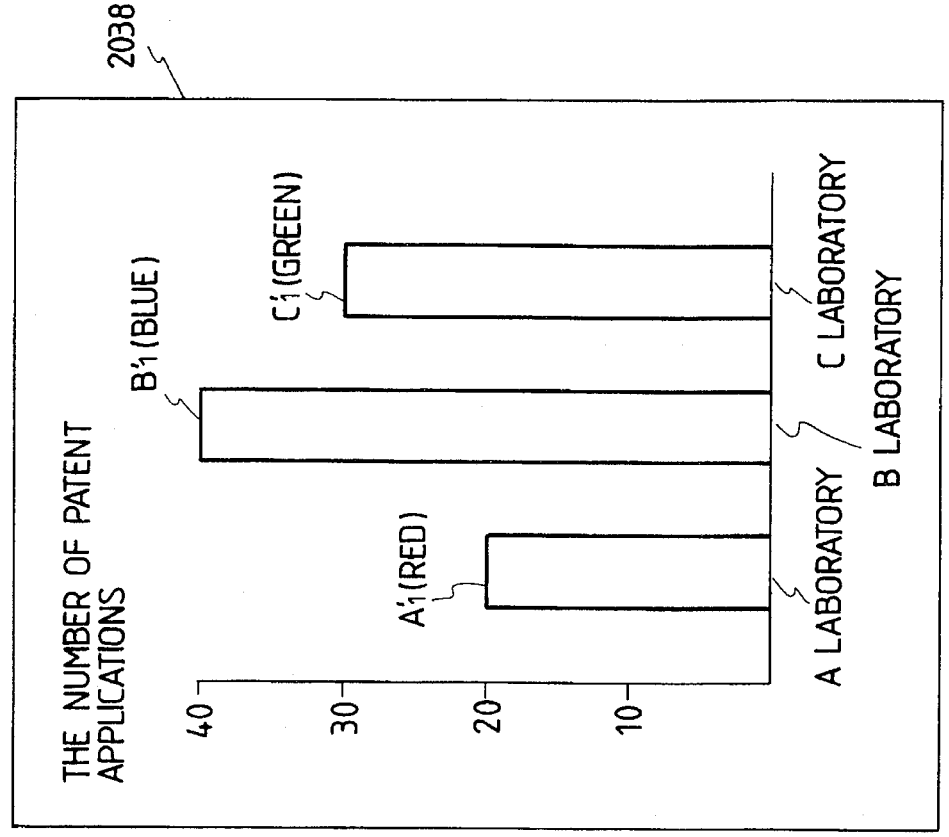
FIG. 14 shows an original to be read by the image processing apparatus.
Figure 15:
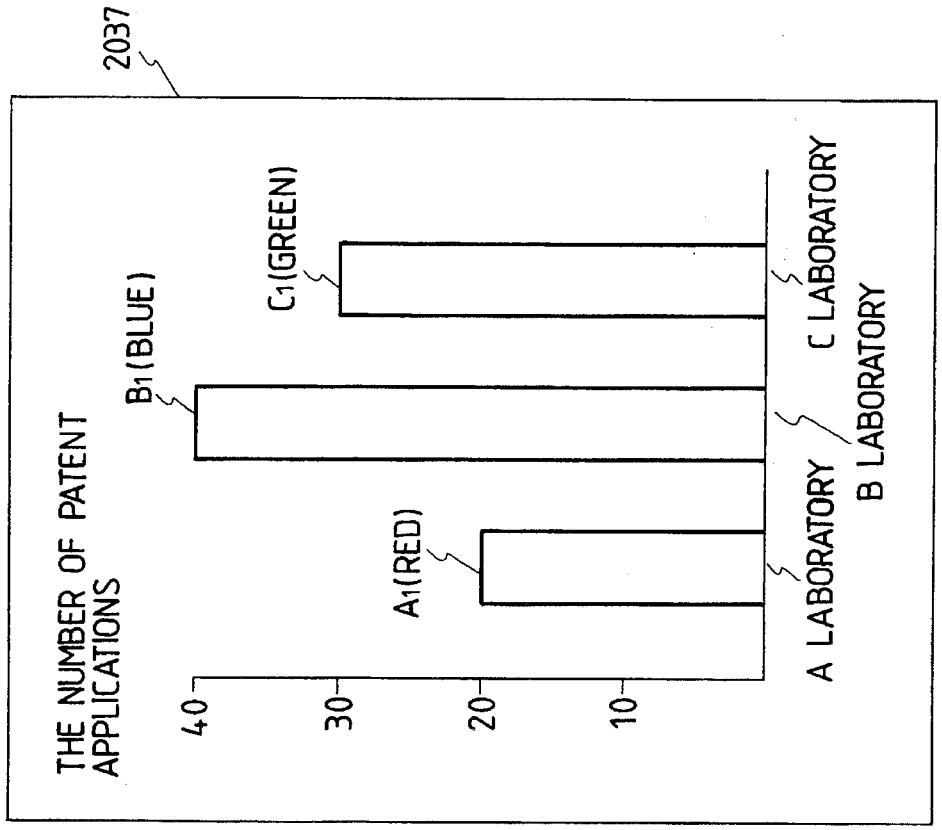
FIG. 15 is an explanatory diagram of a processed image of the original shown in FIG. 14.

2037 in FIG. 14 denotes a colored original. 2038 in FIG. 15 is an image the image processing apparatus has printed after reading the colored original 2037 and processing the read data.

The original 2037 shown in FIG. 14 is a bar chart indicating the numbers of patent applications by laboratories A, B, and C for comparison study. A bar graph A1 for the laboratory A is colored with red, a bar B1 for the laboratory B, with blue, and a bar C1 for the laboratory C, with green. FIG. 15 shows a processed image 2038 the image processing apparatus has produced using the original 2037. In the monochrome or monotone processed image 2038, character patterns representing characters "RED", "BLUE", and "GREEN" indicating the names of the colors of the bar graphs A1, B1, and C1 in the original 2037 of FIG. 14 are synthesized on the bar graphs A1, B1, and C1 shown in FIG. 15. This makes it possible to recognize the colors of pixels in the color images of the original 2037.

As described above, the colors in the original images are detected using color information an information generation means has generated, then character patterns indicating the color names are generated according to the color detection signal. Therefore, even if a low-priced monochrome printer is employed, it is possible to provide monotone processed images which permits effortless and accurate recognition of the colors of pixels in original images.

Next, other embodiment of the present invention will be described in conjunction with FIGS. 16 to 33.

Figure 16:
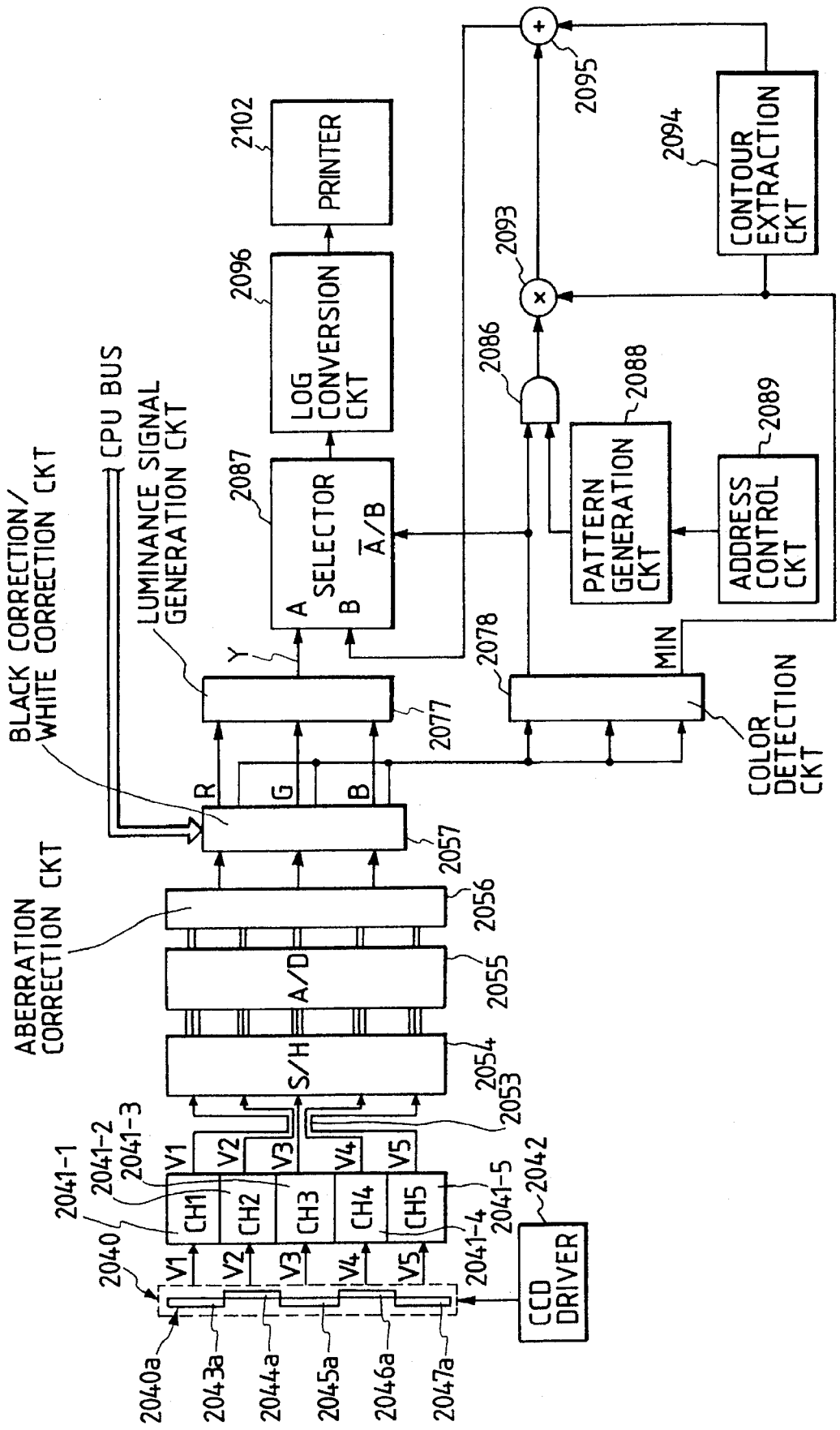
FIG. 16 is a particular block diagram of an image processing apparatus of another embodiment of the present invention.

FIG. 16 is a block diagram of an image processing apparatus according to other embodiment of the present invention. A fully-colored original is exposed to light originating from an exposure light which is not shown. The reflected color image is formed by a color image is formed by a color CCD image sensor. The provided analog image signal is digitized by an A/D converter. The fully-colored digital image signal is processed, filtered, then fed to a thermal transfer printer, ink-jet printer, or laser beam printer, which is not shown. Thus, an image is produced.

An original is illuminated by an exposure lamp which is not shown. The reflected light is handled by a color CCD image sensor 2040 in a reader 2040 so that colors will be separated for each image. Then, the read color signals are amplified to given levels by amplifiers 2041-1, 2041-2, 2041-3, 2041-4, and 2041-5. In this configuration, the color CCD image sensor 2040a is driven by CCD driver 2042.

Figure 17A:
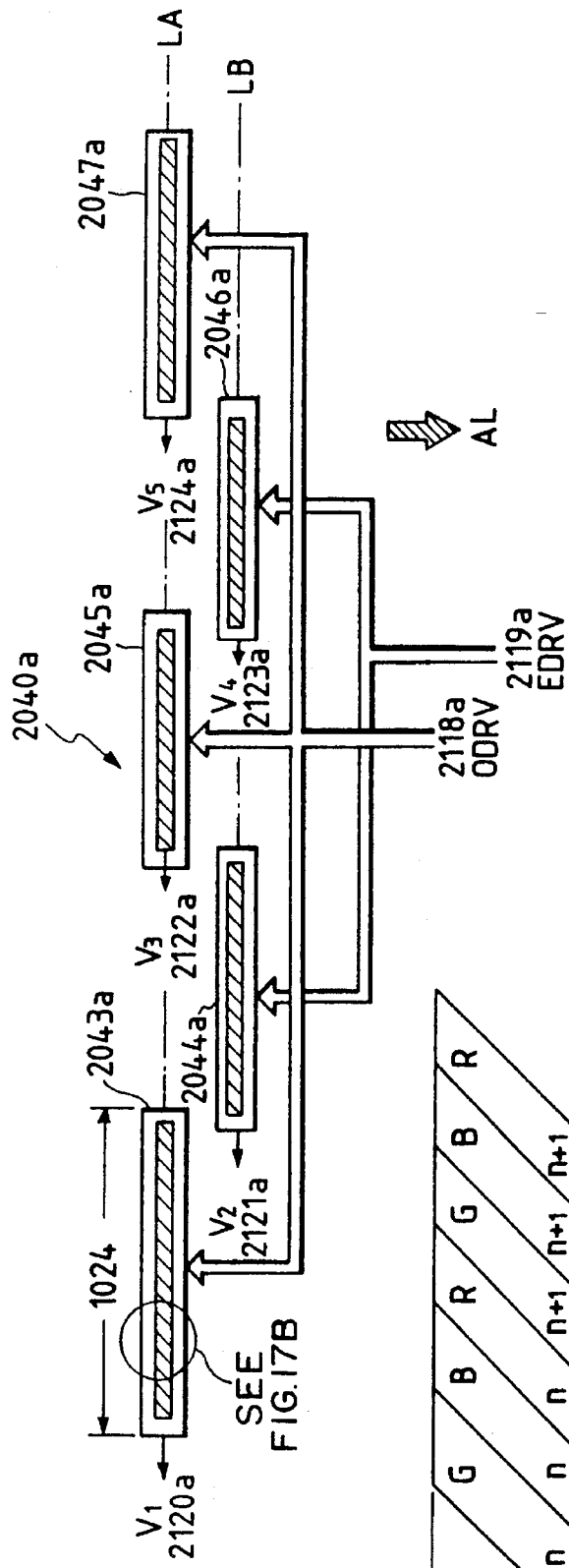
FIG. 17 is a configuration diagram of a color CCD image sensor 2040 shown in FIG. 16.
Figure 17B:
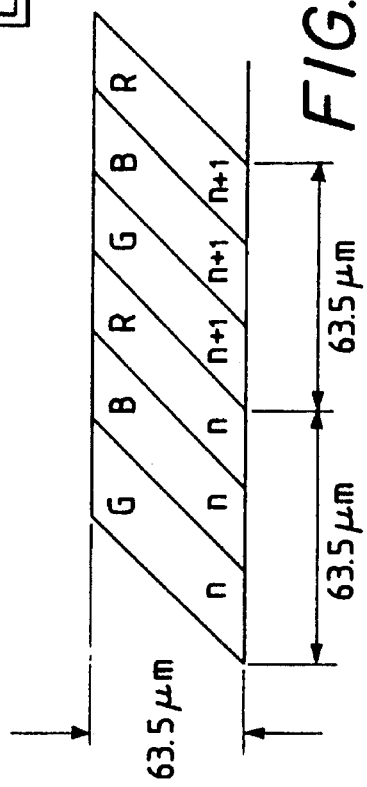

FIG. 17 is a configuration diagram of the color CCD image sensor 2040a shown in FIG. 16.

The color CCD image sensor 2040a used in this embodiment is designed to read an image signal as five different portions arranged in main-scan direction. Herein, one pixel is assumed to be 63.5 µm long. The color CCD image sensor 2040a supports 400 dots per inch (hereafter, dpi) and permits 1024 pixels. One pixel falls into color components G, B, and R arranged in main-scan direction as shown in FIG. 17. Consequently, the color CCD image sensor 2040a provides a total of 3072 (1024×3) effective pixels.

On the other hand, chips 2043a, 2044a, 2045a, 2046a, and 2047a of the color CCD image sensor 2040a are formed on the same ceramic substrate. The first, third, and fifth chips 2043a, 2045a, and 2047a are arranged on the same line LA, and the second and fourth chips 2044a and 2046a, on a line LB at a distance of four lines or 254 µm (63.5 µm×4) from the line LA. An original is scanned and read in A1-arrow direction.

Figure 18:
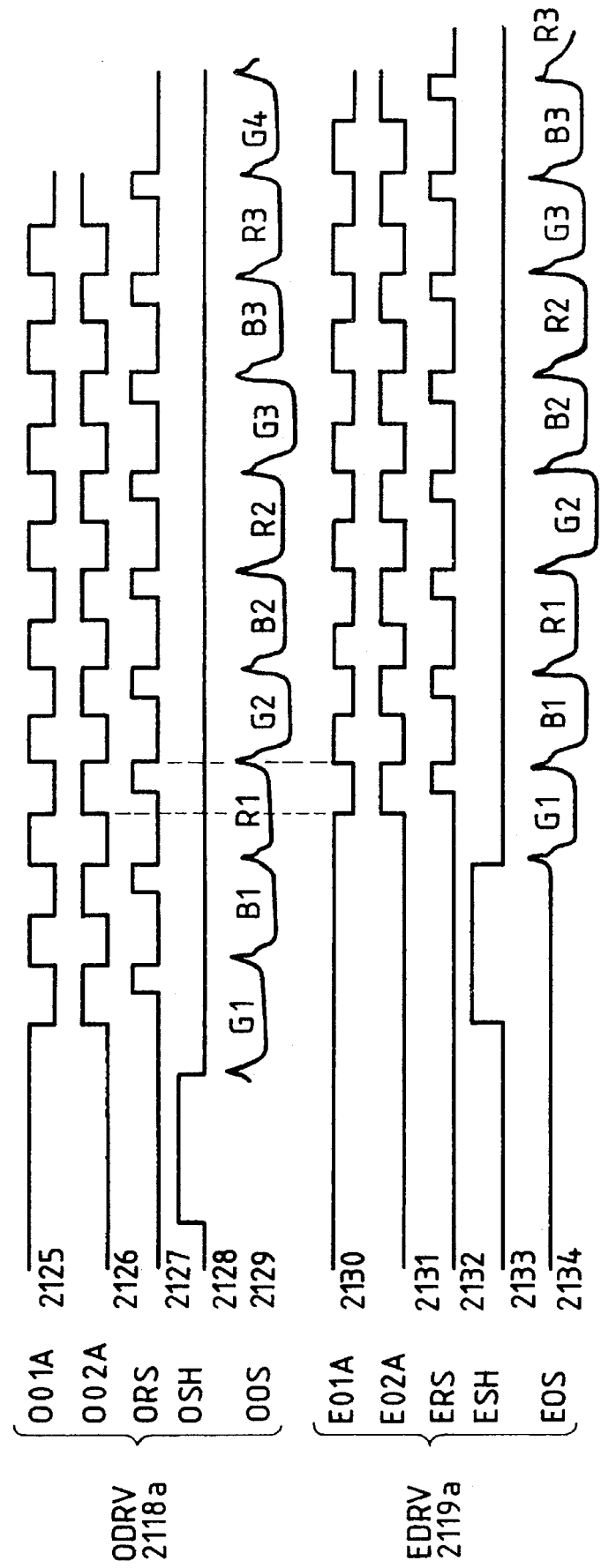
FIG. 18 is a timing chart showing an example of CCD drive pulse timings for the color CCD image sensor 2040 shown in FIG. 17.

FIG. 18 is a timing chart showing an example of timings of drive pulses shown in FIG. 17.

Among the five chips 2043a, 2044a, 2045a, 2046a, and 2047a in the color CCD image sensor 2040a, the first, third, and fifth chips 2043a, 2045a, and 2047a are driven independently and synchronously with a sensor drive pulse ODRV 2118A, and the second and fourth chips 2044a and 2046a, with an EDRV 2119A. O01A, O02A, and ORS contained in the ODRV 2118a, and E01a, E02A, and ERS contained in the EDRV 2219a serve as charge transfer clocks and charge reset pulses respectively for chips. The charge transfer clocks and charge reset pulses are generated to be fully synchronous, so that they will not cause jitter in each other. This suppresses mutual interference between the first, third, and fifth chips 2043a, 2045a, and 2047a and the second and fourth chips 2044a and 2046a, i.e., minimizes noise. From this viewpoint, the pulses are generated by a single reference oscillation source OSC 2048 (See FIG. 19).

Figure 19:
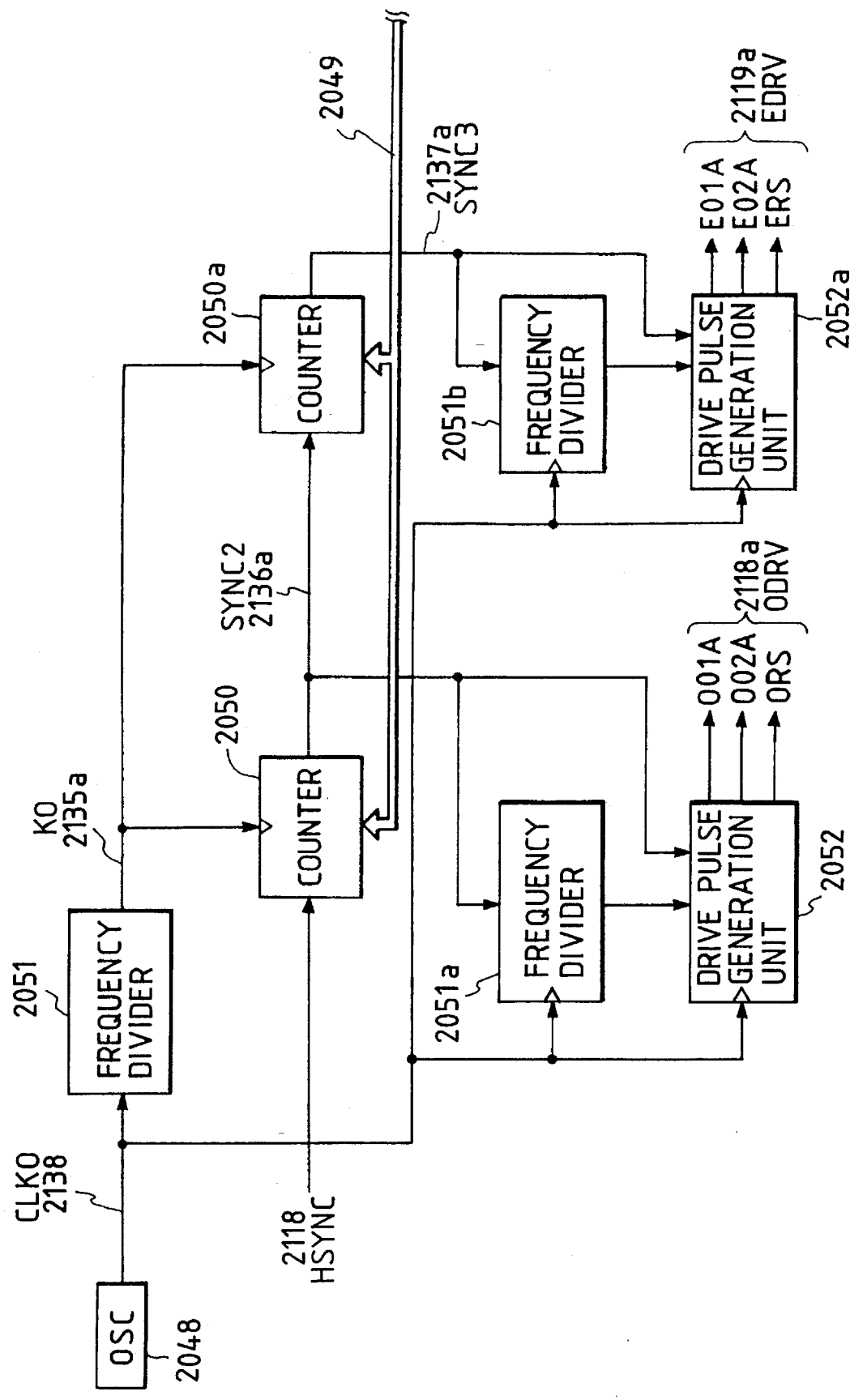
FIG. 19 is a block diagram of a CCD driver 2042 shown in FIG. 16.
Figure 20:
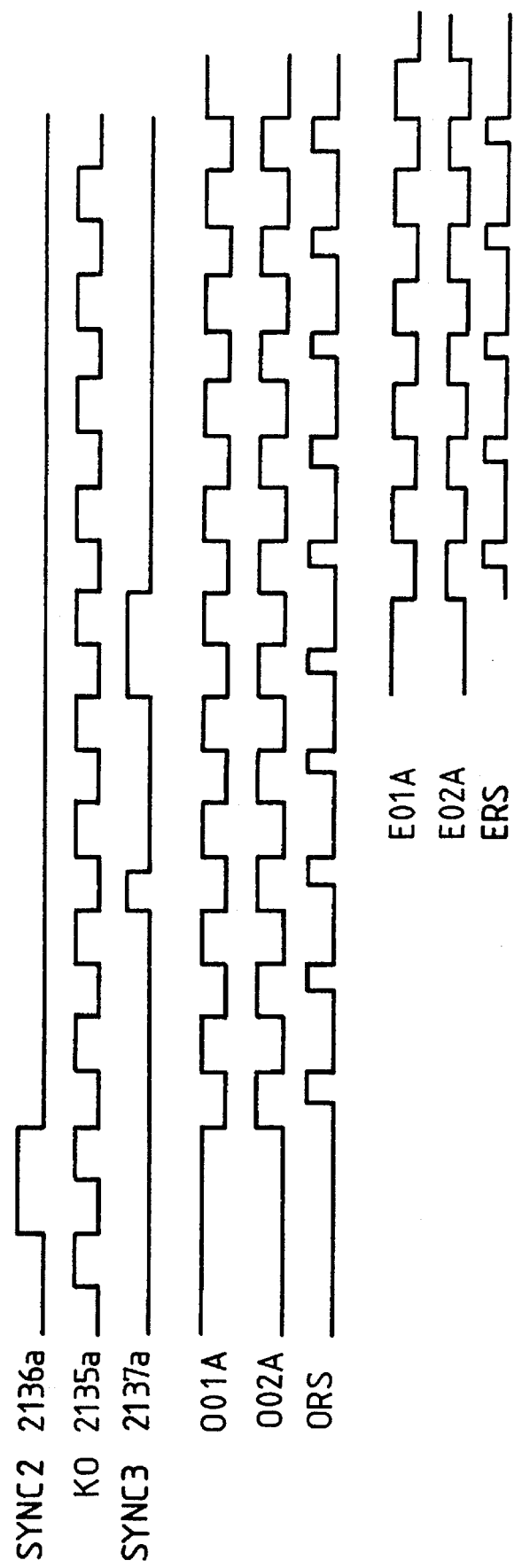
FIG. 20 is a timing chart showing an example of timings of components shown in FIG. 18.

FIG. 19 is a block diagram of the CCD driver 2042 shown in FIG. 16, and FIG. 20, a timing chart showing an example of timings of components shown in FIG. 19.

In FIG. 19, a raw clock CLKO 2138 the signal reference oscillation source OSC 2048 generates is frequency-divided by a first frequency divider 2051 to produce a clock KO 2135a. The clock KO 2135a generates reference signals SYNC2 and SYNC3 for determining timings of generating the ODRV 2118a and EDRV 2119a. Timings of outputting the reference signals SYNC2 and SYNC3 are determined according to the set values of presettable counters 2050 and 2050a which are specified via a signal cable 2049 linked to a CPU bus. The reference signals SYNC2 and SYNC3 initialize second and third frequency dividers 2051a and 2051b as well as drive pulse generation circuits 2052 and 2052a.

Specifically, with input of a scan reference signal HSYNC 2118, the sensor drive pulses ODRV 2118a and EDRV 2119a are generated according to the raw clock CLKO 2138 sent from the single reference oscillation source OSC 2048 and the frequency-division clock KO 2135a generated in synchronization with the raw clock CLKO 2138. Therefore, the sensor drive pulses ODRV 2118a and EDRV 2119a are provided as fully synchronous signals without jitter. This prevents signal distortion due to mutual interference among chips.

The sensor drive pulse ODRV 2118a or one of sensor drive pulses which are mutually synchronous is fed to the first, third, and fifth chips 2043a, 2045a, and 2047a shown in FIG. 17. Other sensor drive pulse EDRV 2119a is fed to the second and fourth chips 2044a and 2046a. The chips 2043a, 2044a, 2045a, 2046a, and 2047a independently provide image signals V1, V2, V3, V4, and V5 in synchronization with drive pulses. The image signals are amplified to given voltage levels by amplifiers 2041-1 to 2041-5 independently installed in channels CH1, CH2, CH3, CH4, and CH5 shown in FIG. 16. Then, the image signals V1, V3, and V5 are transmitted via a coaxial cable 2053 according to the timing of OOS 2129 shown in FIG. 18, and the image signals V2 and V4, according to the timing of EOS 2134. Eventually, the image signals go to an image signal processing circuit.

Image information of an original is fed to the image signal processing circuit, then read as five different portions of color image signals. The color image signal is decomposed into G, B, and R signals of green, blue, and red by a sample-and-hold (hereafter, S/H) circuit 2054 shown in FIG. 16. Namely, the S/H circuit 2054 outputs signals of 15 (3×5) channels.

Analog color image signals sent through the channels 1 to 5 CH1 to CH5, whose R, G, and B color components are sampled and held by the S/H circuit 2054, are digitized by an A/D conversion circuit 2055 in channels. The digitized signals originating from the channels 1 to 5 CH1 to CH5, which are mutually independent and lined in parallel, go to an aberration correction circuit 2056.

In this embodiment, as described previously (See FIG. 17), the color CCD image sensor 2040a in the reader 2040 has a width of four lines or 245 µm (63.5 µm×4) in the sub-scan direction and falls into five areas in the main-scan direction. Thus, this sensor has a staggered structure of five components for reading originals. Therefore, an aberration is created between the reading position of the channels 2 and 4 CH2 and CH4, which are leading in scanning, and that of the remaining channels 1, 3, and 5 CH1, CH3, and CH5. Then, the aberration correction circuit 2056 having a memory for storing data of multiple lines is used to correct the aberration. Thus, coherent information is transmitted through the five channels.

FIG. 21 is a block diagram of a black correction circuit of a black correction/white correction circuit 2057 shown in FIG. 16.

Figure 22A:
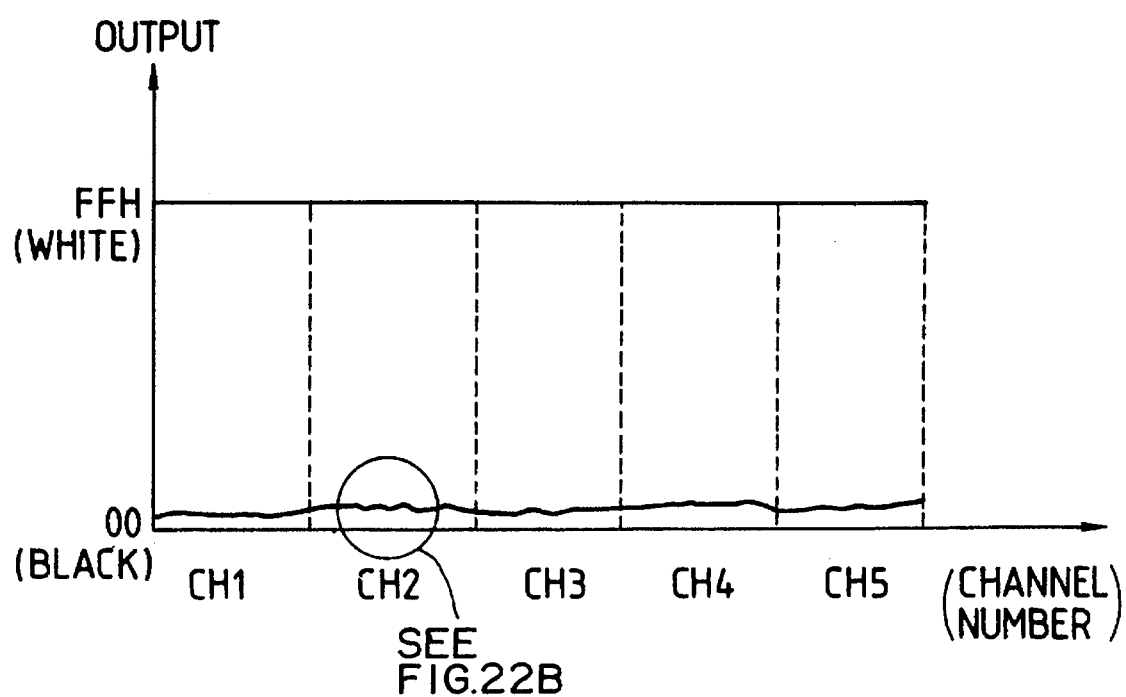
FIG. 22 shows a concept of black correction using the black correction circuit 2057.
Figure 22B:
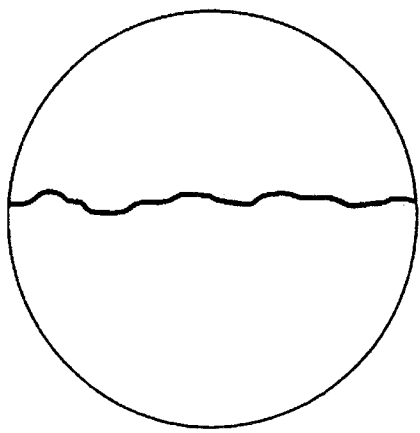

Black-level outputs of channels 1 to 5 CH1 to CH5 vary greatly among chips 2043a to 2047a or pixels, as shown in FIG. 22, when the quantity of incident light of a color CCD image sensor 2040a is very small. If the outputs are fed to a printer 2102 as they are, image data will contain streaks or become non-uniform.

The variations among output black levels must be corrected. For this correction, a circuit shown in FIG. 21 is employed for the correction.

Prior art reading an original, an original scan unit is moved to a black plate having uniform density which is arranged in a non-imaging area at the distal end of an original base, an exposure lamp is lit, then a black level image signal is fed to the black correction circuit of the black correction/white correction circuit 2057.

First, consideration is taken into a B signal Bin. To store the image data for one line in a black level RAM 2058, a first selector 2059 must select A (control line d), a gate 2060 must close (control line a), then other gate 2061 must open (control line b). That is to say, signal lines 2062, 2063, and 2064 are connected in that order. On the other hand, an address input signal line 2065 of the black level RAM 2058 must be initialized with a scan reference signal HSYNC and provided with an output signal 2067 of an address counter 2066 for counting pixel clocks VCLK. Therefore, a signal for a second selector 2068 is fed over a control signal line c. Thus, a black level signal for one line is stored in the black level RAM 2058 (a mode in which the foregoing operation is performed is referred to as a black reference value fetch mode).

During image read, the black level RAM 2958 is placed in data read mode. An image is read pixel by pixel and fed to an input B of a subtracter 2070 by tracing the lines in the route from the signal lines 2064 through 2069. That is to say, the gate 2061 closes (control line b), while the gate 2060 opens (control line a). A third selector 2071 selects an output A.

Therefore, a black correction circuit output signal 2157 from the subtracter 2070 is controlled with a signal 2072B, and provided as Bin (i)−DK (i)=BOUT (i), wherein a blue signal Bin is an input and black level data is represented as DK (i) (a mode in which this operation is performed is referred to as a black correction mode).

Similarly, when it comes to a G signal Gin and an R signal Rin, control is passed with signals 2072G and 2072R. The states of the control lines a, b, c, d, and e of the selectors 2059, 2068, and 2071, and the gates 2060 and 2061, which are used for the control, are changed by a latch 2074 allocated as an input/output of a CPU 2073 (See FIG. 27) under the control of the CPU.

When the selectors 2059, 2068, and 2071 select the Bs, the CPU 2073 can access the black level RAM 2058.

Figure 23:
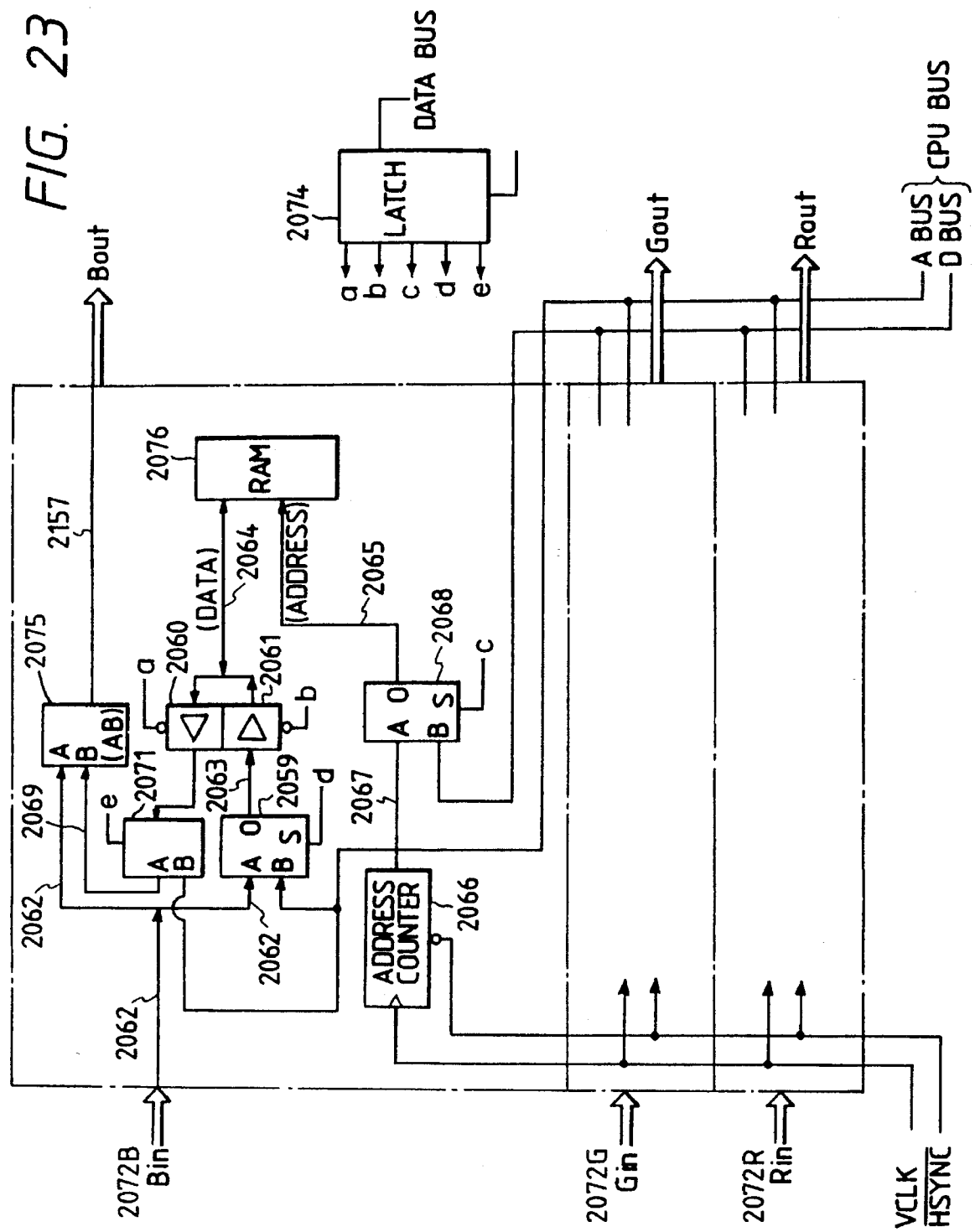
FIG. 23 is a block diagram of a white correction circuit in the black correction/white correction circuit 2057 shown in FIG. 16.

FIG. 23 is a block diagram of a white correction circuit of the black correction/white correction circuit 2057 shown in FIG. 16.

During white level correction (shading correction), sensitivity variations of an illumination system, an optical system, and a sensor are corrected based on white data obtained by illuminating an original scan unit with a uniform white plate moved.

The basic circuit configuration of the white correction circuit is identical to that of the black correction circuit shown in FIG. 21. Only one difference is that a subtracter 2070 is employed for black correction but a multiplier 2075 is employed for white correction. The same components will be assigned the same symbols. The description will, therefore, be omitted.

In color correction, when a color CCD image sensor 2040a for reading originals is at a read (home) position of a uniform white plate, or when a copy operation or read operation has not been performed, an exposure lamp which is not shown is lit and image data of uniform white level for one line is stored in a correction RAM 2076.

Figure 24:
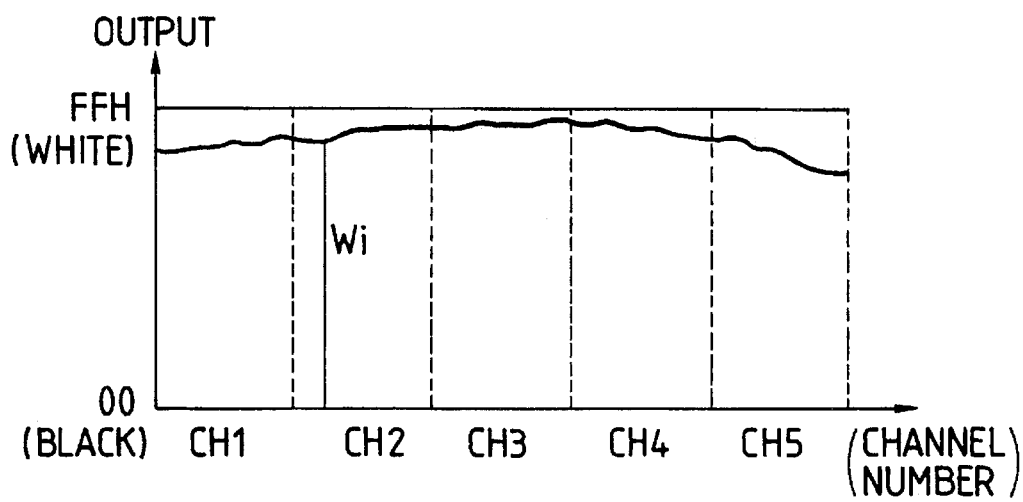
FIG. 24 shows a concept of white correction using the white correction circuit 2057.
Figure 25:
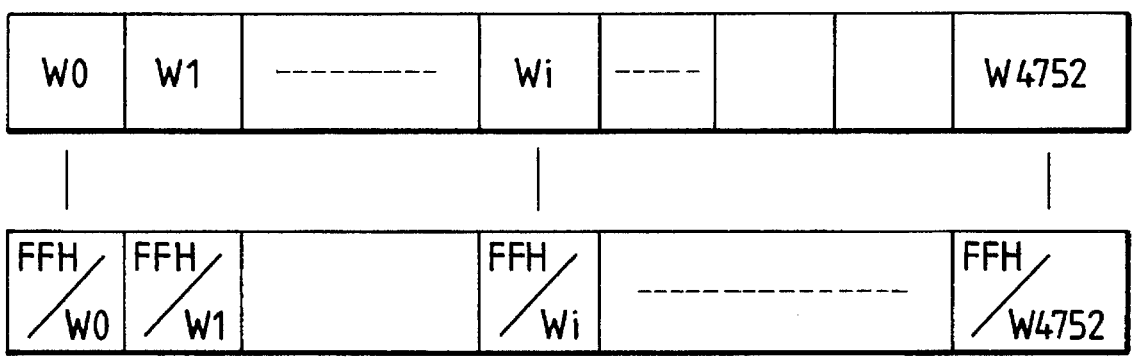
FIG. 25 shows an example of data for a white plate.

For example, when an A4 form is placed with its longitudinal length in main-scan direction, the correction RAM 2976 supporting 400 dpi needs a capacity of at least 4677 bytes for 4677 pixels (297 mm divided by 0.0635 mm). As shown in FIG. 24, assuming that white plate data at the i-th pixel is Wi (i=1 to 4677), data acquired from the white plate is stored for each pixel in the correction RAM 2076 as shown in FIG. 25.

On the other hand, assuming that white plate data is Wi and a read value of the i-th pixel of a normal image is Di, corrected data Do should be represented as Do=Di×FFH/Wi. Therefore, a CPU 2073 controls a latch 2074 to provide outputs to control lines a, b, c, d, and e, so that gates 2060 and 2061 will open and first to third selectors 2059, 2068, and 2071 will select Bs. Thus, the CPU 2073 can access the correction RAM 2076.

Figure 26:
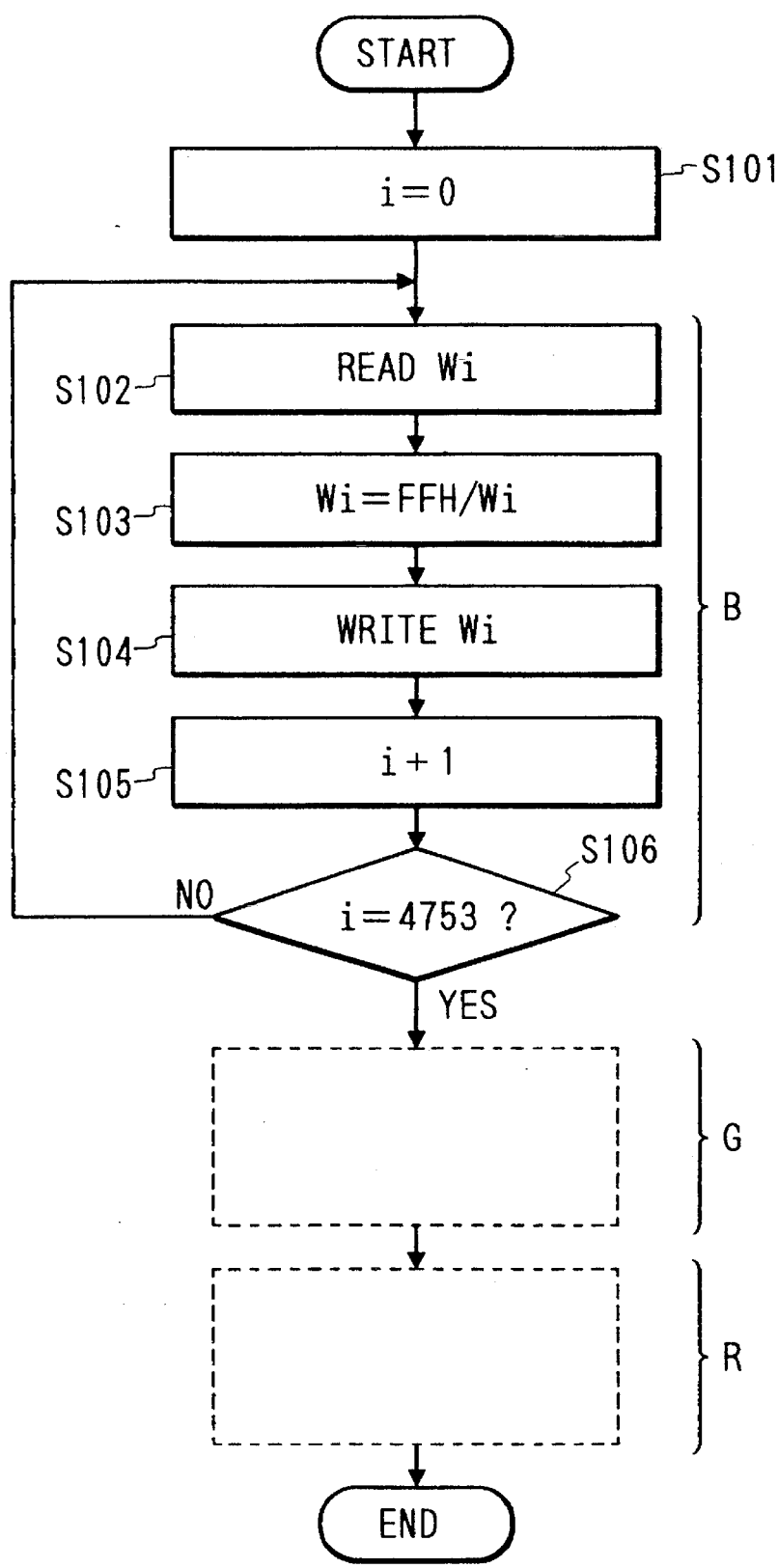
FIG. 26 is a flowchart showing the white correction procedure using the white correction circuit in the black correction/white correction circuit 2057 shown in FIG. 16.

Next, the CPU 2073 calculates FFH/Wo for the leading pixel Wo, FFH/Wi for Wi, etc. sequentially according to the control sequence shown in the flowchart of FIG. 26, then replaces data. Specifically, when i is initialized to 0 (step S101), Wi is read (step S102) and calculated (step S103). When the Wi is written in the RAM 2076 (step S104), i is incremented by 1. The sequence from S102 to S105 is repeated until i becomes 2673 (step S106). When i becomes 4673 at the step S106, a process for a blue component B is completed. Next, a green component G and a red component R are handled similarly. After that, the gate 2060 (control line a) in FIG. 23 is opened and the other gate 2061 (control line b) is closed, so that Do (Di×FFH/Wi) will be provided for an input of raw image data Di. Thereby, the second and third selectors 2068 and 2071 select As. Coefficient data FFH/Wi read from the correction RAM 2076 is routed through signal lines 2064 to 2069, then multiplied by raw image data sent over a signal line 2062. Finally, the product is provided as an output.

As described above, black and white levels are corrected by correcting various factors including the variations in black level sensitivity of an image input system, in dark current of the color CCD image sensor 2040a, in sensitivity among the chips 2043a to 2047a, in the quantity of light of an optical system, and in white level sensitivity. Thus, image data Bout 2121, Gout 2122, and Rout 2123 in which white and black levels of each color are corrected to be uniform are provided in main-scan direction.

Image data made up of 8-bit color components R, G, and B, in which white and black levels have thus been corrected, is fed to a luminance (Y) signal generation circuit 2077 and a color detection circuit (color detection means) 2078 shown in FIG. 16.

First, the luminance signal generation circuit 2077 will be described.

The luminance signal generation circuit 2077 processes an image signal, which has been read by a color CCD image sensor 2040a and undergone color separation, to generate a monochrome image signal. The generated monochrome image signal includes colors unseparated and has its highest wavelength. This is because that a printer or an image formation means of this embodiment has only a monochrome or monotone image formation function. The luminance signal generation circuit 2077 performs an operation according to the following formula:

$$\text{Dataout}=(R+G+B)/3$$

Namely, input data of color components R, G, and B is averaged. In this embodiment, an adder and a multiplier are employed. A calculated luminance signal Y is fed to a selector 2087 which will be described later.

Figure 27:
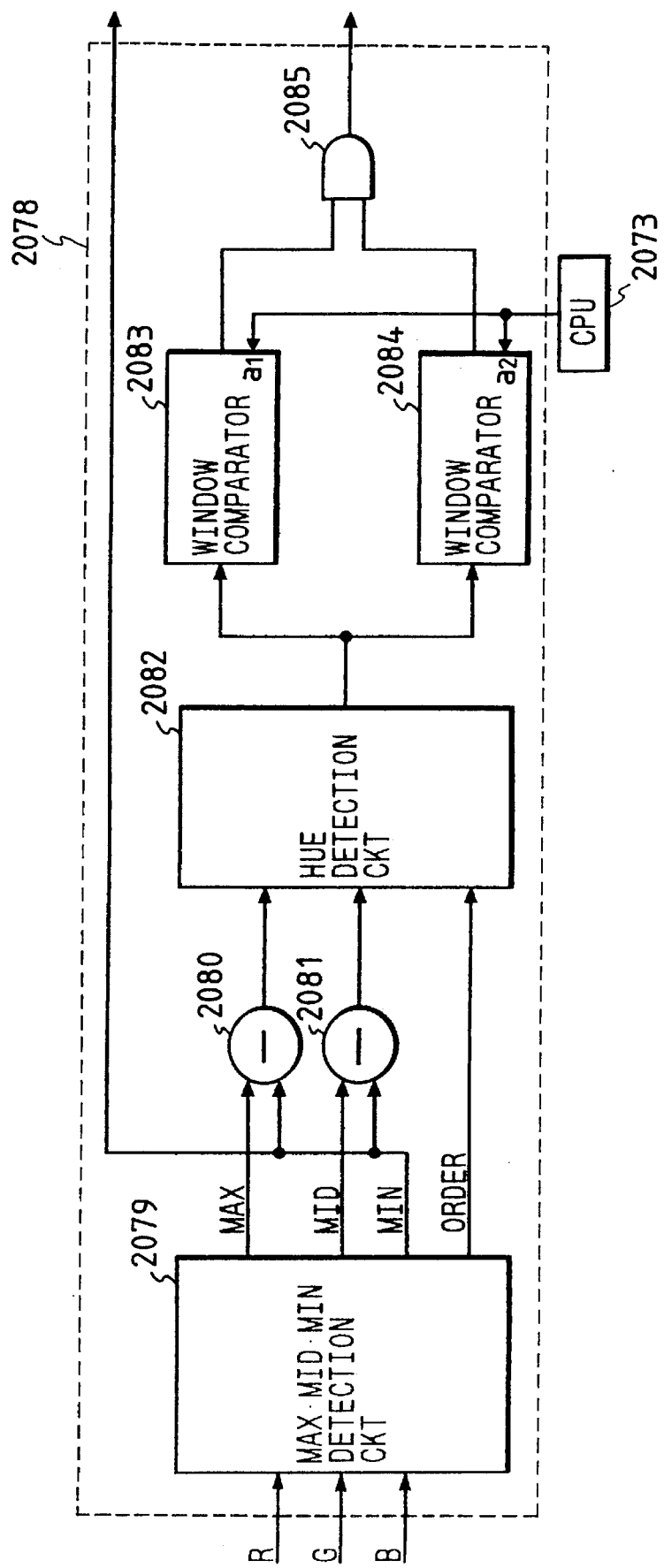
FIG. 27 is a block diagram of a color detection circuit 2078 shown in FIG. 16.

FIG. 27 is a block diagram of a color detection circuit 2078 shown in FIG. 16.

Input data of a luminance signal generation circuit 2077 is also an input of the color detection circuit 2078. In this embodiment, a hue signal is used to detect a color. This is because a single color may vary in luminance and brightness. Using hues as a determinant, colors can be identified correctly.

First, a color detection procedure will be described briefly.

Each of R, G, and B color data consists of eight bits. Therefore, an input of R, G, and B color data contains information of a total of 224 colors. To use this abundant information as it is, a large-scale circuit is needed, costing very high.

Therefore, this embodiment deals with aforesaid hues which differ from normally-understood "hues" to be exact. Nonetheless, a term "hue" is employed here. It is widely adopted that positions in a color space known as a Munsell's cube are designated with saturations, luminosities, and hues.

Each of R, G, and B color data must be converted into plane or two-dimensional data. A common component of the R, G, and B color data, or a minimum value min (R, G, B) of the R, G, and B color data is an achromatic color component. Based on this fact, the min (R, G, B) is subtracted from each of R, G, and B data. Then, using the remaining information as chromatic color components, a three-dimensional input color space is converted into a two-dimensional color space.

Figure 28:
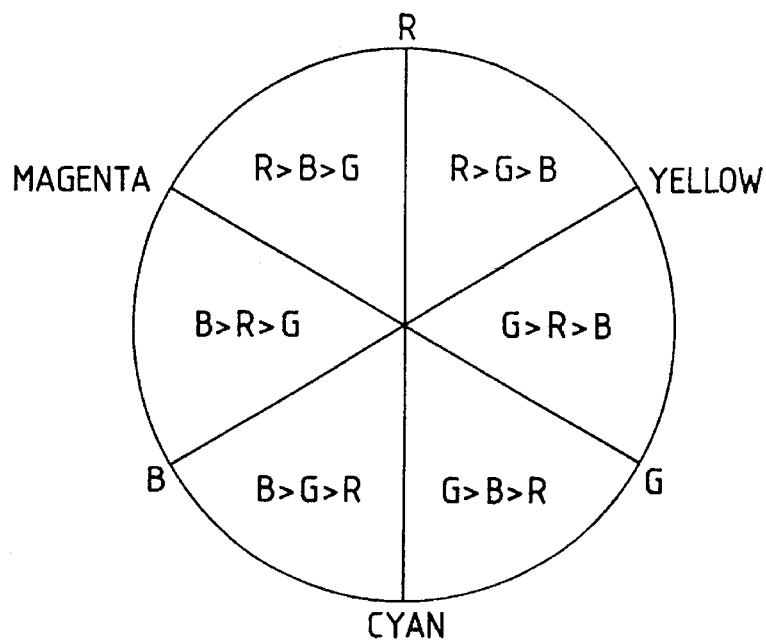
FIG. 28 shows a hue plane for explaining color recognition.

A converted plane is divided radially into six portions as shown in FIG. 28. Input information or an order of sizes of color signals R, G, and B; that is, R>G>B, R>B>G, G>B>R, G>R>B, B>G>R, or B>R>G, and input of maximum and mean values of the R, G, B signals are assessed in the light of a lookup table to obtain a hue level.

Next, the operation of the color detection circuit 2078 will be described in conjunction with FIGS. 16 and 27. Inputs of R, G, and B color data are fed to a max /mid /min detection circuit 2079 shown in FIG. 27 for determining which data components are the biggest and smallest. The max/mid/min detection circuit 2079 uses a comparator to compare each input data, then outputs maximum, mean, and minimum values according to the result of comparison. The output values of the comparator are provided as an order signal.

As described previously, an achromatic color component is subtracted from the maximum and mean values. Therefore, subtracters 2080 and 2081 are used to subtract the minimum value from the maximum and mean values. Then, the subtracted values are fed to the color hue detection circuit 2082 together with the order signal.

The hue detection circuit 2082 is formed with a RAM, ROM, or other randomly accessible storage element. In this embodiment, a ROM is employed to constitute the lookup table. The ROM contains values corresponding to angles of the plane shown in FIG. 28 and provides a hue level depending on an input order signal, (maximum–minimum) value, and (mean–minimum) value.

An output hue level is fed to window comparators 2083 and 2084. These window comparators 2083 and 2084 receive the hue levels of colors to be patterned from a data input means which is not shown. A CPU 2073 allocates specific offsets to a hue level matching with a color, then specifies the values with offsets in the window comparators 2083 and 2084. The window comparators are designed so that assuming that a value specified in the window comparator 2083 is $a_1$, when a hue level is larger than $a_1$, the output will be "1", and assuming that a value specified in the other window comparator 2084 is $a_2$, when a hue value is smaller than $a_2$, the output will be "1".

Consequently, when the condition below is met:

$$a_1 < \text{hue value} < a_2$$

an AND gate 2085 in the following stage sets "1" which will be an output of the color detection circuit 2078 shown in FIG. 16.

When multiple sets of window comparators are employed, multiple colors can be detected.

An identification signal resulting from the identification by the color detection circuit 2078 enters the AND gate 2086 and selector 2087. The AND gate 2086 performs gating on a character pattern signal representing color names generated from a character pattern generation circuit 88 to be described later. The selector 2087 will be described later.

Next, the character pattern generation circuit 2088 and an address control circuit 2089 will be described in conjunction with FIG. 29.

Figures 30, 31:
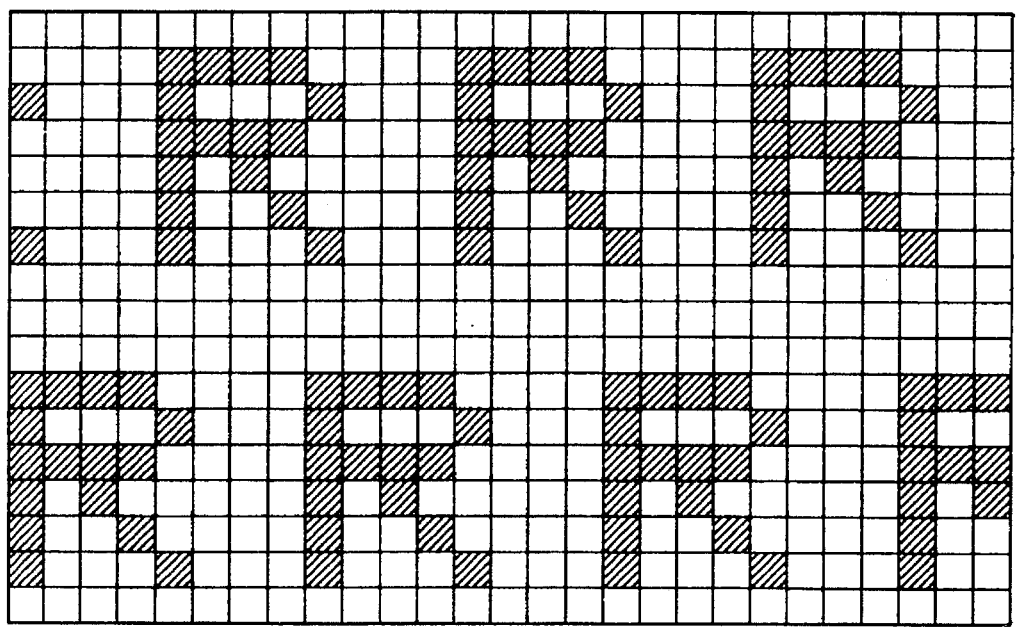
FIG. 30 shows an example of data stored in a ROM 2090 shown in FIG. 29.
FIG. 31 shows a graphic pattern generated by the pattern generation circuit 2088.
Figure 32:
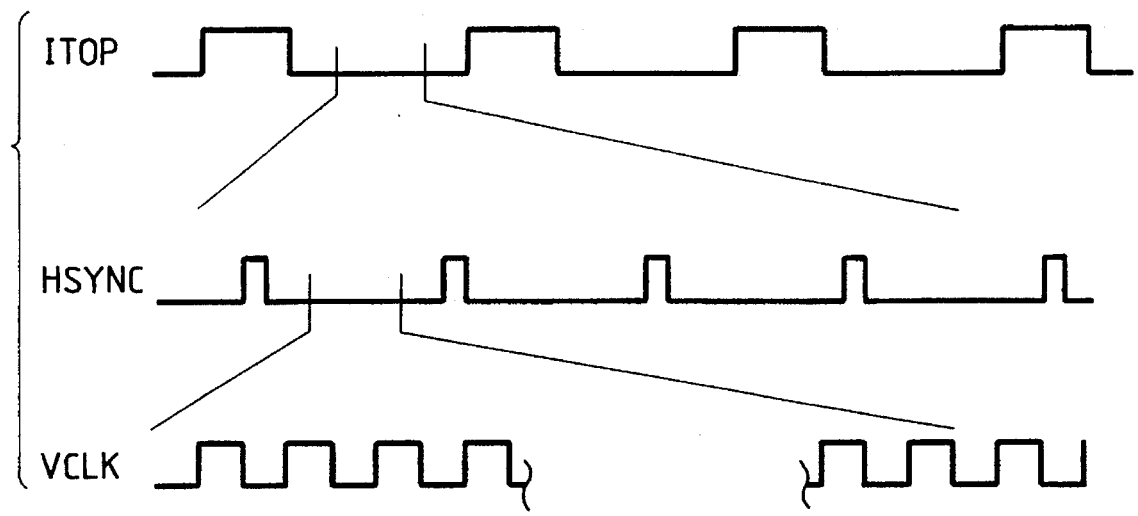
FIG. 32 shows timings of reference signals shown in FIG. 29.

The character pattern generation circuit 2088 is formed with a character pattern ROM 2090 containing character pattern dot data. In the character pattern ROM 2090, 1's and 0's are written at addresses corresponding to superordinate and subordinate addresses as shown in FIG. 30. A character pattern made up of this data is shown in FIG. 31.

Figure 29:
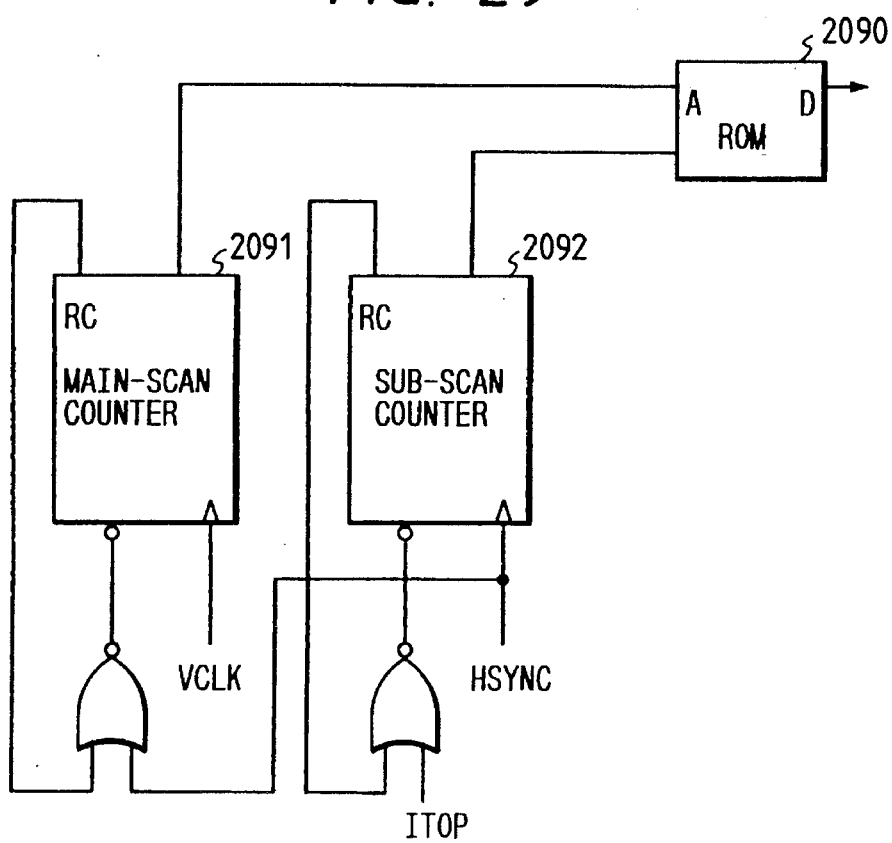
FIG. 29 is a block diagram of a pattern generation circuit 2088 and an address-control circuit 2089 shown in FIG. 16.

As shown in FIG. 29, a main-scan counter 2091 and a sub-scan counter 2092, which are synchronous with a pixel clock VCLK and a scan reference signal HSYNC respectively, generate address signals for the character pattern ROM 2090. The address signals are fed to the character pattern ROM 2090. Reference signals ITOP, HSYNC, and VCLK are timing signals shown in FIG. 32. The ITOP signal indicates the top of an image, and remains low while the color CCD image sensor 2040$a$ is reading image data.

The main-scan counter 2091 is synchronous with the scan reference signal HSYNC and counts pixel clocks VCLK. The sub-scan counter 2092 is synchronous with the image top signal ITOP and counts scan reference signals HSYNC to generate addresses of the character pattern ROM 2090.

Figure 6B:
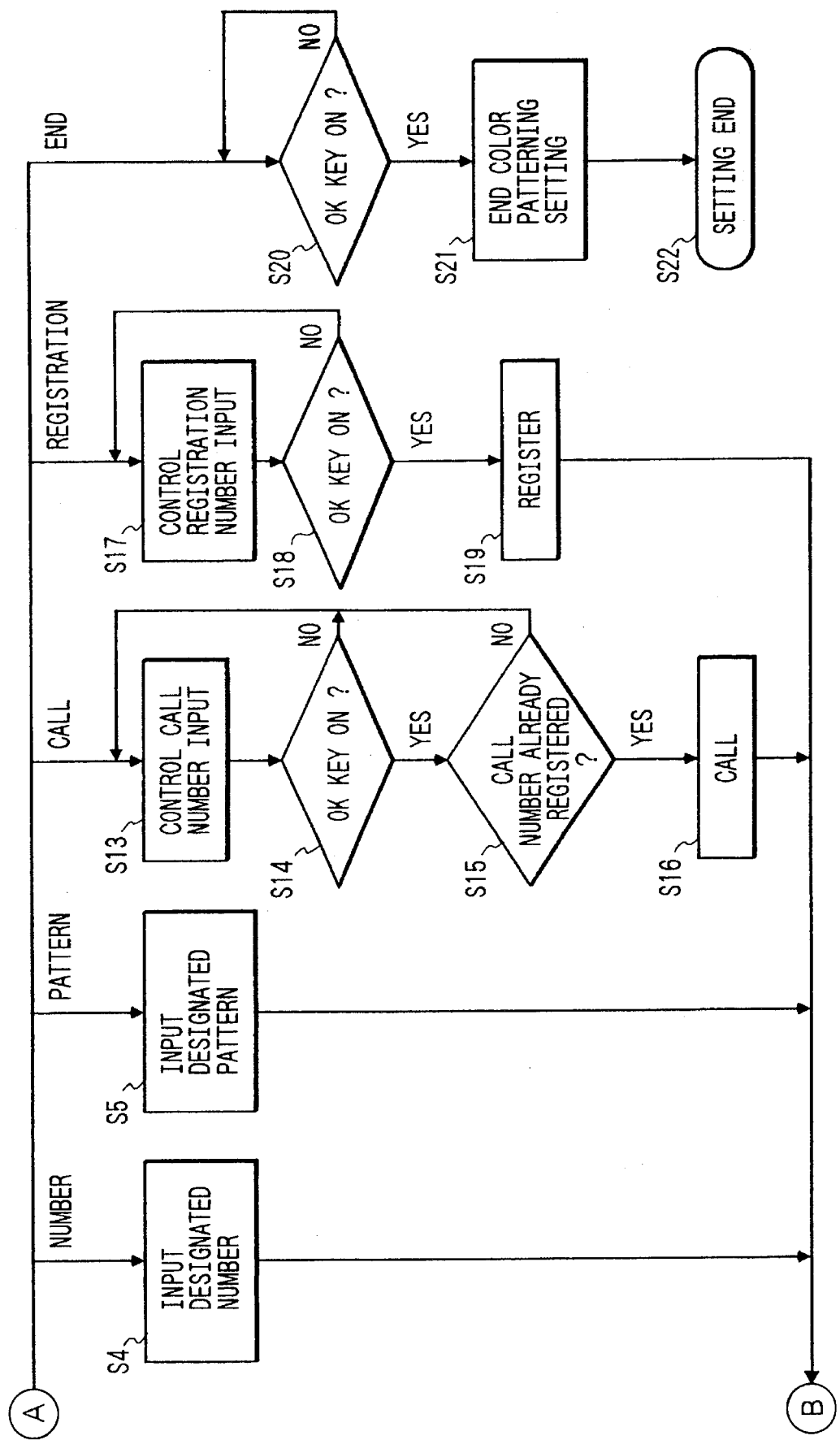
FIG. 6 consisting of FIGS. 6A and 6B, is a flowchart of a pre-setting sequence for color patterning in the embodiment.

Depending on the identification result of the color detection circuit shown in FIG. 6, the AND gate 2096 in FIG. 16 performs gating on a character pattern signal. Then, the character pattern signal is multiplied by a min (R, G, B) image signal by a multiplier 2093. The min (R, G, B) image signal is a signal the color detection circuit 2078 generates, indicating a minimum (darkest) value among input image signals in which color components R, G, and B have been separated. This signal is needed because a luminance signal generation circuit 2077 generates differs in level from color to color. For example, the signal level for yellow is very close to that for white, causing the image data in an original to be missing.

When the min (R, G, B) signal enters a contour extraction circuit 2094, image contours are extracted. A generally-known Laplacian filter is used to extract image contours. Then, an adder 2095 adds an extracted image counter signal to the min (R, G, B) signal which has passed through a multiplier 2093 to fetch image data.

Figure 33A:
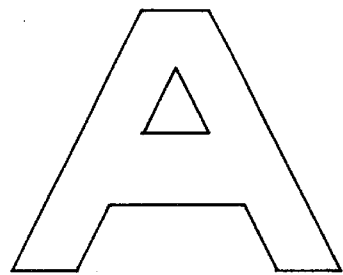
FIGS. 33A to 33C are explanatory diagram of countering and a color information adding pattern.
Figure 33C:
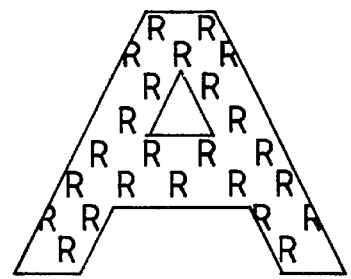
Figure 33B:
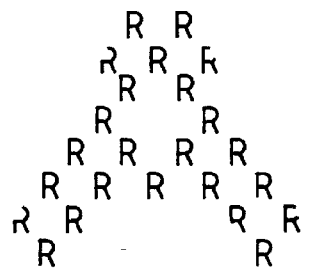

Specifically, the adder 2095 adds a counter signal expressing the counter of a character image, for example, A as shown in FIG. 33A and a min (R, G, B) signal expressing a character pattern consisting of, for example, Rs as shown in FIG. 33B, to be appended to color information. The min (R, G, B) signal provides a character pattern, wherein Rs each of which represents the name of the color of a contoured character image A are distributed all over the A character image. An output signal of the adder 2095 enters a selector 2087 in the next stage.

The selector 2087 provides an input A with the aforesaid luminance signal and an input B with the min (R, G, B) expressing a contoured image. When the detection result sent from the color detection circuit 2078 is 1, the input B is selected. When it is 0, the input A is selected. Then, the selected input is fed to a log (density) conversion circuit 2096 for converting a luminance signal into a density signal, and converted into a density signal. Then, the density signal enters a printer 2102 to provide a monotone image having a character pattern or a countered character A consisting of multiple Rs each of which indicates the name of the color of the character.

Thus, a contour signal is added to an image signal. Then, the image signal is mixed with a character pattern signal containing color names or color information to produce an image. This results in a monochrome or monotone image which makes it possible to discern the colors of pixels in the color images of an original.

Namely, character patterns always appear in areas of white background, which will never be indiscernible.

Next, other embodiment of the present invention will be described in conjunction with FIGS. 34 to 36. This embodiment performs prescanning, recognizes color information of an original, converts the color information into graphic patterns, and adds on color names for the graphic patterns to any specified areas. This is only a difference between this embodiment and the previous one. Other components are identical to those of the previous embodiment. The description will, therefore, be omitted.

FIG. 34 is a flowchart showing the sequence of operations of the embodiment.

In FIG. 34, key input is performed at a step S111. At a step S112, it is identified whether or not a Start key is turned on. If the Start key is not turned on, control is returned to the previous step S111. If it is turned on, control is advanced to the next step S113. At the step S113, it is identified whether color recognition image editing has been selected. If the color recognition image editing has been selected, pre-scanning is performed to read image information from an original (step S114). At the same time, a histogram is created using the image information (step S115).

Figure 35:
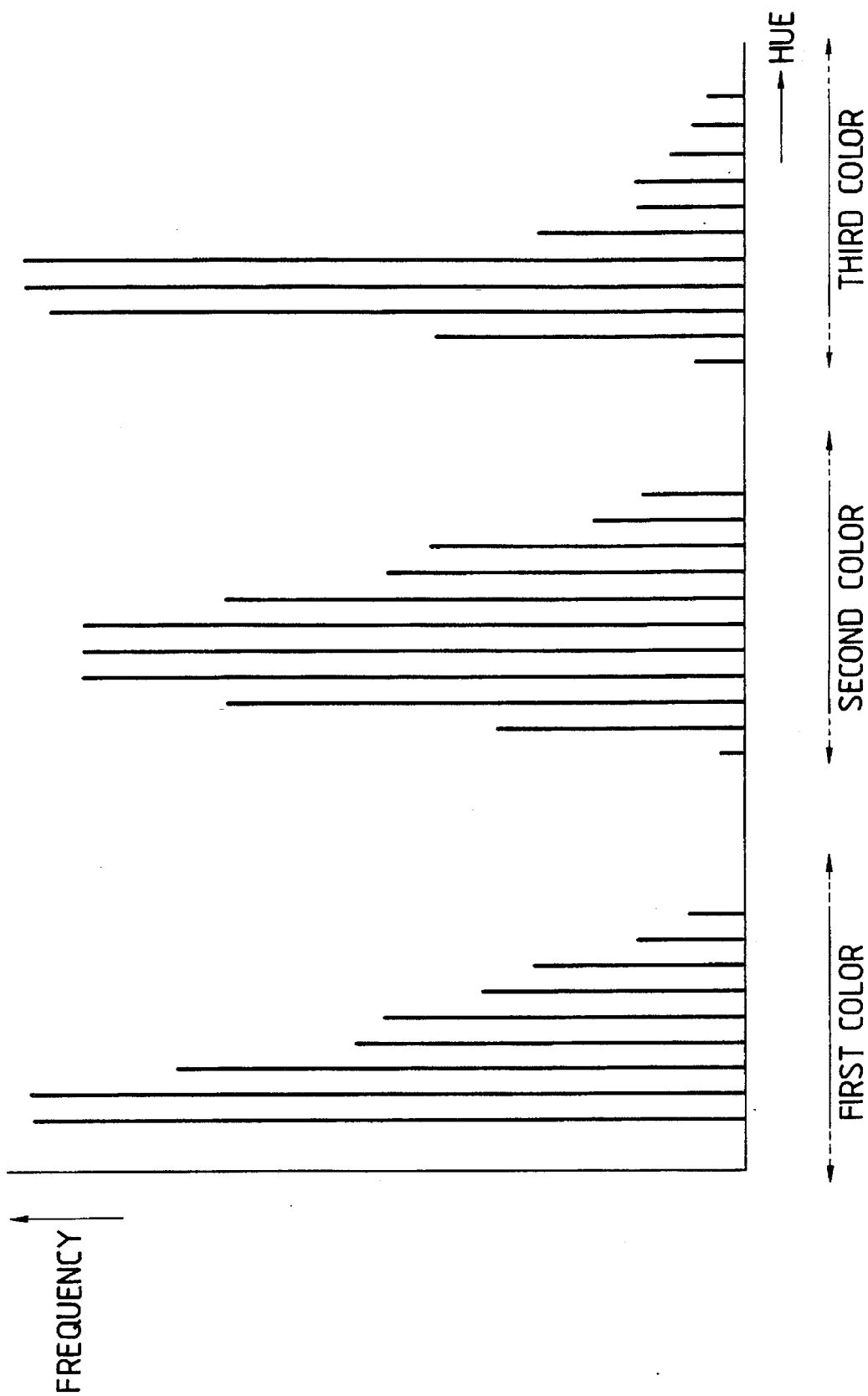
FIG. 35 shows frequencies of hues in the embodiment.

The histogram indicates frequencies of hues as shown in FIG. 35. That is to say, the chart of FIG. 35 implies that colors rating high in frequency exist in many areas of an original. In this embodiment, the first, second, and third colors exist in an original.

Figure 36A:
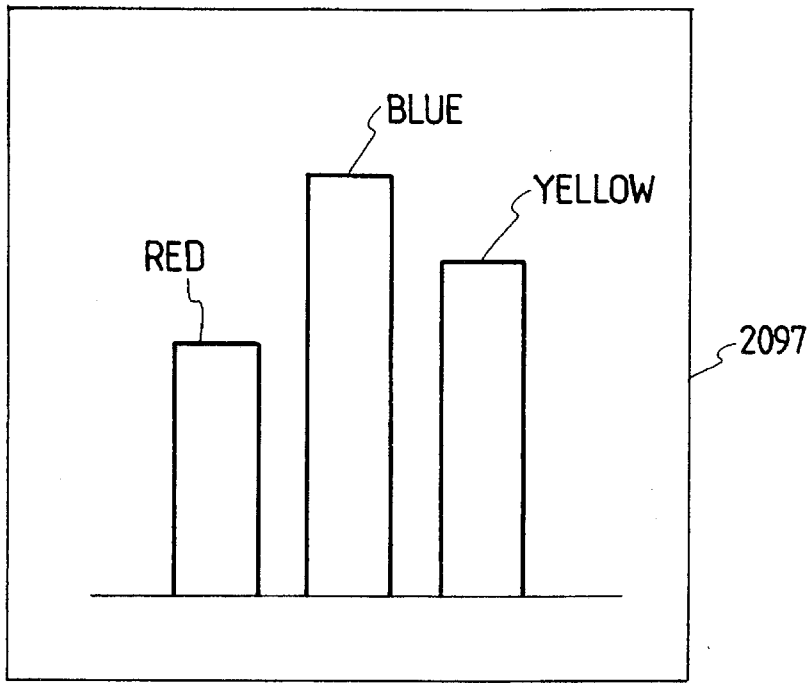
FIGS. 36A and 36B are explanatory diagrams of the original and processed image in the embodiment shown in FIG. 34.
Figure 36B:
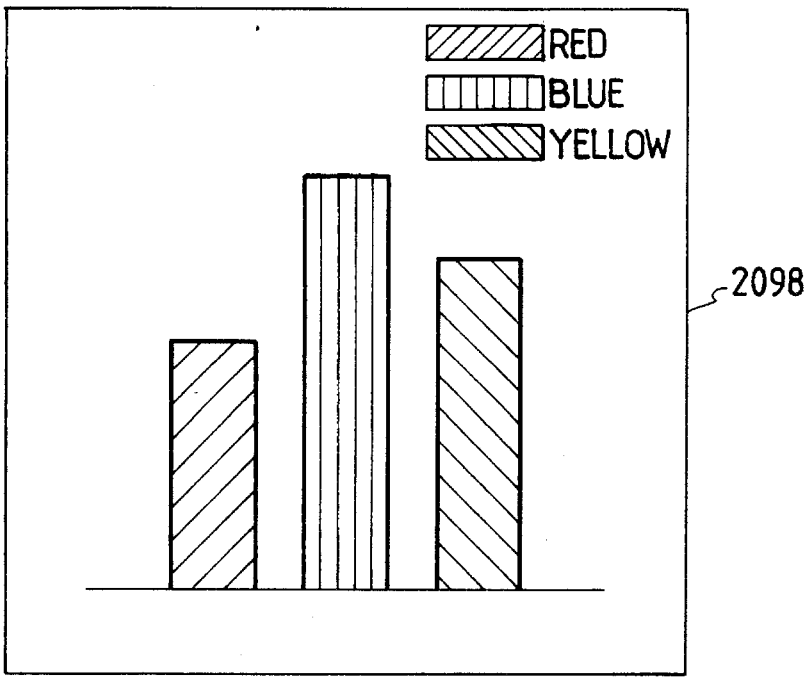

Next, a color CCD image sensor 2040a reads an image (step S116). At the next step S117, image editing and adding on are executed. That is to say, in consideration of information used for creating the histogram at the step s115 and an original 2097 in which three bar graphs are colored with red, blue, and yellow as shown in FIG. 36A, graphic and character patterns are appended to the upper right of a form so that the relationships between graphic patterns and colors can be understood. Then, the graphic patterns are added on to the bar graphs. The resultant monochrome or monotone processed image 2098 is printed by a printer.

If color recognition image editing is not selected at the step S113, control is advanced to the step S119, then a normal operation is performed. Then, the resultant image is printed by a printer at the step S118. The normal operation performed at the step S119 is a normal image copy operation.

The graphic patterns make it possible to recognize color differences at sight.

Figure 40:
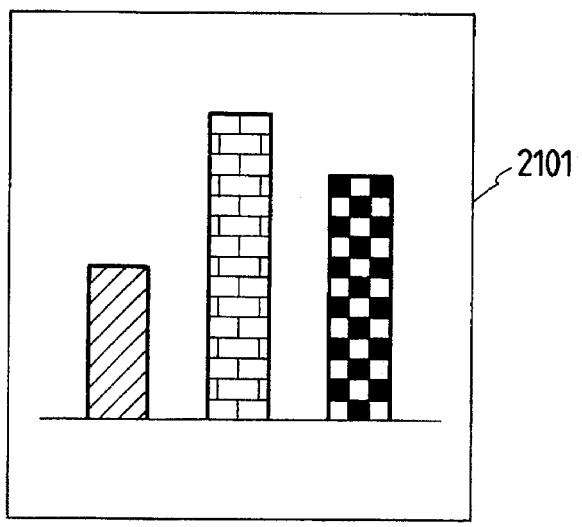
FIG. 40 is an explanatory diagram of an image processed according to the embodiment shown in FIG. 37.

Next, other embodiment of the present invention will be described in conjunction with FIGS. 37 and 40. This embodiment does not perform pre-scanning. This is only a difference from the previous embodiment. Other components and operations are identical to those of the previous embodiment. Further description will, therefore, be omitted.

In this embodiment, pre-scanning is not performed, but a preprogrammed collation table for collating character patterns representing color names with graphic patterns is printed independently of a monotone image. FIG. 37 is a flowchart showing the sequence of operations in this embodiment.

Figure 37:
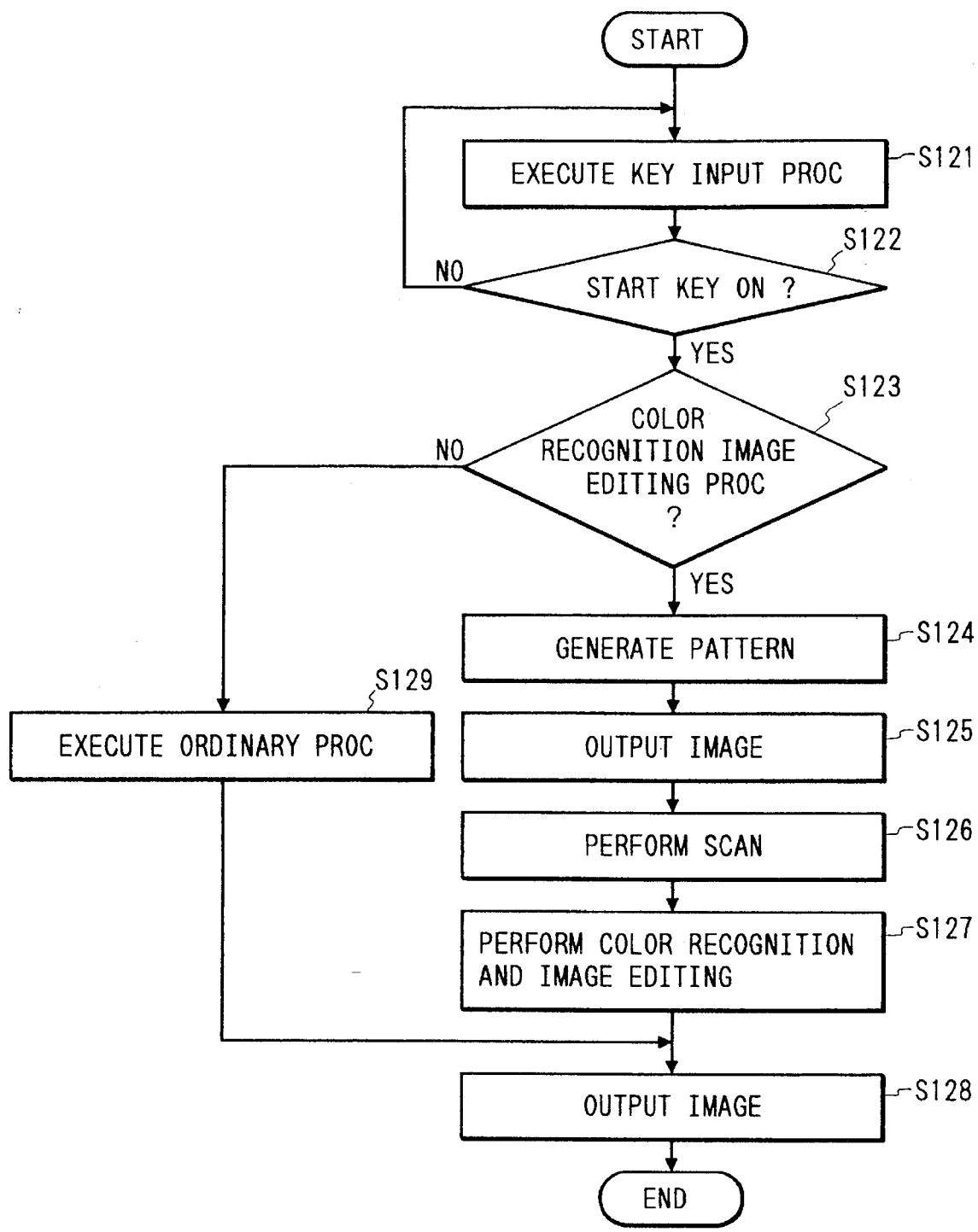
FIG. 37 is a flowchart showing an operation of the image processing apparatus of other embodiment of the present invention.
Figure 38:
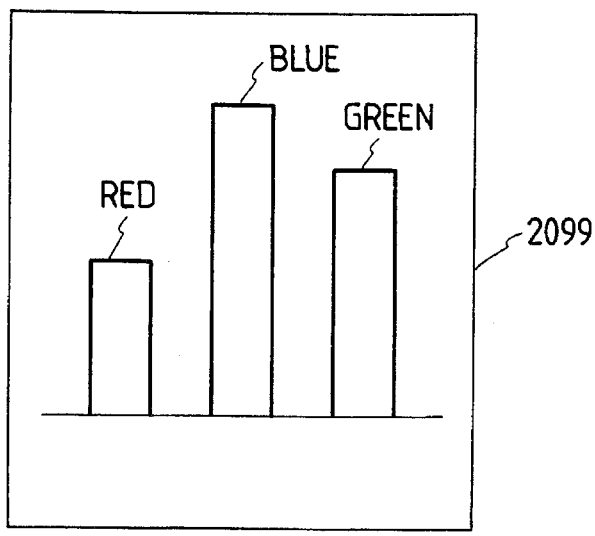
FIG. 38 is an explanatory diagram of an original for the embodiment.
Figure 39:
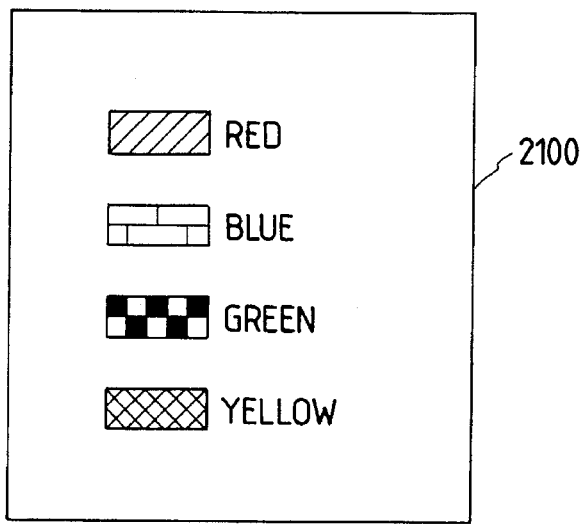
FIG. 39 is an explanatory diagram of a collation table provided in the embodiment shown in FIG. 37.

At a step S121 in FIG. 37, key input is performed. At the next step S122, it is identified whether or not a Start key is turned on. When the Start key is turned on, control is advanced to the next step S123. At the step S123, it is identified whether or not color recognition image editing has been selected. If color recognition image editing has been selected, data indicating the relationships between graphic patterns and colors is generated. At the next step S125, based on an original 2099 showing an image in which three bar graphs are colored with red, blue, and yellow as shown in FIG. 38, a collation table consisting or graphic patterns indicating their relationships with colors and character patterns representing color names is produced as shown in FIG. 39.

After the collation table is produced at the step S125, the original is scanned to read image information at the next step S126. At the next step S127, color recognition and image editing are performed under preprogrammed hue conditions. Then, a monotone processed image 2101 in which graphic patterns are added on to the bar graphs is fed from a printer (step S128). Unless color recognition image editing is selected at the step S123, normal processing is done at a step S129. Then, a monotone processed image 2101 is produced at a step S128. In this embodiment, a graphic pattern generation means may be installed in addition to a character pattern generation means. Alternatively, a graphic pattern generation function may be implemented in the character pattern generation means.

Thereby, only graphic patterns are added on to an output monotone processed image, but character patterns are not. This eliminates a feeling of incompatibility between original and output monotone processed images.

A reader is employed as an information generation means. However, this embodiment is also applicable to outputs of a computer or VTR. Furthermore, an output unit is not confined to a printer but may, needless to say, be a monochrome display or a facsimile.

Other embodiment of the present invention will be described. An image processing apparatus according to the embodiment converts color information of an original to graphic patterns and registers any graphic patterns.
(Pattern registration mode)

The operation of an image processing apparatus in pattern registration mode will be described in conjunction with FIGS. 11, 12, 41, 42, and 43.

The pattern registration mode comes before a color detection pattern mode to be described later, wherein desired patterns are registered for specific colors with the image processing apparatus.

Figure 42:
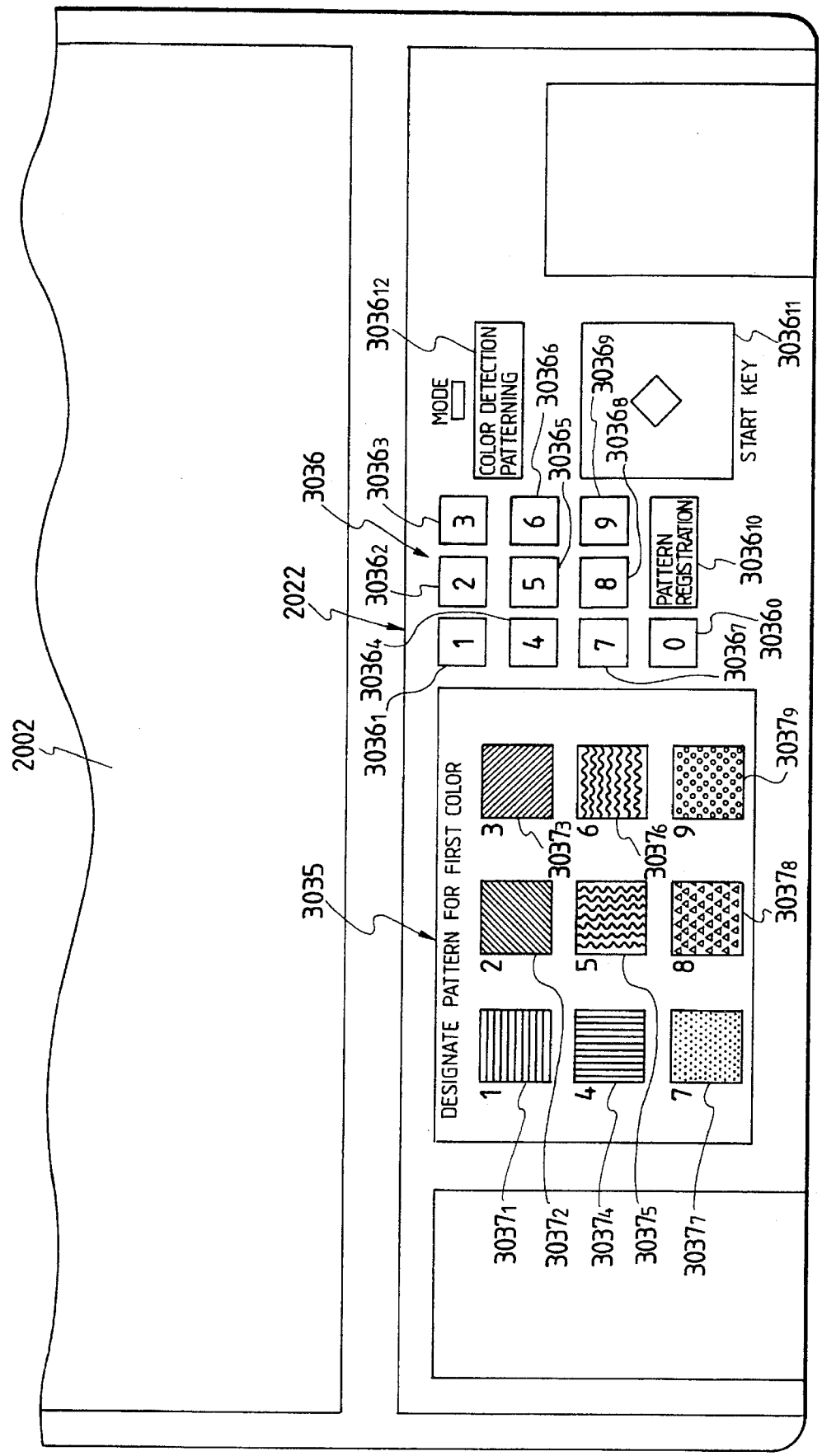
FIG. 42 is a plan view of an operation unit 2022 shown in FIG. 41.

An operation unit 2022 arranged in the front of an original base 2002 as shown in FIG. 42 is used to specify the pattern generation mode. The operation unit 2022 includes a display section 3035 and an input section 3036.

The display section 3035 is formed with a liquid crystal display, which shows, for example, various graphic patterns to be specified for the first to ninth colors; such as, a lateral stripe pattern $3037_1$, a leftward tilting line pattern $3037_2$, a rightward tilting line pattern $3037_3$, a vertical stripe pattern $3037_4$, a vertical waveform pattern $3037_5$, a lateral waveform pattern $3037_6$, a multi-dot pattern $3037_7$, a sawtooth pattern made up of multiple small triangulars $3037_8$, and a polka dot pattern made up of multiple small circles $3037_9$. The input section 3036 includes 0 to 9 numeric keys (ten-key pad) $3036_0$, $3036_1$, $3036_2$, $3036_3$, $3036_4$, $3036_5$, $3036_6$, $3036_7$, $3036_8$, and $3036_9$, a Pattern Registration key $3036_{10}$, a Start key $3036_{11}$, and a Color Detection Patterning key $3036_{12}$ for specifying a color detection patterning mode.

When the Pattern Registration key $3036_{10}$ is pressed, the pattern registration mode is specified.

Figure 43:
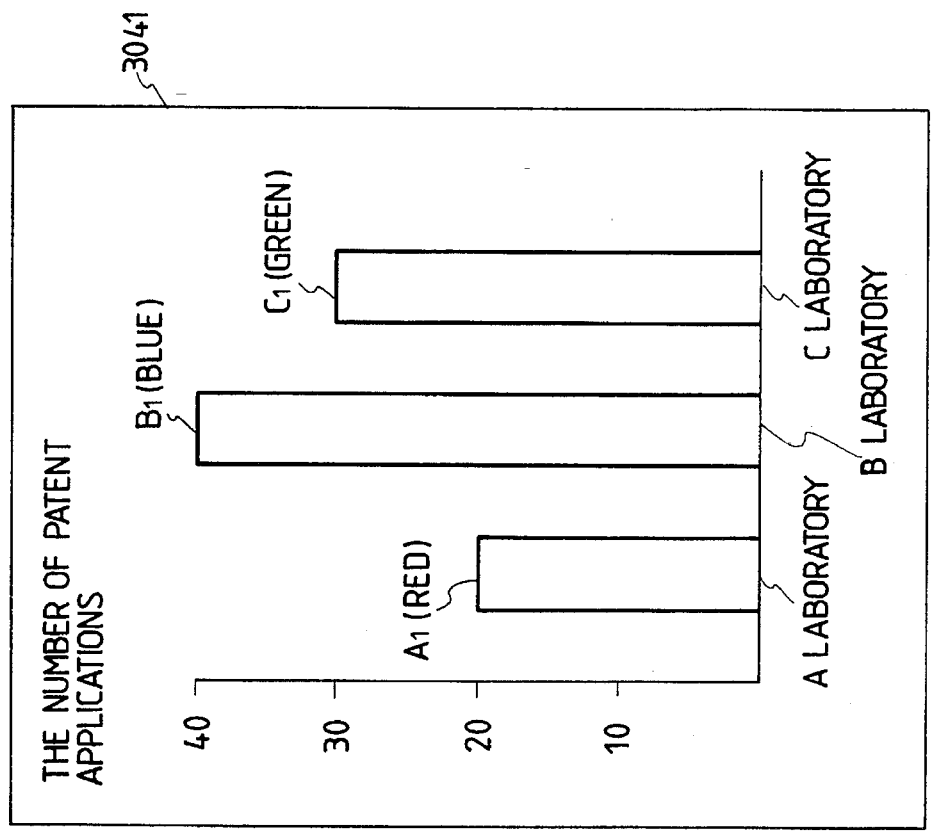
FIG. 43 is an explanatory diagram of an original in the embodiment shown in FIG. 41.

Next, an original 3041, for example, shown in FIG. 43 is placed on a digitizer (not shown). The original 3041 is a bar chart indicating the numbers of patent applications by laboratories A, B, and C. The bar graph A1 for the laboratory A is colored with red, the bar graph B1 for the laboratory B, with blue, and the bar graph C1 for the laboratory C, with green.

Then, intended colors of the bar graphs A1 to C1 in the original 3041 are pointed out using a pointing pen (not shown). Thus, colors to be registered are designated. When the color designation is completed, the original 3041 is placed on the original base 2002 and the Start key $3036_{11}$ is pressed. When the Start key $3036_{11}$ is pressed, a lamp on a scanner 2004 of a scanner unit 2003 shown in FIG. 11 lights in the same way as that in aforesaid normal copy mode. Then, the scanner unit 2003 moves to illuminate the original 3041. The light reflected from the original 3041 travels to a color CCD image sensor 2009a in a reader 2009. Images in the original are read sequentially. At this time, image information at the points previously indicated with the pointing pen is read sequentially. Then, the levels of an R signal 1040, a G signal 1050, and a B signal 1060 are placed in memory, which is not shown, of a color detection circuit 2039 via amplifiers 2024 to 2046 and A/D converters 2027 to 2029 shown in FIG. 13.

The color detection circuit 2039 provides the levels of the R signal 1040, G signal 1050, and B signal 1060 with given offsets, then creates a color detection table for color detection. Specifically, the color detection table is created so that outputs will be provided according to the order of pointing. For example, when a color indicated initially with the pointing pen is entered, the output of the color detection table will be 1. When a color pointed out next is entered, the output will be 2.

Next, a procedure for selecting and specifying graphic patterns for colors designated previously will be described in conjunction with FIG. 42. A display section 3035 and input section 3036 in an operation unit 2022 are employed to select and specify graphic patterns.

In this embodiment, the color indicated first with the pointing pen is red, the color indicated second, blue, and the color indicated third, green. During pattern selection, graphic patterns $3037_1$ to $3037_9$ corresponding to the first to ninth colors appear on the screen of a display section 3035 shown in FIG. 42. The graphic pattern $3037_1$ corresponding to the first color is selected by specifying 1 at the ten-key pad. In this embodiment, the graphic pattern 1 $3037_1$ is specified for the first color (red), the graphic pattern 2 $3037_2$, for the second color (blue), and the graphic pattern 3 $3037_3$, for the third color (green). The graphic patterns $3037_1$ to $3037_3$ for the colors designated as mentioned above are placed in pattern memory of a graphic pattern generator 3040 shown in FIG. 41.

(Color detection patterning mode)

Figure 41:
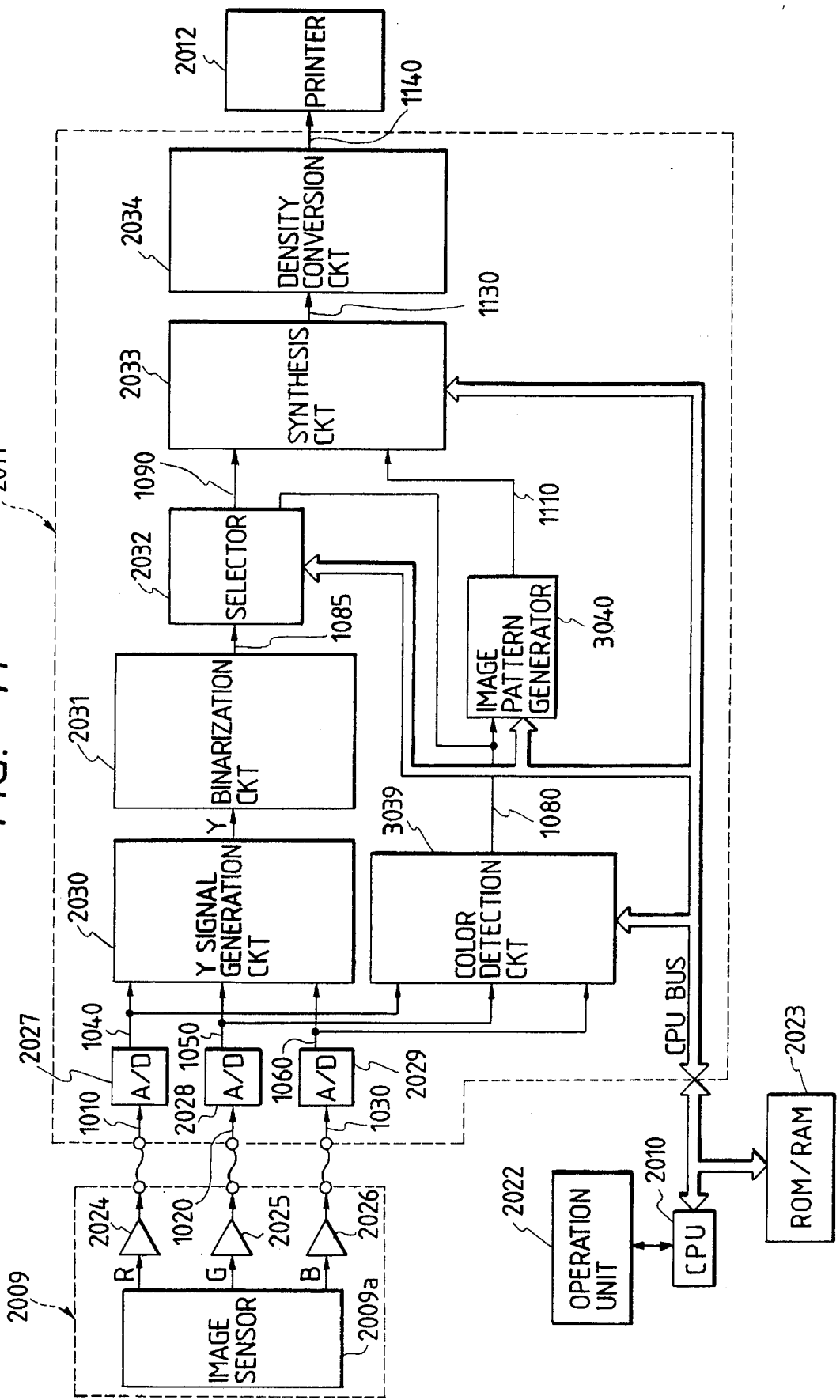
FIG. 41 is a particular block diagram of the embodiment.

Next, the operation in color detection patterning mode will be described in conjunction with FIGS. 41 to 42.

The color detection patterning mode is specified by pressing a Color Detection Patterning key $3036_{12}$ on an input section 3036 of an operation unit 2022. When the Start key $3036_{11}$ is pressed, the mode starts operating. Image information of R, G, and B signals 1010, 1020, and 1030 including the color information of an original is read by a color CCD image sensor 2009a in a reader 2009 shown in FIG. 41, then converted into digital signals 1040, 1050, and 1060 by A/D converters 2027 to 2029 as described in the aforesaid normal copy mode. Then, using the digital signals, a luminance signal Y is generated from the digital signals by a Y signal general circuit. The luminance signal Y is converted into a binary luminance signal 1085 by a binarization circuit 2031 in the next stage. Finally, a binary-coded signal 1090 is generated from a selector 2032 in the next stage.

On the other hand, the R, G, and B signals 1040, 1050, and 1060 sent from the A/D converters 2027 to 2029, which are fed to the Y signal generation circuit 2030, also enter a color detection circuit 3039. The combinations of level ratios of these R, G, and B signals 1040, 1050, and 1060 are compared with a preprogrammed color detection table to detect the colors contained in an input signal. At the same time, the color detection circuit 39 identifies the areas having the same color, and sends the identification signal 1080 to a graphic pattern generator 3040. The graphic pattern generator 3040 assesses the identification signal 1080 sent from the color detection circuit 2039 and loads the graphic patterns corresponding to the colors from pattern memory. The graphic pattern signal 1110 goes to a synthesis circuit 2033.

The synthesis circuit 2033 synthesizes the binary-coded signal 1090 sent from the binarization circuit 2031 and the graphic pattern signal sent from the graphic pattern generator 2040, then sends it to a density conversion circuit 2034 in the next stage. Moreover, the synthesis circuit 2033 is provided with a binary-coded signal 1090 in which the color information component of the binary luminance signal 1085 sent from the binarization circuit 2031 is converted into white information by a selector 2032 according to the identification signal 1080 sent from the color detection circuit 2039. The density conversion circuit 2034 outputs a signal 1140 generated by reversing the polarity of a composite signal 1130 of the binary-coded signal 1090 and graphic pattern signal 1110. An output signal 1140 of the density conversion circuit 2034 goes to a printer 2012 in the next stage to produce a monochrome or monotone processed image with graphic patterns associated with colors added on.

Figure 44:
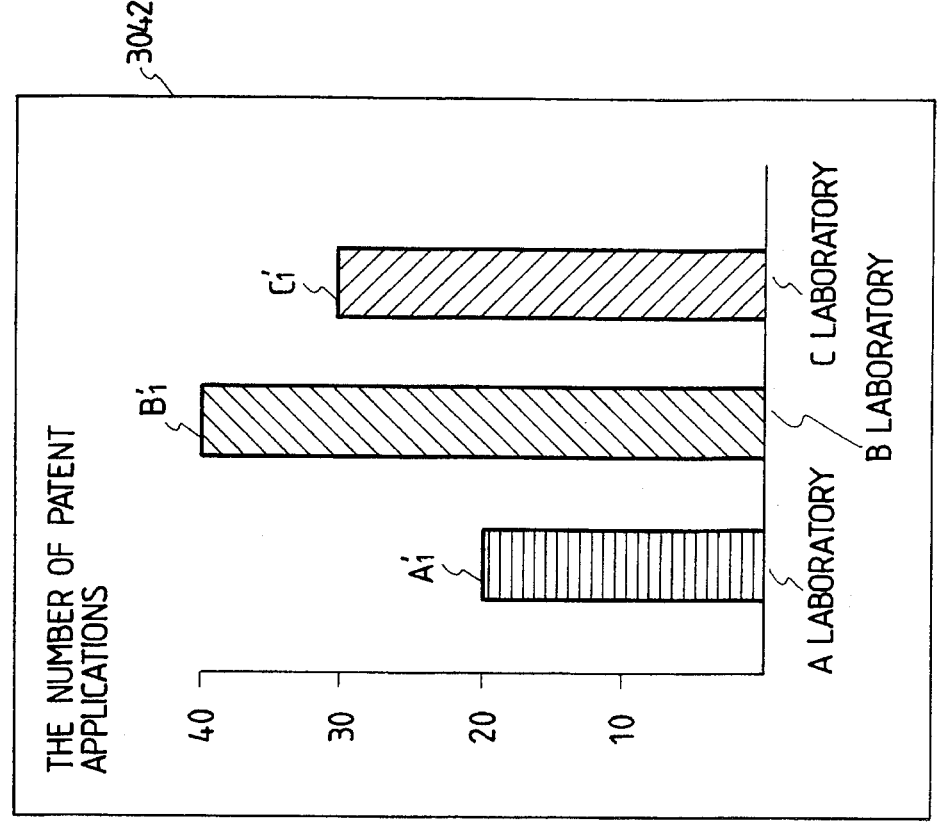
FIG. 44 is an explanatory diagram of a processed image of an original shown in FIG. 43.

An image processing state in the image processing apparatus will be described in conjunction with FIGS. 43 and 44.

In FIG. 43, 3041 is a colored original. In FIG. 44, 3042 is a processed image the image processing apparatus has produced from the original 3041. Graphic patterns such as, a first graphic pattern or a lateral stripe pattern $3037_1$, a second graphic pattern or a leftward tilting line pattern $3037_2$, and a third graphic pattern or a rightward titling line pattern $3037_3$ are displayed in bar graphs A1, B1, and C1 as shown in FIG. 44, representing the colors of the bar graphs of the original 3041. Thus, a monochrome or monotone processed image 3042 permitting recognition of the colors of pixels in the color images of the original 41 can be provided.

Next, other embodiment of the present invention will be described.

In the foregoing embodiment, graphic patterns are registered (specified) by operating a display section 3035 or a liquid crystal display and an input section 3036 or a ten-key pad in an operation unit 2022. In this embodiment, intended graphic patterns are read using a reader 2009 and thus registered.

The operation of the embodiment in pattern registration mode will be described in conjunction with FIGS. 41 and 42.

First of all, in the same way as the foregoing embodiment, intended colors in an original 3041 are designated.

Then, a form carrying an intended graphic pattern associated with a first color (for example, red) is placed on an original base 2002.

Next, a Start key 3036₁₁ is pressed. Then, the information concerning the graphic pattern written in the form on the original base 2002 is read, and the read signal is transferred photo-electrically by a reader 2009.

The photoelectrically transferred signal is amplified by amplifiers 2024 to 2046, then converted into digital signals by A/D converters 2027 to 2029.

The digital signals of color components R, G, and B sent from the A/D converters 2027 to 2029 are recomposed by a Y signal generation circuit 2030 in the next stage to produce a Y signal or a luminance signal. The luminance signal passes through a binarization circuit in the next stage to provide a binary signal 1085, then a selector 2032 in the next stage to provide a binary luminance signal 1090. Then, the binary luminance signal 1090 is placed in pattern memory in a graphic pattern generator 3040.

The foregoing procedure for the first color is performed on second (for example, blue) and third (for example, green) colors. Graphic patterns for the colors are stored in the graphic pattern generator 3040.

The operation of the embodiment in color detection patterning mode is identical to that for the previous embodiment. The description will, therefore, be omitted.

Figure 45:
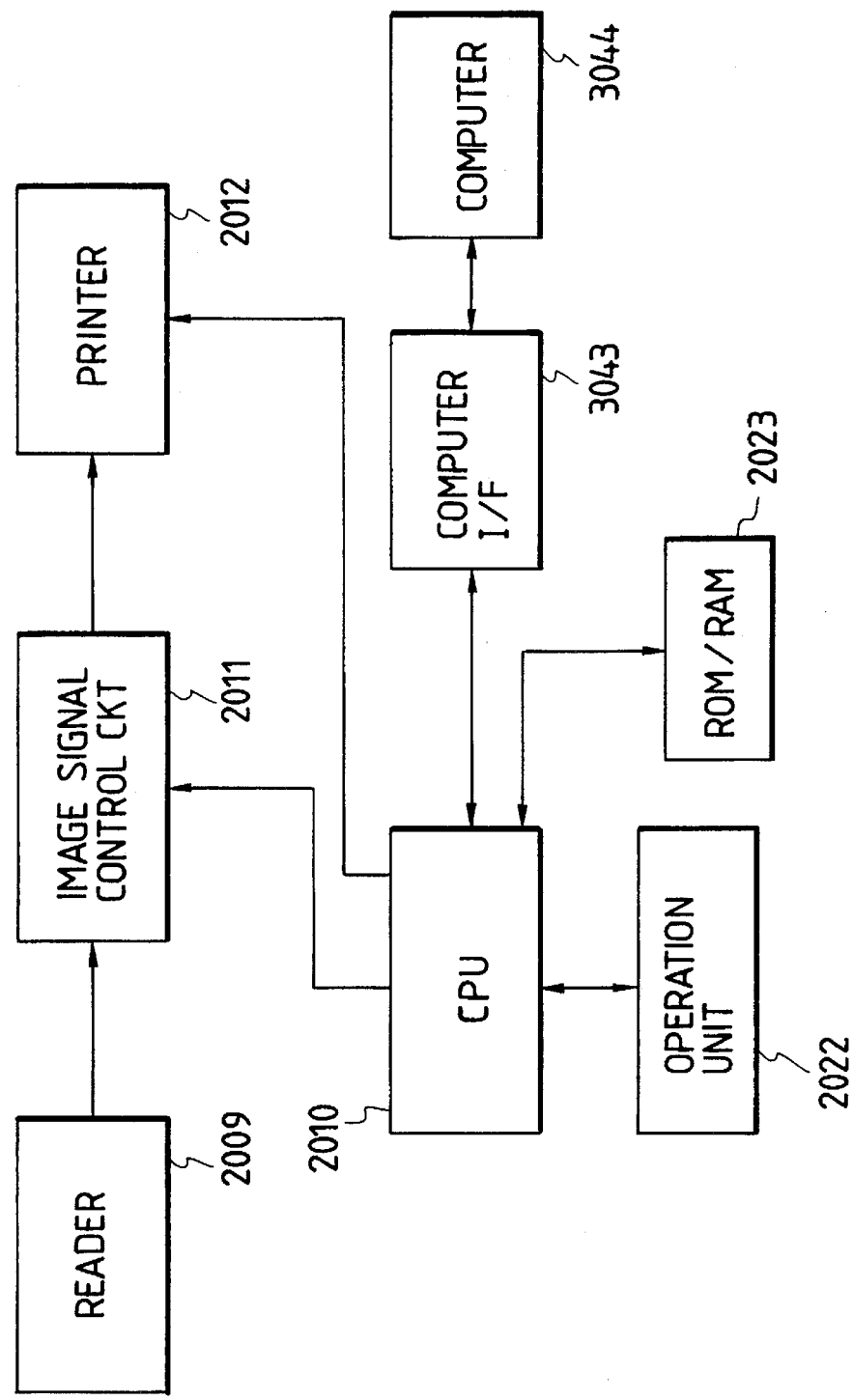
FIG. 45 is a general block diagram of an image processing apparatus of other embodiment of the present invention.

Next, other embodiment will be described in conjunction with FIGS. 45 and 46.

In this embodiment, components identical to those of the previous embodiment will be assigned the same symbols. The description will, therefore, be omitted.

In this embodiment, graphic patterns are registered using an external computer of an image processing apparatus. That is to say, a computer 3044 is connected to a CPU 2010 via a computer interface 3043 as shown in FIGS. 45 and 46.

The operation of this embodiment in pattern registration mode will be described.

First, in the same way as that in the previous embodiment, intended colors of an original are designated.

Then, the computer 3044 communicates with the CPU 2010 via the computer interface 3043 to ask a color number for which an associated graphic pattern will be sent. When the color number is determined, the computer 3044 generates a graphic pattern signal and sends it to the CPU 2010 via the computer interface 3043.

The CPU 2010 sends the graphic pattern signal originating from the computer 3044 to a graphic pattern generator 3040 over a CPU bus. The graphic patterns associated with colors the computer 3044 has created are registered with the pattern memory in the graphic pattern generator 3040.

The operation of the embodiment in color detection patterning mode is identical to that of the previous embodiment. The description will, therefore, be omitted.

Other embodiment of the present invention will be described. An image processing apparatus according to this embodiment converts color information of original images into graphic patterns and allows users to create the graphic patterns.

Figure 46:
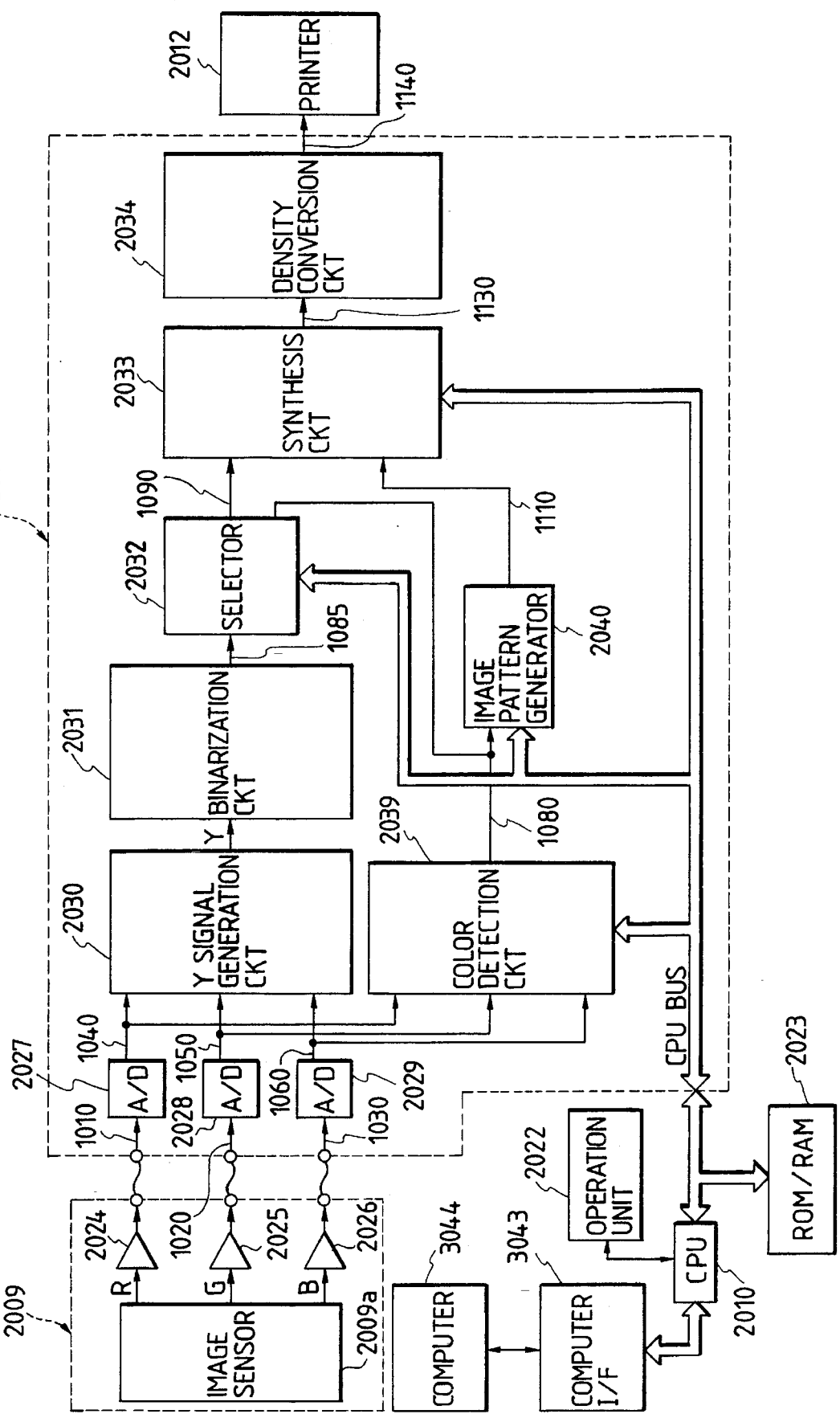
FIG. 46 is a particular block diagram of the embodiment shown in FIG. 45.
Figure 47:
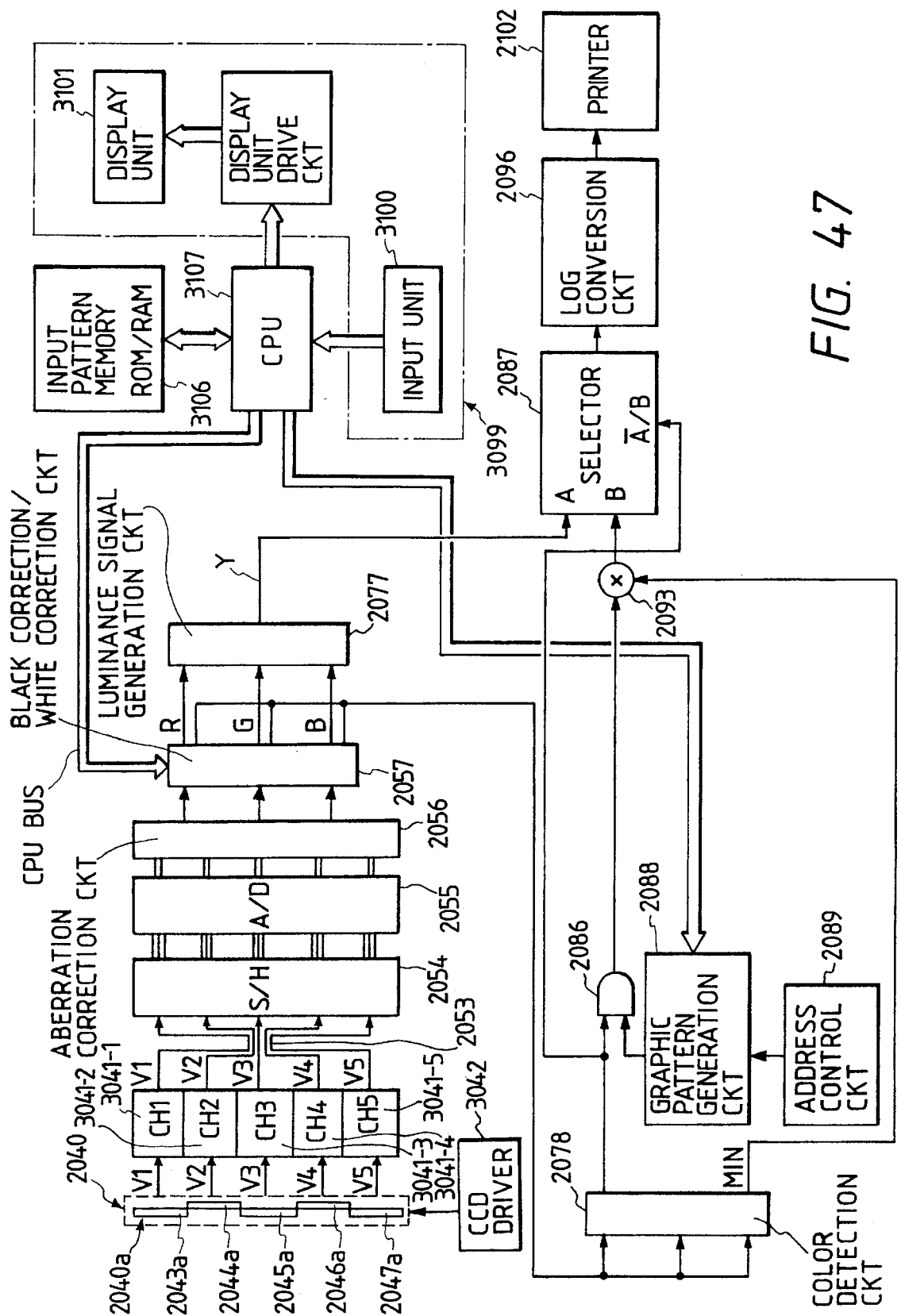
FIG. 47 is a particular block diagram of an image processing apparatus according to other embodiment of the present invention.
Figure 48:
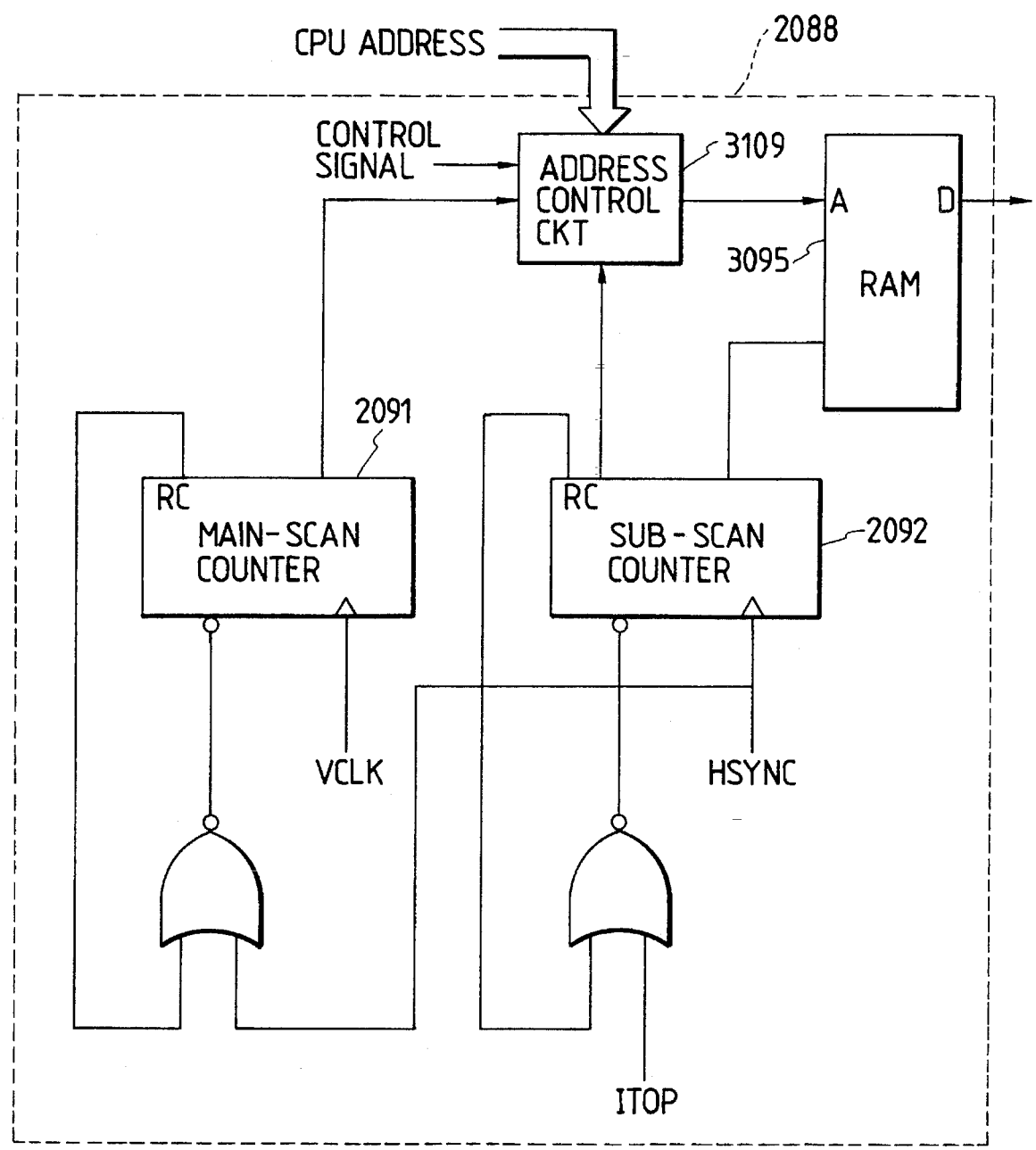
FIG. 48 is a block diagram of a pattern generation circuit 2088 and an address control circuit 2089 shown in FIG. 47.

FIG. 47 is a block diagram of this embodiment, which has almost the same configuration as FIG. 46. Different components include an input section 3100 and a display section 3101, which are used to create graphic patterns, an input pattern memory 3106 for storing created graphic patterns, and a graphic pattern generation circuit 2088 for generating created graphic patterns. The graphic pattern generation circuit 2088 is shown in FIG. 48. The operations will be described later.

Figure 49:
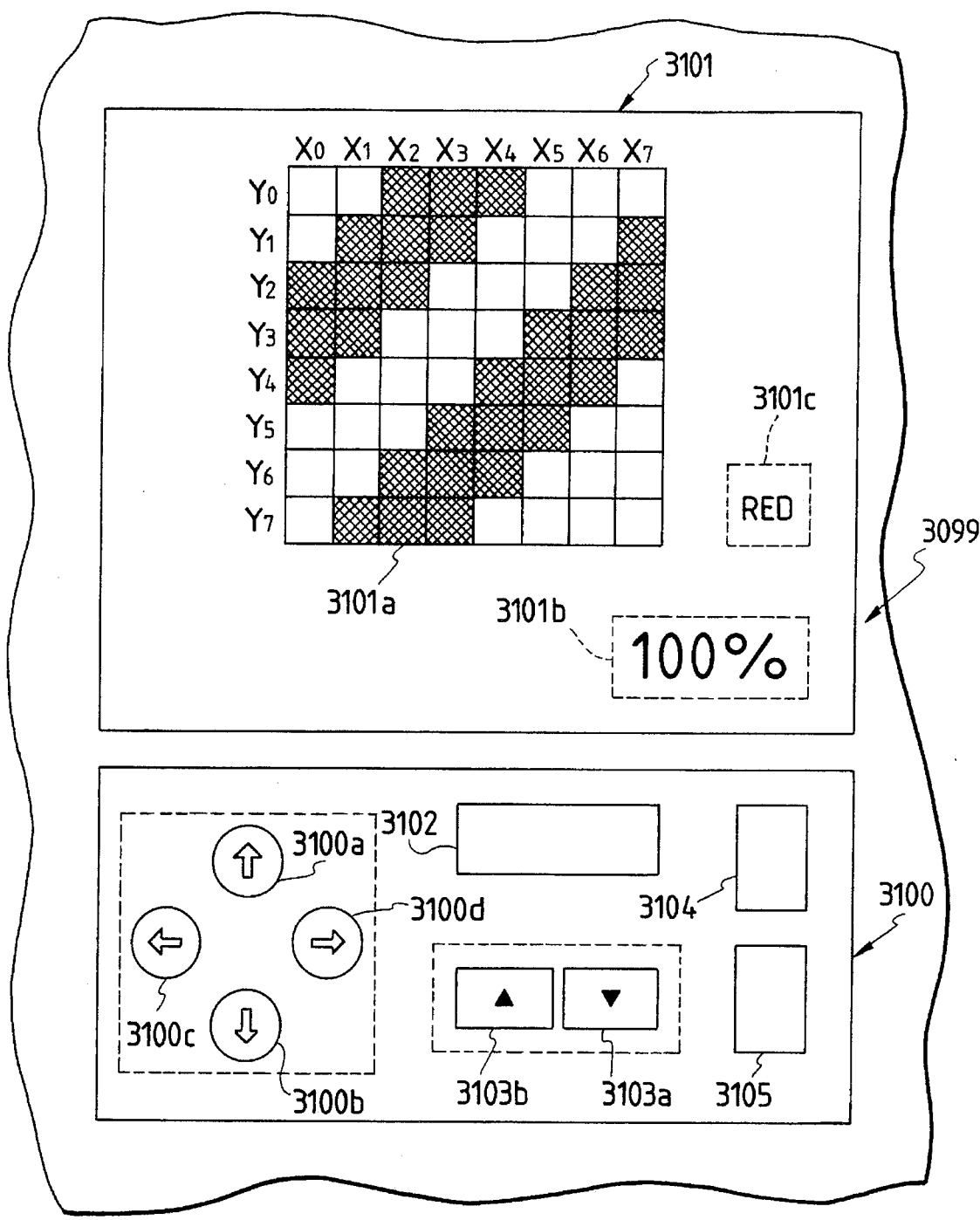
FIG. 49 is an explanatory diagram of an operation unit 3099 shown in FIG. 47.

FIG. 49 shows the configuration of an operation unit for selecting and specifying graphic patterns. 3099 denotes the operation unit, comprising a graphic pattern input section 3100 and a graphic pattern display section 3101. The graphic pattern input section 3100 consists of Up, Down, Left, and Right position designation keys 3100a, 3100b, 3100c, and 3100d for designating the positions of graphic patterns, a select key 3102 for specifying presence or absence of a graphic pattern, reduction and enlargement variable power keys 3103a and 3103b for freely changing the size of an input graphic pattern by specifying an intended magnifying power, a pattern registration key 3104 for registering graphic patterns, and a hue key 3105 for selecting a hue associated with a graphic pattern.

The display section 3101 is a liquid crystal display made up of multiple dots, including a first display section 3101a for creating and displaying graphic patterns using 64 blocks (8×8), a second display section 3101b for indicating a magnifying power specified with the variable power keys 3103a and 3013b, and a third display section 3101c for indicating a hue associated with an input graphic pattern.

A graphic pattern is entered as follows; a hue corresponding to an input graphic pattern is selected using a Hue key 3105 and the third display section 3101c, 64 blocks displayed in the first display section 3101a are specified sequentially from X0 to X7 laterally and Y0 to Y7 vertically using the Up, Down, Left, and Right position designation keys 3100a to 3100d, and presence or absence of a graphic pattern is specified for each of the blocks using the Select key 3102. For example, in this embodiment, when a graphic pattern is designated as shown in the first display section 3101a of FIG. 47, the mesh graphic pattern in which oblique lines are intercrossing is entered.

When specifying presence or absence of a graphic pattern for all 64 blocks is completed, a Pattern Registration key 3104 is pressed. Then, the designated graphic pattern is placed in an input pattern memory 3106 made up of a ROM and a RAM shown in FIG. 47. Moreover, a coefficient corresponding to a magnifying power specified using the variable power keys 3103a and 3103b is calculated by a CPU 3107 shown in FIG. 47 and written in a graphic pattern RAM 3095 of a graphic pattern generation circuit 2088 shown in FIG. 48. At this time, addresses of the RAM 3095 are switched to CPU addresses with a control signal fed to an address control 3109. Then, the input graphic pattern signal is written in the graphic pattern RAM 3095. When writing the graphic pattern signal in the RAM 3095 is completed, the addresses are returned to an address control circuit 2089 shown in FIG. 47 with a control signal.

As described previously, a graphic pattern signal thus provided is displayed in an area corresponding to a color signal in an image. Then, a monochrome image on which any input graphic pattern is added in a size of a specified magnifying power is printed by a printer 2102. Thus, a monochrome processed image on which the graphic patterns corresponding to the colors of images in an original are added is made available.

Figure 50:
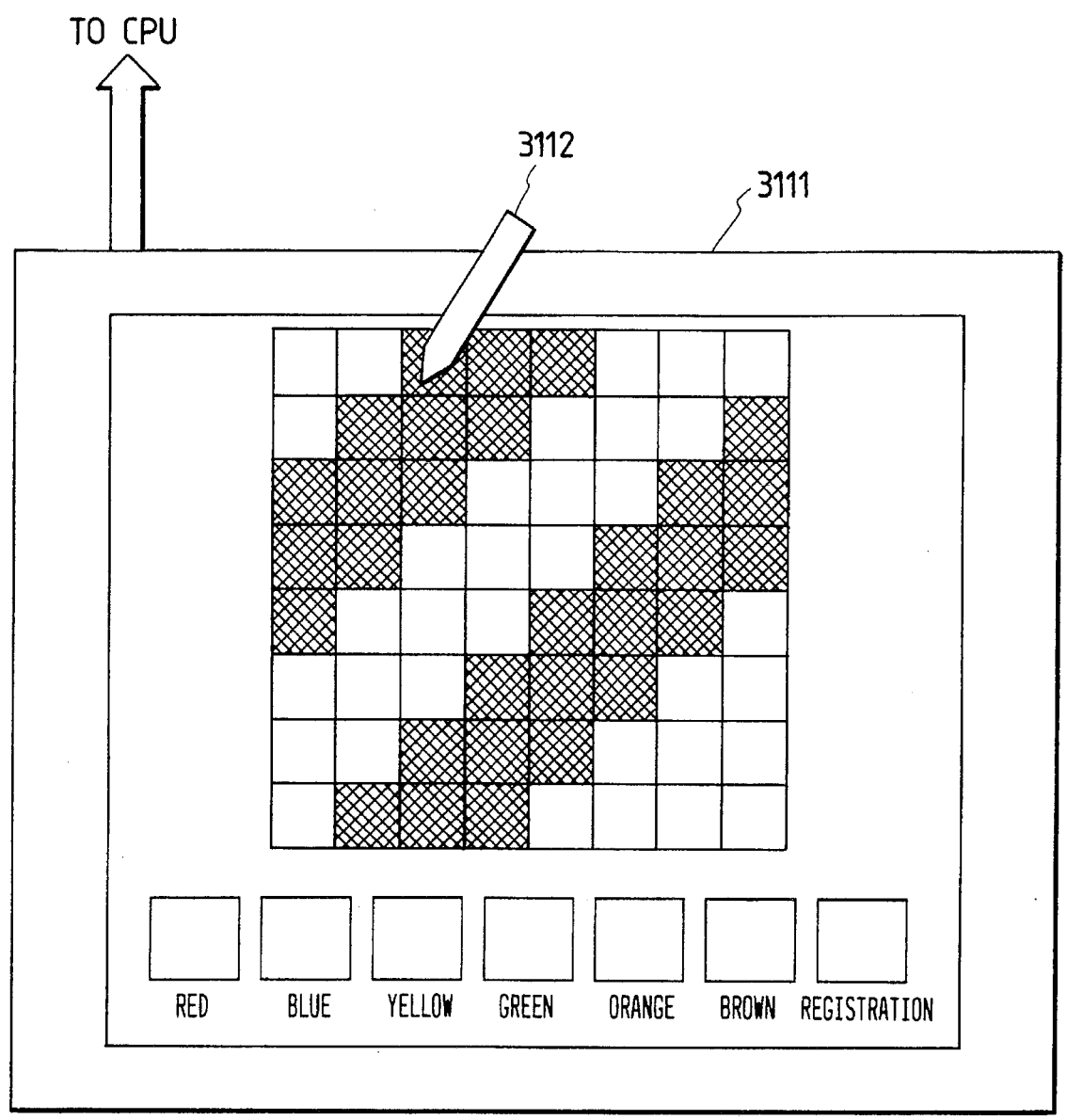
FIG. 50 is an explanatory diagram of an editor according to another embodiment of the present invention.

In this embodiment, graphic patterns are entered by operating the display section 3101 and input section 3100 of the operation unit 3099. A graphic pattern setting means is not limited to those equipment, but may be made up of an editor 3111 and an input pen 3112 shown in FIG. 50. Thus, graphic patterns may be entered. When the editor 3111 is implemented, the input pen 3112 is used to enter positions in X and Y direction. In this case, as described in the previous embodiment, a graphic pattern is designated for each of 64 blocks using the input pen 3112, then a hue associated with the designated graphic pattern is specified in an area for indicating hues in a lower part of the display section 3101. Thus, any graphic pattern can be entered.

This embodiment employs a reader as an information generation means. However, the embodiment may apply to an image processing apparatus for printing VTR outputs or computer outputs. The printer for the embodiment is not limited to an electro-photographic printer, but may be an ink-jet printer, a thermal printer, or other various types of printers. The embodiment is applicable to not only printers but also other output units; such as, CRTs, liquid crystal displays, or other monochrome monitors.

As described so far, color information an information generation means has generated is assessed to detect the colors of color images in an original. The color detection signals are checked to learn colors, then any graphic patterns are specified for the colors using a pattern setting means. Therefore, when even a low-priced monotone printer is installed, it is possible to provide monotone processed images which permits effortless and accurate identification of the colors of pixels in the color images in an original.

What is claimed is:

1. An image processing apparatus, comprising:
   image input means for inputting images containing colors;
   color recognition means for recognizing the colors of the images input by said image input means;
   setting means for setting a relation between colors and patterns;
   pattern generation means for generating patterns in accordance with each of the colors recognized by said color recognition means, and the relation between colors and patterns set by said setting means;
   visualizing means for visualizing the relation between patterns and colors generated by said pattern generation means;
   area recognition means for recognizing areas containing the colors in the images input by said image input means;
   extraction means for extracting monochrome information from the images input by said image input means;
   synthesis means for synthesizing the patterns originating from said pattern generation means within the area recognized by said area recognition means with the monochrome information extracted by said extraction means; and
   output means for outputting the images synthesized by said synthesis means.

2. An image processing apparatus according to claim 1, wherein said pattern setting means specifies intended patterns from among a plurality of patterns.

3. An image processing apparatus according to claim 1 wherein said pattern setting means is capable of specifying intended patterns at any variable power.

4. An image processing apparatus according to claim 1 wherein said pattern setting means is capable of specifying the relationships between specified patterns and colors recognized by said color recognition means.

5. An image processing apparatus according to claim 1 wherein said pattern setting means selects and specifies patterns from among a plurality of predetermined patterns.

6. An image processing apparatus according to claim 5 wherein said pattern setting means includes keys for selecting patterns.

7. An image processing apparatus according to claim 1 wherein said pattern setting means includes a pattern input means for inputting graphic patterns in pixel units and specifies the graphic patterns sent from said pattern input means.

8. An image processing apparatus according to claim 7 wherein said pattern input means is keys for entering graphic patterns.

9. An image processing apparatus according to claim 7 wherein said pattern input means comprises a digitizer for inputting graphic patterns.

10. An image processing apparatus according to claim 1 wherein said pattern setting means specifies the patterns sent from said image input means.

11. An image processing apparatus according to claim 1 wherein said pattern setting means comprises electronic equipment which is installed as an external unit of said image processing apparatus and capable of creating intended patterns.

12. An image processing apparatus according to claim 1 wherein said image input means comprises a reader for reading original images.

13. An image processing apparatus according to claim 1 wherein said output means comprises a printer for printing images on sheets of paper.

14. An apparatus according to claim 1, wherein said visualizing means displays the relation between patterns and colors.

15. An apparatus according to claim 1, wherein said visualizing means prints the relation between patterns and colors on a sheet.

16. An image processing method, comprising:
   an image input step for inputting images containing colors;
   a color recognition step for recognizing the colors of the images input by said image input step;
   a setting step for setting a relation between colors and patterns;
   a pattern generation step for generating patterns in accordance with each of the colors recognized by said color recognition step, and the relation between colors and patterns set by said setting step;
   a visualizing step for visualizing the relation between patterns and colors generated by said pattern generation step;
   an area recognition step for recognizing areas containing the colors in the images input by said image input step;
   an extraction step for extracting monochrome information from the images input by said image input step;
   a synthesis step for synthesizing the patterns originating from said pattern generation step within the area recognized by said area recognition step with the monochrome information extracted by said extraction step; and
   an output step for outputting the images synthesized by said synthesis step.

17. An image processing method according to claim 16, wherein said pattern setting step specifies intended patterns from among a plurality of patterns.

18. An image processing method according to claim 16 wherein said pattern setting step is capable of specifying intended patterns at any variable power.

19. An image processing method according to claim 16 wherein said pattern setting step is capable of specifying the relationships between specified patterns and colors recognized by said color recognition step.

20. An image processing method according to claim 16 wherein said pattern setting step selects and specifies patterns from among a plurality of predetermined patterns.

21. An image processing method according to claim 20 wherein said pattern setting step includes keys on a keyboard for selecting patterns.

22. An image processing method according to claim 16 wherein said pattern setting step includes a pattern input step for inputting graphic patterns in pixel units and for specifying the graphic patterns sent by said pattern input step.

23. An image processing method according to claim 22 wherein said pattern input step uses keys on a keyboard for entering graphic patterns.

24. An image processing method according to claim 22 wherein said pattern input step uses a digitizer for inputting graphic patterns.

25. An image processing method according to claim 16 wherein said pattern setting step specifies the patterns sent by said image input step.

26. An image processing method according to claim 16 wherein said pattern setting step uses an electronic equipment which is installed as an external unit of an image processing apparatus and which is capable of creating intended patterns.

27. An image processing method according to claim 16 wherein said image input step uses a reader for reading original images.

28. An image processing method according to claim 16 wherein said output step uses a printer for printing images on sheets of paper.

29. A method according to claim 16, wherein said visualizing step displays the relation between patterns and colors on a display device.

30. A method according to claim 16, wherein said visualizing step prints the relation between patterns and colors on a sheet.

* * * * *

UNITED STATES PATENT AND TRADEMARK OFFICE
CERTIFICATE OF CORRECTION

PATENT NO. : 5,557,430

DATED : September 17, 1996

INVENTORS : KEIZO ISEMURA ET AL.

Page 1 of 4

It is certified that error appears in the above-identified patent and that said Letters Patent is hereby corrected as shown below:

ON TITLE PAGE
    Line 2,
    [57] ABSTRACT    "an" should read --a--.

COLUMN 1

Line 29,    "originals,used" should read --originals used,--.

COLUMN 2

Line 3,    "produce" should read --produces--;
    Line 28,    "Still" should read --Yet--;
    Line 31,    "Still" should read --Yet--;
    Line 61,    "other" should read --another--.

COLUMN 3

Line 1,    "FIG. 9B-1" should read --FIGS. 9B-1--;
    Line 58,    "diagram" should read --diagrams--;
    Line 61,    "other" should read --another--.

UNITED STATES PATENT AND TRADEMARK OFFICE
CERTIFICATE OF CORRECTION

PATENT NO. : 5,557,430

DATED : September 17, 1996

INVENTORS : KEIZO ISEMURA ET AL.

It is certified that error appears in the above-identified patent and that said Letters Patent is hereby corrected as shown below:

COLUMN 4

Line 2, "other" should read --another--;
Line 19, "other" should read --another--;
Line 23, "other" should read --another--;
Line 38, "is a" should read --is an--.

COLUMN 6

Line 50, "(See" should read --(see--.

COLUMN 7

Line 18, "of" should be deleted.

COLUMN 8 line 41, "Other" should read --Another--.

COLUMN 15

Line 32, "Inputs" should read --¶ Inputs--.

UNITED STATES PATENT AND TRADEMARK OFFICE
CERTIFICATE OF CORRECTION

PATENT NO. : 5,557,430

DATED : September 17, 1996

INVENTORS : KEIZO ISEMURA ET AL.

It is certified that error appears in the above-identified patent and that said Letters Patent is hereby corrected as shown below:

COLUMN 17

Line 17,   "other" should read --another--.

COLUMN 18

Line 44,   "Other" should read --Another--.

COLUMN 20

Line 58,   "other" should read --another--.

COLUMN 21

Line 9,    "photo-electrically" should read --photoelectrically--;

UNITED STATES PATENT AND TRADEMARK OFFICE
CERTIFICATE OF CORRECTION

PATENT NO. : 5,557,430

DATED : September 17, 1996

INVENTORS : KEIZO ISEMURA ET AL.

It is certified that error appears in the above-identified patent and that said Letters Patent is hereby corrected as shown below:

COLUMN 21

Line 29,   "other" should read --another--;
   Line 56,   "Other" should read --Another--.

COLUMN 24

Line 5,   "is" should read --comprises--.

Signed and Sealed this

Eleventh Day of February, 1997

Attest:

BRUCE LEHMAN

Attesting Officer    Commissioner of Patents and Trademarks